US012643813B2

(12) United States Patent
Gaspar Marques et al.

(10) Patent No.: US 12,643,813 B2
(45) Date of Patent: Jun. 2, 2026

(54) HIGH-INDEX SILICOBORATE AND BOROSILICATE GLASSES

(71) Applicant: CORNING INCORPORATED, Corning, NY (US)

(72) Inventors: Paulo Jorge Gaspar Marques, Herblay sur Seine (FR); Antoine Marie Joseph Lepicard, Melun (FR); Jian Luo, Painted Post, NY (US); Lina Ma, Corning, NY (US); Alexander I. Priven, Sejong-si (KR); Adam Robert Sarafian, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 1087 days.

(21) Appl. No.: 17/704,631

(22) Filed: Mar. 25, 2022

(65) Prior Publication Data

US 2022/0324744 A1 Oct. 13, 2022

Related U.S. Application Data

(60) Provisional application No. 63/170,734, filed on Apr. 5, 2021.

(30) Foreign Application Priority Data

May 3, 2021 (NL) ...................................... 2028132

(51) Int. Cl.
*C03C 3/068* (2006.01)
*C03C 3/155* (2006.01)

(52) U.S. Cl.
CPC .............. *C03C 3/068* (2013.01); *C03C 3/155* (2013.01)

(58) Field of Classification Search
CPC ................................ C03C 3/068; C03C 3/155
See application file for complete search history.

(56) References Cited

U.S. PATENT DOCUMENTS

| | | | |
|---|---|---|---|
| 4,439,531 | A | 3/1984 | Mennemann et al. |
| 4,584,279 | A | 4/1986 | Grabowski et al. |
| 4,732,876 | A | 3/1988 | Nagamine et al. |
| 6,187,702 | B1 | 2/2001 | Morishita |
| 7,091,145 | B2 | 8/2006 | Wolff et al. |
| 7,598,193 | B2 | 10/2009 | Endo |
| 7,827,823 | B2 | 11/2010 | Kasuga et al. |
| 8,077,406 | B2 | 12/2011 | Hachitani et al. |
| 8,367,575 | B2 | 2/2013 | Kuang et al. |
| 8,661,853 | B2 | 3/2014 | Negishi et al. |
| 8,728,963 | B2 | 5/2014 | Negishi et al. |
| 8,741,795 | B2 | 6/2014 | Zou et al. |
| 8,741,796 | B2 | 6/2014 | Negishi et al. |
| 8,835,336 | B2 | 9/2014 | Taguchi |
| 8,835,337 | B2 | 9/2014 | Negishi |
| 9,018,116 | B2 | 4/2015 | Schreder et al. |
| 9,169,152 | B2 | 10/2015 | Kuang |
| 9,302,930 | B2 | 4/2016 | Negishi et al. |
| 9,394,194 | B2 | 7/2016 | Negishi |
| 9,487,432 | B2 | 11/2016 | Kuang |
| 9,643,880 | B2 | 5/2017 | Negishi |
| 10,287,205 | B2 | 5/2019 | Sun |
| 2009/0325779 | A1 | 12/2009 | Negishi et al. |
| 2015/0203395 | A1 | 7/2015 | Kuang |
| 2022/0073410 | A1 | 3/2022 | Gaspar Marques et al. |

FOREIGN PATENT DOCUMENTS

| | | |
|---|---|---|
| CN | 102372430 A | 3/2012 |
| CN | 103708724 A | 4/2014 |
| CN | 102219374 B | 5/2015 |
| CN | 111018343 A | 4/2020 |
| CN | 111320384 A | 6/2020 |
| DE | 2653581 C3 | 12/1982 |
| DE | 3201344 A1 | 7/1983 |
| IN | 110963706 A | 4/2020 |
| JP | 50-018509 A | 2/1975 |
| JP | 52-140522 A | 11/1977 |
| JP | 2001-072432 A | 3/2001 |
| JP | 2005-047732 A | 2/2005 |
| JP | 2015-044725 A | 3/2015 |
| JP | 2019-196296 A | 11/2019 |
| JP | 2020-059627 A | 4/2020 |
| JP | 2020-059628 A | 4/2020 |
| JP | 2020-059629 A | 4/2020 |
| JP | 2020-073453 A | 5/2020 |

(Continued)

OTHER PUBLICATIONS

NL Search Report; 2028132; dated Jan. 17, 2022; 9 pages; European Patent Office.
Chinese Patent Application No. 202280038241.8, Office Action dated Jan. 28, 2026, 5 pages (English Translation only), Chinese Patent Office.

*Primary Examiner* — Elizabeth A. Bolden
(74) *Attorney, Agent, or Firm* — Kevin L. Bray

(57) ABSTRACT

Glass compositions include titania ($TiO_2$), lanthanum oxide ($La_2O_3$), boron oxide ($B_2O_3$), silica ($SiO_2$) as essential components and may optionally include zirconia ($ZrO_2$), niobia ($Nb_2O_5$), calcium oxide (CaO), barium oxide (BaO), yttria ($Y_2O_3$), zinc oxide (ZnO), gadolinium oxide ($Gd_2O_3$), gallia ($Ga_2O_3$), tungsten oxide ($WO_3$) and other components. The glasses may be characterized by high refractive index at 587.56 nm at comparably low density at room temperature.

23 Claims, 10 Drawing Sheets

(56)        References Cited

FOREIGN PATENT DOCUMENTS

| JP | 2020-169116 | A  | 10/2020 |
| TW | 201711973   | A  | 4/2017  |
| TW | 202012333   | A  | 4/2020  |
| WO | 2012/099168 | A1 | 7/2012  |
| WO | 2014/187132 | A1 | 11/2014 |
| WO | 2017/110304 | A1 | 6/2017  |
| WO | 2019/058617 | A1 | 3/2019  |
| WO | 2019/131123 | A1 | 7/2019  |
| WO | 2020/034215 | A1 | 2/2020  |
| WO | 2020/045417 | A1 | 3/2020  |

HIGH-INDEX SILICOBORATE AND BOROSILICATE GLASSES

This application claims the benefit of priority to Dutch Patent Application No. 2028132 filed on May 3, 2021, which claims priority from U.S. Provisional Patent Application Ser. No. 63/170,734 filed on Apr. 5, 2021, the content of which is relied upon and incorporated herein by reference in its entirety.

FIELD

The present disclosure generally relates to borate and silicoborate glasses having a high refractive index and low density.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glass-forming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density. However, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for borate and silicoborate glasses having a high refractive index, a low density, and a high transmittance to blue light.

SUMMARY

According to an embodiment of the present disclosure, a glass comprises a plurality of components, the glass having a composition of the components comprising greater than or equal to 0.5 mol. % and less than or equal to 29.0 mol. % $B_2O_3$, greater than or equal to 0.0 mol. % and less than or equal to 25.2 mol. % $TiO_2$, greater than or equal to 0.0 mol. % and less than or equal to 20.0 mol. % $Bi_2O_3$, greater than or equal to 0.0 mol. % and less than or equal to 20.0 mol. % $TeO_2$, greater than or equal to 0.0 mol. % and less than or equal to 15.0 mol. % $P_2O_5$, greater than or equal to 0.0 mol. % and less than or equal to 10.5 mol. % $Nb_2O_5$, greater than or equal to 0.0 mol. % and less than or equal to 10.0 mol. % $Al_2O_3$, greater than or equal to 0.0 mol. % and less than or equal to 5.0 mol. % $MoO_3$, greater than or equal to 0.0 mol. % and less than or equal to 4.0 mol. % $V_2O_5$, greater than or equal to 0.0 mol. % and less than or equal to 2.5 mol. % $GeO_2$, greater than or equal to 0.0 mol. % and less than or equal to 2.5 mol. % ZnO, greater than or equal to 0.0 mol. % and less than or equal to 1.0 mol. % $Ta_2O_5$, greater than or equal to 95.0 mol. % $R_mO_n$, greater than or equal to 0.0 mol. % and less than or equal to 29.0 mol. % $RE_mO_n$, greater than or equal to 10.0 mol. % $SiO_2+B_2O_3+P_2O_5$, less than or equal to 34.0 mol. % $SiO_2+B_2O_3$, greater than or equal to 0.3 mol. % $CaO+SrO+BaO+Y_2O_3$ and greater than or equal to 0.0 mol. % and less than or equal to 25.0 mol. % $R_2O+RO$, wherein the composition of the components satisfies the conditions: $Y_2O_3-Gd_2O_3$ [mol. %]$\geq$-2.0, and the glass satisfies the conditions: $4.0 \leq P_d \leq 6.0$ and $P_n-(1.207+0.155* P_d)>0.000$, where $P_n$ is a refractive index parameter, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

$P_d$ is a density parameter, calculated from the glass composition in terms of mol. % of the components according to the Formula (II):

$$P_d=4.276+0.058714*La_2O_3-0.0077783*TiO_2-$$
$$0.023741*B_2O_3-0.018272*SiO_2+$$
$$0.010913*ZrO_2-0.0014478*CaO+$$
$$0.023857*BaO+0.033560*Y_2O_3+$$
$$0.010174*ZnO+0.082094*Gd_2O_3-$$
$$0.008237*Na_2O+0.035497*WO_3-$$
$$0.031171*Al_2O_3-0.0080004*Li_2O+$$
$$0.051830*PbO+0.10437*Bi_2O_3-$$
$$0.012816*GeO_2-0.0065609*TeO_2+$$
$$0.10060*Er_2O_3+0.10637*Yb_2O_3-$$
$$0.017097*K_2O+0.009821*SrO-$$
$$0.0037906*MgO, \qquad (II)$$

where $R_mO_n$ is a total sum of all oxides, $RE_mO_n$ is a total sum of rare earth metal oxides, $R_2O$ is a total sum of monovalent metal oxides, RO is a total sum of divalent metal oxides, and an asterisk (*) means multiplication.

According to another embodiment of the present disclosure, a glass comprises a plurality of components, the glass having a composition of the components comprising greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0 mol. % and less than or equal to 6.75 mol. % $Nb_2O_5$, greater than or equal to 0.0 mol. % and less than or equal to 6.7 mol. % $Y_2O_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Y_2O_3+Gd_2O_3+TiO_2$, greater than or equal to 12.1 mol. % $Nb_2O_5+ZrO_2$ and may optionally contain one or more components selected from $Bi_2O_3$, $Er_2O_3$, $Nd_2O_3$, $WO_3$ and $Yb_2O_3$, wherein the composition of the components satisfies the conditions: $SiO_2+B_2O_3-TiO_2$ [mol. %]≥7.05 and $B_2O_3-SiO_2$ [mol. %]≤7.0, and the glass satisfies the condition: $P_{ref}-(0.196+0.0016*(TiO_2-La_2O_3))$)>0.000, where $P_{ref}$ is a refraction parameter, calculated from the glass composition in terms of mol. % of the components according to the Formula (III):

$$P_{ref}=0.201656+0.00018225*B_2O_3-0.0010873*BaO-\\0.0024853*Bi_2O_3-0.0030326*Er_2O_3-\\0.0018856*Gd_2O_3-0.0017563*La_2O_3-\\0.0002505*Na_2O+0.0017526*Nb_2O_5-\\0.0025472*Nd_2O_3-0.0016439*PbO+\\0.000050096*SiO_2+0.0011794*TiO_2-\\0.00072112*WO_3-0.00079167*Y_2O_3-\\0.0031015*Yb_2O_3-0.00034209*ZnO, \quad (III)$$

where RO is a total sum of divalent metal oxides, $R_2O$ is a total sum of monovalent metal oxides, and an asterisk (*) means multiplication.

According to one more embodiment of the present disclosure, a glass comprises a plurality of components, the glass having a composition of the components comprising greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 20.0 mol. % CaO, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0 mol. % and less than or equal to 6.75 mol. % $Nb_2O_5$, greater than or equal to 0.0 mol. % and less than or equal to 5.5 mol. % BaO, greater than or equal to 0.0 mol. % and less than or equal to 4.6 mol. % $Y_2O_3$, greater than or equal to 0.0 mol. % and less than or equal to 3.5 mol. % ZnO, greater than or equal to 0.0 mol. % and less than or equal to 1.0 mol. % $WO_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Yb_2O_3+Y_2O_3+Gd_2O_3+TiO_2$, greater than or equal to 11.0 mol. % $Nb_2O_5+ZrO_2$ and may optionally contain one or more components selected from $Bi_2O_3$, $Er_2O_3$ and $Nd_2O_3$, wherein the composition of the components satisfies the conditions: $TiO_2-B_2O_3$ [mol. %]≥-

6.0 and $TiO_2-La_2O_3$ [mol. %]≤5.0, and the glass satisfies the condition: $P_{ref}-(0.199+0.0025*(TiO_2-La_2O_3))$)>0.000, where $P_{ref}$ is a refraction parameter, calculated from the glass composition in terms of mol. % of the components according to the Formula (III):

$$P_{ref}=0.201656+0.00018225*B_2O_3-0.0010873*BaO-\\0.0024853*Bi_2O_3-0.0030326*Er_2O_3-\\0.0018856*Gd_2O_3-0.0017563*La_2O_3-\\0.0002505*Na_2O+0.0017526*Nb_2O_5-\\0.0025472*Nd_2O_3-0.0016439*PbO+\\0.000050096*SiO_2+0.0011794*TiO_2-\\0.00072112*WO_3-0.00079167*Y_2O_3-\\0.0031015*Yb_2O_3-0.00034209*ZnO, \quad (III)$$

where RO is a total sum of divalent metal oxides, $R_2O$ is a total sum of monovalent metal oxides, and an asterisk (*) means multiplication.

These and other aspects, objects, and features of the present disclosure will be understood and appreciated by those skilled in the art upon studying the following specification, claims, and appended drawings.

DETAILED DESCRIPTION

Figure 1:
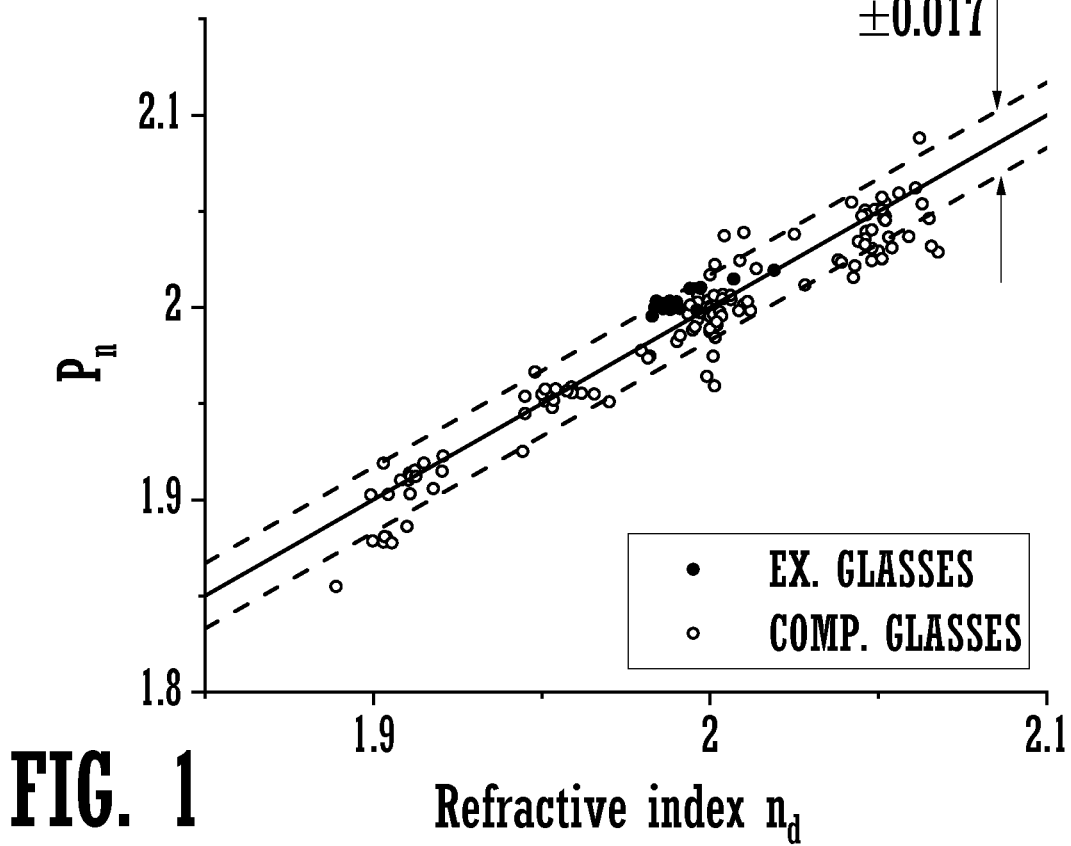
FIG. 1 is a plot illustrating the relationship between the refractive index $n_d$ and the refractive index parameter $P_n$ calculated by formula (I) for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

Unless otherwise specified, the term "glass" is used to refer to a glass made from a glass composition disclosed herein.

The symbol "*" means multiplication when used in any formula herein.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal RE has the redox state "+3," and thus rare earth metal oxides are not encompassed by the term RO or the term $R_2O$.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present in the as-batched composition, and the term "$RE_2O_3$" is used to refer to the total content of rare earth metal oxides in the in the as-batched composition when recalculated to "+3" redox state. The term "$RE_2O_3$" is also specified herein as "trivalent equivalent".

Unless otherwise specified, all compositions are expressed in terms of as-batched mole percent (mol. %). References to "composition" or "glass composition" thus refer to composition expressed in terms of mol. % in the as-batched state. As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol. % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

Oxides and other constituents of the glass are referred to as "components". Expressions combining components with the mathematical symbols "+" and "−" refer to sums and differences, respectively, of the as-batched composition of the components expressed in mol. %. For example, the expression "$SiO_2+GeO_2$" or the expression "$SiO_2+GeO_2$ [mol. %]" means the sum of the components $SiO_2$ and $GeO_2$, each expressed in mol. %, in the as-batched composition. In another example, the expression "$B_2O_3+SiO_2-P_2O_5$" or the expression "$B_2O_3+SiO_2-P_2O_5$ [mol. %]" means the sum of the components $B_2O_3+SiO_2$ less the component $P_2O_5$, each expressed in mol. %, in the as-batched composition. If the expression is preceded by an amount, the amount refers to the combined as-batched compositions of the components listed in the expression. For example, the expression "4.8 mol. % $SiO_2+GeO_2$" means that the combined amount of the components $SiO_2$ and $GeO_2$ in the as-batched composition is 4.8 mol. % and the expression "less than or equal to 4.8 mol. % $SiO_2+GeO_2$" means that the combined amount of the components of $SiO_2$ and $GeO_2$ in the as-batched composition is less than or equal to 4.8 mol. %.

In the case when fluorine or other halogen (chlorine, bromine, and/or iodine) is added to or is present in an oxide glass, the molecular representation of the resulting as-batched composition may be expressed in different ways. In the present disclosure, the content of a halogen as a component, when present, is expressed in terms of atomic percent (at. %), which is determined based on the fraction of the halogen in a total sum of all atoms in the as-batched composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si^{4+}$], boron [$B^{3+}$], sodium [$Na^+$], etc.) are initially presented in the form of the corresponding oxides.

When fluorine is present as a sole halogen, for the purposes of calculating the concentration of components of the as-batched composition, some part of the oxygen in the oxide is equivalently replaced with fluorine (i.e. one atom of oxygen is replaced with two atoms of fluorine). The said fluorine is assumed to be present in the form of silicon fluoride ($SiF_4$); accordingly, the total sum of all oxides plus $SiF_4$ is assumed to be 100 mole percent or 100 weight percent in all compositions. Analogous treatment of other halogens as sole halogens or combinations of halogens applies.

The measured density values for the glasses reported herein were measured at room temperature in units of $g/cm^3$ by the Archimedes method in water with an uncertainty of 0.001 $g/cm^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the uncertainty of 0.001 $g/cm^3$, and thus is not expected to impact the room temperature density measurements reported herein.

As used herein, the term "refraction" refers to the relationship of the refractive index to the density according to the ratio: $(n_d-1)/d_{RT}$, where the refractive index $n_d$ is measured at 587.56 nm and the density $d_{RT}$ is measured in $g/cm^3$ at room temperature. The ratio $(n_d-1)/d_{RT}$, or refraction, may characterize the relationship between the refractive index $n_d$ and the density $d_{RT}$. The higher the refraction value, the higher the refractive index is at a given density.

As used herein, good glass forming ability refers to a resistance of the melt to devitrification as the melt cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermal event corresponding to the melting of crystals was taken as the liquidus temperature. For the second technique (isothermal hold), a glass block (about 1 $cm^3$) was wrapped in platinum foil, to avoid volatilization, and placed in a furnace at a given temperature for 17 hours. The glass block was then observed under an optical microscope to check for crystals.

The refractive index values reported herein were measured at room temperature (about 25° C.), unless otherwise specified. The refractive index values for a glass sample were measured using a Metricon Model 2010 prism coupler refractometer with an uncertainty of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" or "$n_d$" is used herein to refer to a refractive index calculated as described above at a wavelength of 587.56 nm, which corresponds to the helium d-line wavelength. The term "refractive index $n_C$" or "$n_C$" is used herein to refer to a refractive index calculated as described above at a wavelength of 656.3 nm. The term "refractive index $n_F$" or "$n_F$" is used herein to refer to a refractive index calculated as described above at a wavelength of 486.1 nm. The term "refractive index $n_g$" or "$n_g$" is used herein to refer to a refractive index calculated as described above at a wavelength of 435.8 nm.

As used herein, the terms "high refractive index" or "high index" refer to a refractive index value of a glass that is greater than or equal to 1.80, unless otherwise indicated. Where indicated, embodiments of the terms "high refractive index" or "high index" refer to a refractive index value of a glass that is greater than or equal to 1.85, greater than or equal to 1.90, or greater than or equal to 1.95, or greater than or equal to 2.00.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_x=(n_x-1)/(n_F-n_C)$, where "x" in the present disclosure stands for one of the commonly used wavelengths (for example, 587.56 nm [d-line] for $v_d$ or 589.3 nm [D-line] for $v_D$), $n_x$ is the refractive index at this wavelength (for example, $n_d$ for $v_d$ and $n_D$ for $v_D$), and $n_F$ and $n_C$ are refractive indices at the wavelengths 486.1 nm (F-line) and 656.3 nm (C-line), respectively. The numerical values of $v_d$ and $v_D$ differ very slightly, mostly within ±0.1% to ±0.2%. A higher Abbe number corresponds to a lower optical dispersion.

The numerical value for an Abbe number corresponding to "high dispersion" or "low dispersion" may vary depending on the refractive indices for which the Abbe number is calculated. In some cases, an Abbe number corresponding to "low dispersion" for a high refractive index glass may be lower than an Abbe number corresponding to "low dispersion" for a low refractive index glass. In other words, as the calculated refractive index value increases, the value of the Abbe number corresponding to low dispersion decreases. The same relates to "high dispersion" as well.

The term "α," or "$\alpha_{20-300}$," as used herein, refers to the coefficient of linear thermal expansion (CTE) of the glass composition over a temperature range from 20° C. to 300° C. This property is measured by using a horizontal dilatometer (push-rod dilatometer) in accordance with ASTM E228-11. The numeric measure of α is a linear average value in a specified temperature range ΔT (e.g., 20° C. to 300° C.) expressed as $\alpha=\Delta L/(L_0\Delta T)$, where $L_0$ is the linear size of a sample at some temperature within or near the measured range, and L is the change in the linear size (ΔL) in the measured temperature range ΔT.

The Young's elastic modulus E and the Poisson's ratio μ are measured by using Resonant Ultrasound Spectroscopy, using a Quasar RUSpec 4000 available from ITW Indiana Private Limited, Magnaflux Division.

The glass transition temperature ($T_g$) is measured by differential scanning calorimeter (DSC) at the heating rate of 10 K/min after cooling in air.

The term "annealing point," as used herein, refers to the temperature determined according to ASTM C598-93 (2013), at which the viscosity of a glass of a given glass composition is approximately $10^{13.2}$ poise.

Glass composition may include boron oxide ($B_2O_3$). According to some embodiments of the present disclosure, boron oxide may play a role of a glass former. As a glass former, $B_2O_3$ may help to increase the liquidus viscosity (viscosity at the liquidus temperature) and, therefore, protect a glass composition from crystallization. However, adding $B_2O_3$ to a glass composition may cause liquid-liquid phase separation, which may cause devitrification and/or reducing the transmittance of the resulting glass. Also, adding $B_2O_3$ to the high-index glasses reduces the refractive index. Accordingly, the amount of boron oxide in glasses of the present disclosure is limited, or glasses may be substantially free of $B_2O_3$. In embodiments, the glass composition may contain boron oxide ($B_2O_3$) in an amount from greater than or equal to 0.5 mol. % to less than or equal to 40.0 mol. % and all ranges and sub-ranges between the foregoing values. In some embodiments, the glass composition may contain $B_2O_3$ in an amount greater than or equal to 0.5 mol. %, greater than or equal to 1.0 mol. %, greater than or equal to 5.0 mol. %, greater than or equal to 15.0 mol. %, greater than or equal to 16.0 mol. %, greater than or equal to 16.4 mol. %, greater than or equal to 16.9 mol. %, greater than or equal to 18.4 mol. %, greater than or equal to 20.0 mol. %, greater than or equal to 25.0 mol. %, greater than or equal to 30.0 mol. %, or greater than or equal to 35.0 mol. %. In some other embodiments, the glass composition may contain $B_2O_3$ in an amount less than or equal to 40.0 mol. %, less than or equal to 35.0 mol. %, less than or equal to 30.0 mol. %, less than or equal to 29.0 mol. %, less than or equal to 25.0 mol. %, less than or equal to 22.5 mol. %, less than or equal to 21.0 mol. %, less than or equal to 20.4 mol. %, less than or equal to 20.0 mol. %, or less than or equal to 5.0 mol. %. In some more embodiments, the glass composition may contain $B_2O_3$ in an amount greater than or equal to 0.5 mol. % and less than or equal to 29.0 mol. %, greater than or equal to 1.0 mol. % and less than or equal to 40.0 mol. %, greater than or equal to 15.0 mol. % and less than or equal to 22.5 mol. %, greater than or equal to 16.0 mol. % and less than or equal to 21.0 mol. %, greater than or equal to 16.0 mol. % and less than or equal to 20.0 mol. %, greater than or equal to 16.4 mol. % and less than or equal to 20.4 mol. %, greater than or equal to 16.9 mol. % and less than or equal to 20.4 mol. %, greater than or equal to 18.38 mol. % and less than or equal to 20.37 mol. %, greater than or equal to 0.5 mol. % and less than or equal to 40.0 mol. %, greater than or equal to 5.0 mol. % and less than or equal to 40.0 mol. %, greater than or equal to 5.0 mol. % and less than or equal to 20.0 mol. %, greater than or equal to 20.0 mol. % and less than or equal to 20.4 mol. %, greater than or equal to 20.4 mol. %, greater than or equal to 20.4 mol. % and less than or equal to 40.0 mol. %, greater than or equal to 20.4 mol. % and less than or equal to 21.0 mol. %, greater than or equal to 21.0 mol. % and less than or equal to 22.5 mol. %, greater than or equal to 22.5 mol. % and less than or equal to 25.0 mol. %.

Glass composition may include silica ($SiO_2$). Silica may play a role of an additional glass former. Silica, as well as $B_2O_3$, may help to increase the liquidus viscosity and, therefore, protect a glass composition from crystallization.

However, adding $SiO_2$ to a glass composition may cause liquid-liquid phase separation, which may cause devitrification and/or reducing the transmittance of the resulting glass. Also, $SiO_2$ is a low refractive index component and makes it difficult to achieve high index glasses. Accordingly, the content of $SiO_2$ in the embodiments of the present disclosure is limited, or glasses may be substantially free of $SiO_2$. In embodiments, the glass composition may contain silica ($SiO_2$) in an amount from greater than or equal to 0.0 mol. % to less than or equal to 35.0 mol. % and all ranges and sub-ranges between the foregoing values. In some embodiments, the glass composition may contain $SiO_2$ in an amount greater than or equal to 0.0 mol. %, greater than or equal to 5.0 mol. %, greater than or equal to 7.5 mol. %, greater than or equal to 10.0 mol. %, greater than or equal to 11.0 mol. %, greater than or equal to 20.0 mol. %, greater than or equal to 25.0 mol. %, or greater than or equal to 30.0 mol. %. In some other embodiments, the glass composition may contain $SiO_2$ in an amount less than or equal to 35.0 mol. %, less than or equal to 34.0 mol. %, less than or equal to 30.0 mol. %, less than or equal to 25.0 mol. %, less than or equal to 20.0 mol. %, less than or equal to 17.5 mol. %, less than or equal to 16.5 mol. %, less than or equal to 15.0 mol. %, or less than or equal to 5.0 mol. %. In some more embodiments, the glass composition may contain $SiO_2$ in an amount greater than or equal to 0.0 mol. % and less than or equal to 35.0 mol. %, greater than or equal to 5.0 mol. % and less than or equal to 20.0 mol. %, greater than or equal to 7.5 mol. % and less than or equal to 20.0 mol. %, greater than or equal to 10.0 mol. % and less than or equal to 20.0 mol. %, greater than or equal to 10.0 mol. % and less than or equal to 17.5 mol. %, greater than or equal to 11.0 mol. % and less than or equal to 16.5 mol. %, greater than or equal to 11.16 mol. % and less than or equal to 15.22 mol. %, greater than or equal to 0.0 mol. % and less than or equal to 5.0 mol. %, greater than or equal to 15.0 mol. % and less than or equal to 16.5 mol. %, greater than or equal to 16.5 mol. % and less than or equal to 17.5 mol. %, greater than or equal to 17.5 mol. % and less than or equal to 20.0 mol. %.

Glass composition may include phosphorus oxide ($P_2O_5$). The glass compositions in the embodiments described herein may comprise phosphorus oxide ($P_2O_5$) as an additional glass former. Greater amounts of $P_2O_5$ cause greater increase the melt viscosity values at same a given temperatures, which protects the melts from inhibits crystallization from the melt when cooling and, therefore, makes the said melts better improves the glass-forming ability of the melt (i.e. having lowers the critical cooling rates of the melt). However, $P_2O_5$, being added to a glass composition, significantly decreases the refractive index, which makes it more difficult to reach the required high indexes. Also, in some cases it may stimulate liquid-liquid phase separation, which may cause crystallization of glass forming melts when cooling and/or loss of transmittance. Additionally, $P_2O_5$ can increase the liquidus temperature of a given composition due to the low solubility at relevant temperatures of refractory phosphate phases. Accordingly, the content of $P_2O_5$ in high-index glasses is limited, or glasses may be free of $P_2O_5$. In embodiments, the glass composition may contain phosphorus oxide ($P_2O_5$) in an amount from greater than or equal to 0.0 mol. % to less than or equal to 15.0 mol. % and all ranges and sub-ranges between the foregoing values. In some embodiments, the glass composition may contain $P_2O_5$ in an amount greater than or equal to 0.0 mol. %, greater than or equal to 5.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain $P_2O_5$ in an amount less than or equal to 15.0 mol. %, less than or equal to 13.0 mol. %, less than or equal to 11.0 mol. %, less than or equal to 10.0 mol. %, less than or equal to 9.0 mol. %, or less than or equal to 5.0 mol. %. In some more embodiments, the glass composition may contain $P_2O_5$ in an amount greater than or equal to 0.0 mol. % and less than or equal to 15.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 9.0 mol. %, greater than or equal to 9.0 mol. % and less than or equal to 15.0 mol. %, greater than or equal to 9.0 mol. % and less than or equal to 10.0 mol. %, greater than or equal to 10.0 mol. % and less than or equal to 15.0 mol. %, greater than or equal to 10.0 mol. % and less than or equal to 11.0 mol. %, greater than or equal to 11.0 mol. % and less than or equal to 15.0 mol. %, greater than or equal to 11.0 mol. % and less than or equal to 13.0 mol. %.

Glass composition may include germania ($GeO_2$). Germania ($GeO_2$) provides excellent ratio between the refractive index and density and does not reduce transmittance. However, germania is expensive, and thus it may make a glass composition not economical. Accordingly, the content of germania should be limited, or glass compositions may be free of $GeO_2$, or glasses may be substantially free of $GeO_2$. In embodiments, the glass composition may contain germania ($GeO_2$) in an amount from greater than or equal to 0.0 mol. % to less than or equal to 10.0 mol. % and all ranges and sub-ranges between the foregoing values. In some embodiments, the glass composition may contain $GeO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $GeO_2$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 2.5 mol. %, or less than or equal to 0.5 mol. %. In some more embodiments, the glass composition may contain $GeO_2$ in an amount greater than or equal to 0.0 mol. % and less than or equal to 10.0 mol. %, greater than or equal to 0.0 mol. % and less than or equal to 2.5 mol. %, greater than or equal to 0.0 mol. % and less than or equal to 0.5 mol. %, greater than or equal to 0.5 mol. % and less than or equal to 10.0 mol. %, greater than or equal to 0.5 mol. % and less than or equal to 2.5 mol. %, greater than or equal to 2.5 mol. % and less than or equal to 10.0 mol. %, greater than or equal to 2.5 mol. % and less than or equal to 5.0 mol. %, greater than or equal to 5.0 mol. % and less than or equal to 10.0 mol. %, greater than or equal to 5.0 mol. % and less than or equal to 7.0 mol. %.

In some embodiments, the glass composition may contain a sum of all oxides $R_mO_n$ in an amount greater than or equal to 95.0 mol. %.

In some embodiments, the glass composition may contain rare earth metal oxides $RE_mO_n$ in an amount greater than or equal to 0.0 mol. %, greater than or equal to 10.0 mol. %, or greater than or equal to 20.0 mol. %. In some other embodiments, the glass composition may contain rare earth metal oxides $RE_mO_n$ in an amount less than or equal to 29.0 mol. %, less than or equal to 20.0 mol. %, or less than or equal to 10.0 mol. %. In some more embodiments, the glass composition may contain $RE_mO_n$ in an amount greater than or equal to 0.0 mol. % and less than or equal to 29.0 mol. %, greater than or equal to 0.0 mol. % and less than or equal to 20.0 mol. %, or greater than or equal to 0.0 mol. % and less than or equal to 10.0 mol. %, greater than or equal to 10.0 mol. % and less than or equal to 29.0 mol. %, or greater than or equal to 10.0 mol. % and less than or equal to 20.0 mol. %.

Glass composition may include lanthanum oxide ($La_2O_3$). Lanthanum oxide is one of the cheapest oxides providing high refractive indexes without significant loss of transmittance in visible range. Also, addition of $La_2O_3$ may reduce the risk of phase separation. However, $La_2O_3$ provides higher density than other high-index components, such as, for example, $TiO_2$, $Nb_2O_5$ or $WO_3$. Also, being added in high amount, it may cause crystallization of refractory species, like lanthanum disilicate ($La_2Si_2O_7$), lanthanum zirconate ($La_2ZrO_5$) and others, or solid solutions comprising these minerals, which may increase the liquidus temperature of glasses and, accordingly, reduce their glass forming ability. For this reason, the content of $La_2O_3$ in the glasses of the present disclosure should be limited. In embodiments, the glass composition may contain lanthanum oxide ($La_2O_3$) in an amount from greater than or equal to 0.0 mol. % to less than or equal to 35.0 mol. % and all ranges and sub-ranges between the foregoing values. In some embodiments, the glass composition may contain $La_2O_3$ in an amount greater than or equal to 0.0 mol. %, greater than or equal to 5.0 mol. %, greater than or equal to 15.0 mol. %, greater than or equal to 17.5 mol. %, greater than or equal to 20.0 mol. %, greater than or equal to 21.0 mol. %, greater than or equal to 23.5 mol. %, greater than or equal to 25.0 mol. %, or greater than or equal to 30.0 mol. %. In some other embodiments, the glass composition may contain $La_2O_3$ in an amount less than or equal to 35.0 mol. %, less than or equal to 30.0 mol. %, less than or equal to 27.5 mol. %, less than or equal to 26.25 mol. %, less than or equal to 25.5 mol. %, less than or equal to 25.0 mol. %, less than or equal to 20.0 mol. %, or less than or equal to 5.0 mol. %. In some more embodiments, the glass composition may contain $La_2O_3$ in an amount greater than or equal to 0.0 mol. % and less than or equal to 30.0 mol. %, greater than or equal to 15.0 mol. % and less than or equal to 30.0 mol. %, greater than or equal to 17.5 mol. % and less than or equal to 27.5 mol. %, greater than or equal to 20.0 mol. % and less than or equal to 30.0 mol. %, greater than or equal to 20.0 mol. % and less than or equal to 27.5 mol. %, greater than or equal to 21.0 mol. % and less than or equal to 26.25 mol. %, greater than or equal to 23.51 mol. % and less than or equal to 25.54 mol. %, greater than or equal to 0.0 mol. % and less than or equal to 35.0 mol. %, greater than or equal to 0.0 mol. % and less than or equal to 5.0 mol. %, greater than or equal to 5.0 mol. % and less than or equal to 20.0 mol. %, greater than or equal to 20.0 mol. % and less than or equal to 25.0 mol. %, greater than or equal to 25.0 mol. % and less than or equal to 25.5 mol. %, greater than or equal to 25.5 mol. % and less than or equal to 35.0 mol. %, greater than or equal to 25.5 mol. % and less than or equal to 26.25 mol. %, greater than or equal to 26.25 mol. % and less than or equal to 27.5 mol. %.

In embodiments, the glass composition may contain yttria ($Y_2O_3$) in an amount from greater than or equal to 0.0 mol. % to less than or equal to 10.0 mol. % and all ranges and sub-ranges between the foregoing values. In some embodiments, the glass composition may contain $Y_2O_3$ in an amount greater than or equal to 0.0 mol. %, greater than or equal to 0.5 mol. %, greater than or equal to 0.75 mol. %, greater than or equal to 1.0 mol. %, greater than or equal to 5.0 mol. %, greater than or equal to 7.0 mol. %, greater than or equal to 8.0 mol. %, or greater than or equal to 9.0 mol.

%. In some other embodiments, the glass composition may contain $Y_2O_3$ in an amount less than or equal to 10.0 mol. %, less than or equal to 9.0 mol. %, less than or equal to 8.0 mol. %, less than or equal to 7.5 mol. %, less than or equal to 7.0 mol. %, less than or equal to 6.7 mol. %, less than or equal to 6.25 mol. %, less than or equal to 6.0 mol. %, less than or equal to 5.5 mol. %, less than or equal to 5.0 mol. %, less than or equal to 4.6 mol. %, or less than or equal to 3.0 mol. %. In some more embodiments, the glass composition may contain $Y_2O_3$ in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.7 mol. %, greater than or equal to 0.0 mol. % and less than or equal to 6.0 mol. %, greater than or equal to 0.0 mol. % and less than or equal to 5.0 mol. %, greater than or equal to 0.0 mol. % and less than or equal to 4.6 mol. %, greater than or equal to 0.5 mol. % and less than or equal to 6.25 mol. %, greater than or equal to 0.75 mol. % and less than or equal to 5.5 mol. %, greater than or equal to 0.89 mol. % and less than or equal to 3.43 mol. %, greater than or equal to 0.0 mol. % and less than or equal to 3.0 mol. %, greater than or equal to 3.0 mol. % and less than or equal to 4.6 mol. %, greater than or equal to 4.6 mol. % and less than or equal to 10.0 mol. %, greater than or equal to 4.6 mol. % and less than or equal to 5.0 mol. %, greater than or equal to 5.0 mol. % and less than or equal to 10.0 mol. %, greater than or equal to 5.0 mol. % and less than or equal to 5.5 mol. %, greater than or equal to 5.5 mol. % and less than or equal to 10.0 mol. %.

In embodiments, the glass composition may contain gadolinium oxide ($Gd_2O_3$) in an amount from greater than or equal to 0.0 mol. % to less than or equal to 5.0 mol. % and all ranges and sub-ranges between the foregoing values. In some other embodiments, the glass composition may contain $Gd_2O_3$ in an amount less than or equal to 5.0 mol. %, less than or equal to 2.5 mol. %, less than or equal to 2.0 mol. %, less than or equal to 1.5 mol. %, less than or equal to 1.35 mol. %, less than or equal to 1.2 mol. %, or less than or equal to 0.42 mol. %. In some more embodiments, the glass composition may contain $Gd_2O_3$ in an amount greater than or equal to 0.0 mol. % and less than or equal to 2.0 mol. %, greater than or equal to 0.0 mol. % and less than or equal to 1.5 mol. %, greater than or equal to 0.0 mol. % and less than or equal to 1.35 mol. %, greater than or equal to 0.0 mol. % and less than or equal to 1.2 mol. %, greater than or equal to 0.29 mol. % and less than or equal to 0.42 mol. %, greater than or equal to 0.0 mol. % and less than or equal to 5.0 mol. %, greater than or equal to 0.0 mol. % and less than or equal to 0.42 mol. %.

In embodiments, the glass composition may contain ytterbia ($Yb_2O_3$) in an amount from greater than or equal to 0.0 mol. % to less than or equal to 5.0 mol. % and all ranges and sub-ranges between the foregoing values. In some other embodiments, the glass composition may contain $Yb_2O_3$ in an amount less than or equal to 5.0 mol. %, less than or equal to 2.5 mol. %, less than or equal to 1.0 mol. %, less than or equal to 0.9 mol. %, or less than or equal to 0.8 mol. %. In some more embodiments, the glass composition may contain $Yb_2O_3$ in an amount greater than or equal to 0.0 mol. % and less than or equal to 1.0 mol. %, greater than or equal to 0.0 mol. % and less than or equal to 0.9 mol. %, greater than or equal to 0.0 mol. % and less than or equal to 0.8 mol. %, greater than or equal to 0.0 mol. % and less than or equal to 5.0 mol. %.

Glass composition may include divalent metal oxides (RO). Divalent metal oxides, such as alkaline earth metal oxides (BeO, MgO, CaO, SrO and BaO), zinc oxide (ZnO), cadmium oxide (CdO), lead oxide (PbO) and others, being added to a glass, provide comparably high refractive indexes, greater than those for most of monovalent oxides. Some divalent metal oxides, such as, for example, CaO, SrO and ZnO, also provide comparably low density, therefore, increasing the ratio of the refractive index to density and, accordingly, improving the performance of optical glasses in certain applications. In addition, divalent metal oxides may help to increase the solubility of high index components, such as $TiO_2$, $Nb_2O_5$ and $WO_3$, which indirectly leads to a further increase in the refractive index at a comparable density. Also, some divalent metal oxides, such as, for example, ZnO and MgO, provide comparably low thermal expansion coefficient, which may reduce the thermal stresses formed in the glass articles when cooling and, therefore, improve the quality of the glass articles. However, when added at high amounts, divalent metal oxides may cause crystallization of refractory minerals from the melts or liquid-liquid phase separation, which may reduce the glass-forming ability of glasses. Also, some divalent metal oxides, such as, for example, PbO and CdO, may cause some ecological concern. Accordingly, the amount of divalent metal oxides in glass compositions of the present disclosure is limited.

In some embodiments, the glass composition may contain divalent metal oxides RO in an amount greater than or equal to 0.0 mol. %, greater than or equal to 10.0 mol. %, or greater than or equal to 20.0 mol. %. In some other embodiments, the glass composition may contain divalent metal oxides RO in an amount less than or equal to 25.0 mol. %, less than or equal to 20.0 mol. %, or less than or equal to 10.0 mol. %. In some more embodiments, the glass composition may contain RO in an amount greater than or equal to 0.0 mol. % and less than or equal to 25.0 mol. %, greater than or equal to 0.0 mol. % and less than or equal to 20.0 mol. %, or greater than or equal to 0.0 mol. % and less than or equal to 10.0 mol. %, greater than or equal to 10.0 mol. % and less than or equal to 25.0 mol. %, or greater than or equal to 10.0 mol. % and less than or equal to 20.0 mol. %.

Glass composition may include calcium oxide (CaO). Calcium oxide provides the highest ratio of the refractive index to density of glasses among the known monovalent and divalent metal oxides. Also, in some embodiments, CaO may help to increase the solubility of $Nb_2O_5$ and $TiO_2$, which additionally contributes to an increase in refractive index at comparably low density. However, if the amount of CaO in a glass is too high, it may cause crystallization of refractory species, such as calcium titanates ($CaTiO_3$, $CaTi_2O_5$, etc.) calcium niobate ($CaNb_2O_6$), calcium meta-silicate ($CaSiO_3$) and others, which may reduce the viscosity at the liquidus temperature and, therefore, increase the critical cooling rate, which may cause crystallization of the glass-forming melt when cooling. That is why the amount of CaO in glasses of the present disclosure is limited, or glasses may be substantially free of CaO. In embodiments, the glass composition may contain calcium oxide (CaO) in an amount from greater than or equal to 0.0 mol. % to less than or equal to 20.0 mol. % and all ranges and sub-ranges between the foregoing values. In some embodiments, the glass composition may contain CaO in an amount greater than or equal to 0.0 mol. %, greater than or equal to 2.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain CaO in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 9.0 mol. %, less than or equal to 8.0 mol. %, less than or equal to 6.5 mol. %, less than or equal to 6.0 mol. %, or less than or equal to 5.0 mol. %. In some more embodiments, the glass composition may contain CaO in an amount greater than or equal to 0.0 mol. % and less than or equal to 20.0 mol. %, greater than or equal to 0.0 mol. % and less than or equal to 10.0 mol. %, greater than or equal to 0.0 mol. % and less than or equal to 9.0 mol. %, greater than or equal to 0.0 mol. % and less than or equal to 8.0 mol. %, greater than or equal to 0.0 mol. % and less than or equal to 6.5 mol. %, greater than or equal to 1.99 mol. % and less than or equal to 6.49 mol. %, greater than or equal to 0.0 mol. % and less than or equal to 5.0 mol. %, greater than or equal to 5.0 mol. % and less than or equal to 20.0 mol. %, greater than or equal to 5.0 mol. % and less than or equal to 6.0 mol. %, greater than or equal to 6.0 mol. % and less than or equal to 20.0 mol. %, greater than or equal to 6.5 mol. % and less than or equal to 20.0 mol. %, greater than or equal to 8.0 mol. % and less than or equal to 9.0 mol. %.

Glass composition may include barium oxide (BaO). Barium oxide may increase the solubility of high index raisers components, such as $TiO_2$ and $Nb_2O_5$, which may indirectly lead to a further increase in the refractive index at comparably low density. However, barium is a heavy element and, being added in a high amount, may increase the density of glass. Also, in high concentration, it may cause crystallization of such minerals as barium titanate ($BaTiO_3$), barium niobate ($BaNb_2O_6$) and others. Accordingly, the amount of BaO in glasses of the present disclosure is limited, or glasses may be substantially free of BaO. In embodiments, the glass composition may contain barium oxide (BaO) in an amount from greater than or equal to 0.0 mol. % to less than or equal to 10.0 mol. % and all ranges and sub-ranges between the foregoing values. In some embodiments, the glass composition may contain BaO in an amount greater than or equal to 0.0 mol. %, greater than or equal to 2.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain BaO in an amount less than or equal to 10.0 mol. %, less than or equal to 9.0 mol. %, less than or equal to 8.0 mol. %, less than or equal to 7.5 mol. %, less than or equal to 7.0 mol. %, less than or equal to 6.5 mol. %, less than or equal to 6.0 mol. %, less than or equal to 5.5 mol. %, less than or equal to 5.0 mol. %, or less than or equal to 3.0 mol. %. In some more embodiments, the glass composition may contain BaO in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 5.5 mol. %, greater than or equal to 0.0 mol. % and less than or equal to 3.0 mol. %, greater than or equal to 1.5 mol. % and less than or equal to 6.48 mol. %, greater than or equal to 3.0 mol. % and less than or equal to 5.0 mol. %, greater than or equal to 5.5 mol. % and less than or equal to 10.0 mol. %, greater than or equal to 5.5 mol. % and less than or equal to 6.0 mol. %, greater than or equal to 6.0 mol. % and less than or equal to 6.5 mol. %.

Glass composition may include zinc oxide (ZnO). Zinc oxide provides a good refractive index to density ratio and may sometimes increase the solubility of titania, which indirectly increases the refractive index of glasses. However, it was found that in some embodiments, at high concentrations of ZnO, the glass-forming ability of the melt decreases and the melt may tend to crystallize during cooling. In embodiments, the glass composition may contain zinc oxide (ZnO) in an amount from greater than or equal to 0.0 mol. % to less than or equal to 10.0 mol. % and all ranges and sub-ranges between the foregoing values. In some embodiments, the glass composition may contain ZnO in an amount greater than or equal to 0.0 mol. %, greater than or equal to 0.3 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain ZnO in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 4.0 mol. %, less than or equal to 3.5 mol. %, less than or equal to 3.0 mol. %, less than or equal to 2.7 mol. %, less than or equal to 2.5 mol. %, less than or equal to 2.3 mol. %, or less than or equal to 0.1 mol. %. In some more embodiments, the glass composition may contain ZnO in an amount greater than or equal to 0.0 mol. % and less than or equal to 4.0 mol. %, greater than or equal to 0.0 mol. % and less than or equal to 3.5 mol. %, greater than or equal to 0.0 mol. % and less than or equal to 3.0 mol. %, greater than or equal to 0.0 mol. % and less than or equal to 2.7 mol. %, greater than or equal to 0.0 mol. % and less than or equal to 2.5 mol. %, greater than or equal to 0.0 mol. % and less than or equal to 0.1 mol. %, greater than or equal to 0.31 mol. % and less than or equal to 2.32 mol. %, greater than or equal to 0.0 mol. % and less than or equal to 10.0 mol. %, greater than or equal to 0.1 mol. % and less than or equal to 10.0 mol. %, greater than or equal to 2.3 mol. % and less than or equal to 2.5 mol. %, greater than or equal to 2.5 mol. % and less than or equal to 2.7 mol. %, greater than or equal to 2.7 mol. % and less than or equal to 3.0 mol. %.

Glass composition may include strontium oxide (SrO). In some glasses, SrO, like CaO, may improve the solubility of the index raisers. However, SrO provides a somewhat greater density at comparable refractive indices than CaO. Accordingly, the amount of SrO in glasses of the present disclosure is limited, or glasses may be substantially free of SrO. In embodiments, the glass composition may contain strontium oxide (SrO) in an amount from greater than or equal to 0.0 mol. % to less than or equal to 5.0 mol. % and all ranges and sub-ranges between the foregoing values. In some other embodiments, the glass composition may contain SrO in an amount less than or equal to 5.0 mol. %, less than or equal to 2.5 mol. %, less than or equal to 1.0 mol. %, less than or equal to 0.9 mol. %, less than or equal to 0.8 mol. %, or less than or equal to 0.05 mol. %. In some more embodiments, the glass composition may contain SrO in an amount greater than or equal to 0.0 mol. % and less than or equal to 1.0 mol. %, greater than or equal to 0.0 mol. % and less than or equal to 0.9 mol. %, greater than or equal to 0.0 mol. % and less than or equal to 0.8 mol. %, greater than or equal to 0.03 mol. % and less than or equal to 0.05 mol. %, greater than or equal to 0.0 mol. % and less than or equal to 5.0 mol. %, greater than or equal to 0.0 mol. % and less than or equal to 0.05 mol. %.

Glass composition may include monovalent metal oxides ($R_2O$). Monovalent metal oxides, such as alkali metal oxides ($Li_2O$, $Na_2O$, $K_2O$, $Rb_2O$ and $Cs_2O$) or others (for example, $Ag_2O$ or $Tl_2O$) may help to better accommodate the index raisers, such as $TiO_2$, $Nb_2O_5$ or $WO_3$, in the glass structure, which may cause increasing their solubility in a glass and, accordingly, indirectly cause increasing the refractive index at an acceptably low density.

In some embodiments, the glass composition may contain monovalent metal oxides $R_2O$ in an amount greater than or equal to 0.0 mol. %, greater than or equal to 10.0 mol. %, or greater than or equal to 20.0 mol. %. In some other embodiments, the glass composition may contain monovalent metal oxides $R_2O$ in an amount less than or equal to 25.0 mol. %, less than or equal to 20.0 mol. %, or less than or equal to 10.0 mol. %. In some more embodiments, the glass composition may contain $R_2O$ in an amount greater than or equal to 0.0 mol. % and less than or equal to 25.0 mol. %, greater than or equal to 0.0 mol. % and less than or equal to 20.0 mol. %, or greater than or equal to 0.0 mol. % and less than or equal to 10.0 mol. %, greater than or equal to 10.0 mol. % and less than or equal to 25.0 mol. %, or greater than or equal to 10.0 mol. % and less than or equal to 20.0 mol. %.

Glass composition may include alumina ($Al_2O_3$). Alumina may increase the viscosity of glass-forming melts at high temperature, which may reduce the critical cooling rate and improve the glass-forming ability. However, addition of $Al_2O_3$ may cause crystallization of refractory minerals, such as aluminum titanate ($Al_2TiO_5$), aluminum niobate (Al-$NbO_4$) and others, in the melts when cooling or lower the solubility of $ZrO_2$ in the liquid, causing an increase in the liquidus temperature. Accordingly, the amount of $Al_2O_3$ in glasses of the present disclosure is limited, or glasses may be substantially free of $Al_2O_3$. In embodiments, the glass composition may contain alumina ($Al_2O_3$) in an amount from greater than or equal to 0.0 mol. % to less than or equal to 10.0 mol. % and all ranges and sub-ranges between the foregoing values. In some embodiments, the glass composition may contain $Al_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Al_2O_3$ in an amount less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $Al_2O_3$ in an amount greater than or equal to 0.0 mol. % and less than or equal to 10.0 mol. %, greater than or equal to 0.0 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include molybdenum oxide ($MoO_3$). Adding $MoO_3$ to a glass composition may increase the refractive index at a low density but can cause undesirable coloring. For that reason, the content of $MoO_3$ is limited. In embodiments, the glass composition may contain molybdenum oxide ($MoO_3$) in an amount from greater than or equal to 0.0 mol. % to less than or equal to 10.0 mol. % and all ranges and sub-ranges between the foregoing values. In some embodiments, the glass composition may contain $MoO_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $MoO_3$ in an amount less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $MoO_3$ in an amount greater than or equal to 0.0 mol. % and less than or equal to 5.0 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include tellurium oxide ($TeO_2$). Tellurium oxide generally works like bismuth oxide described in this disclosure; in addition, $TeO_2$ is very expensive. Accordingly, the content of tellurium oxide should be limited, or glass compositions may be free of $TeO_2$. In embodiments, the glass composition may contain tellurium oxide ($TeO_2$) in an amount from greater than or equal to 0.0 mol. % to less than or equal to 20.0 mol. % and all ranges and sub-ranges between the foregoing values. In some embodiments, the glass composition may contain $TeO_2$ in an amount greater than or equal to 0.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $TeO_2$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 5.0 mol. %, or less than or equal to 2.0 mol. %. In some more embodiments, the glass composition may contain $TeO_2$ in an amount greater than or equal to 0.0 mol. % and less than or equal to 20.0 mol. %, greater than or equal to 0.0 mol. % and less than or equal to 2.0 mol. %, greater than or equal to 2.0 mol. % and less than or equal to 20.0 mol. %, greater than or equal to 2.0 mol. % and less than or equal to 5.0 mol. %, greater than or equal to 5.0 mol. % and less than or equal to 20.0 mol. %, greater than or equal to 5.0 mol. % and less than or equal to 10.0 mol. %, greater than or equal to 10.0 mol. % and less than or equal to 20.0 mol. %, greater than or equal to 10.0 mol. % and less than or equal to 14.0 mol. %, greater than or equal to 14.0 mol. % and less than or equal to 20.0 mol. %, greater than or equal to 14.0 mol. % and less than or equal to 16.0 mol. %.

Glass composition may include vanadia ($V_2O_5$). Vanadia provides the highest ratio of the refractive index to density among all oxides. However, vanadia may cause undesirable dark coloring and may also raise environmental concerns. For these reasons, the content of vanadia in the glasses of the present disclosure is limited, or glass compositions may be free of $V_2O_5$. In embodiments, the glass composition may contain vanadia ($V_2O_5$) in an amount from greater than or equal to 0.0 mol. % to less than or equal to 10.0 mol. % and all ranges and sub-ranges between the foregoing values. In some embodiments, the glass composition may contain $V_2O_5$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $V_2O_5$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 4.0 mol. %, or less than or equal to 0.1 mol. %. In some more embodiments, the glass composition may contain $V_2O_5$ in an amount greater than or equal to 0.0 mol. % and less than or equal to 4.0 mol. %, greater than or equal to 0.0 mol. % and less than or equal to 0.1 mol. %, greater than or equal to 0.0 mol. % and less than or equal to 10.0 mol. %, greater than or equal to 0.1 mol. % and less than or equal to 10.0 mol. %, greater than or equal to 0.1 mol. % and less than or equal to 4.0 mol. %, greater than or equal to 4.0 mol. % and less than or equal to 10.0 mol. %, greater than or equal to 4.0 mol. % and less than or equal to 5.0 mol. %, greater than or equal to 5.0 mol. % and less than or equal to 10.0 mol. %, greater than or equal to 5.0 mol. % and less than or equal to 7.0 mol. %.

Glass composition may include gallia ($Ga_2O_3$). Gallium oxide plays a role similar to $Al_2O_3$, increasing the viscosity, but with lower impact on liquidus temperature, which may allow to increase the liquidus viscosity and, therefore, improve the glass forming ability of glasses. However, gallia is expensive, and its addition adversely increase the cost of batch. Accordingly, the amount of $Ga_2O_3$ in glasses of the present disclosure is limited, or glasses may be substantially free of $Ga_2O_3$. In embodiments, the glass composition may contain gallia ($Ga_2O_3$) in an amount from greater than or equal to 0.0 mol. % to less than or equal to 10.0 mol. % and all ranges and sub-ranges between the foregoing values. In some embodiments, the glass composition may contain $Ga_2O_3$ in an amount greater than or equal to 0.0 mol. %, or greater than or equal to 5.0 mol. %. In some other embodiments, the glass composition may contain $Ga_2O_3$ in an amount less than or equal to 10.0 mol. %, less than or equal to 8.0 mol. %, less than or equal to 7.5 mol. %, or less than or equal to 5.0 mol. %. In some more embodiments, the glass composition may contain $Ga_2O_3$ in an amount greater than or equal to 0.0 mol. % and less than or equal to 10.0 mol. %, greater than or equal to 0.0 mol. % and less than or equal to 8.0 mol. %, greater than or equal to 0.0 mol. % and less than or equal to 7.5 mol. %, greater than or equal to 0.0 mol. % and less than or equal to 5.0 mol. %, greater than or equal to 5.0 mol. % and less than or equal to 10.0 mol. %, greater than or equal to 5.0 mol. % and less than or equal to 7.5 mol. %.

Glass composition may include tantalum oxide ($Ta_2O_5$). Tantalum oxide increases the refractive index while maintaining an acceptable density without reducing the blue transmittance. However, when added to a glass composition, sometimes even in small amounts, $Ta_2O_5$ may cause crystallization of refractory minerals. Accordingly, the content of tantalum oxide should be limited, or glass compositions may be free of $Ta_2O_5$. In embodiments, the glass composition may contain tantalum oxide ($Ta_2O_5$) in an amount from greater than or equal to 0.0 mol. % to less than or equal to 5.0 mol. % and all ranges and sub-ranges between the foregoing values. In some other embodiments, the glass composition may contain $Ta_2O_5$ in an amount less than or equal to 5.0 mol. %, less than or equal to 2.5 mol. %, less than or equal to 2.0 mol. %, or less than or equal to 1.0 mol. %. In some more embodiments, the glass composition may contain $Ta_2O_5$ in an amount greater than or equal to 0.0 mol. % and less than or equal to 2.0 mol. %, greater than or equal to 0.0 mol. % and less than or equal to 1.0 mol. %, greater than or equal to 0.0 mol. % and less than or equal to 5.0 mol. %.

Glass composition may include bismuth oxide ($Bi_2O_3$). $Bi_2O_3$ provides very high refractive index but leads to increase in density. However, it may decrease the viscosity of melts at high temperatures, which may cause crystallization of the melts when cooling. Accordingly, the content of bismuth oxide should be limited, or glass compositions may be free of $Bi_2O_3$. In embodiments, the glass composition may contain bismuth oxide ($Bi_2O_3$) in an amount from greater than or equal to 0.0 mol. % to less than or equal to 20.0 mol. % and all ranges and sub-ranges between the foregoing values. In some embodiments, the glass composition may contain $Bi_2O_3$ in an amount greater than or equal to 0.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $Bi_2O_3$ in an amount less than or equal to 20.0 mol. %, less than or equal to 18.0 mol. %, less than or equal to 16.0 mol. %, less than or equal to 14.0 mol. %, less than or equal to 10.0 mol. %, or less than or equal to 5.0 mol. %. In some more embodiments, the glass composition may contain $Bi_2O_3$ in an amount greater than or equal to 0.0 mol. % and less than or equal to 20.0 mol. %, greater than or equal to 0.0 mol. % and less than or equal to 5.0 mol. %, greater than or equal to 5.0 mol. % and less than or equal to 20.0 mol. %, greater than or equal to 5.0 mol. % and less than or equal to 10.0 mol. %, greater than or equal to 10.0 mol. % and less than or equal to 20.0 mol. %, greater than or equal to 10.0 mol. % and less than or equal to 14.0 mol. %, greater than or equal to 14.0 mol. % and less than or equal to 20.0 mol. %, greater than or equal to 14.0 mol. % and less than or equal to 16.0 mol. %, greater than or equal to 16.0 mol. % and less than or equal to 20.0 mol. %, greater than or equal to 16.0 mol. % and less than or equal to 18.0 mol. %.

Glass composition may include tungsten oxide ($WO_3$). $WO_3$ provides high refractive index without significantly increasing density or causing undesirable coloring. Also, it was empirically found that addition of $WO_3$ to glass composition may decrease the liquidus temperature, which allows melting such glasses at lower temperatures, that, in turn, may increase the transmittance of such glasses. Also, addition of $WO_3$ may decrease the glass transition temperature $T_g$, which allows forming these glasses at lower temperatures. At high concentrations of $WO_3$, the liquidus temperature tends to increase, and the viscosity at the liquidus temperature drops, making it difficult to avoid crystallization of melts when cooling. Accordingly, the content of $WO_3$ should be limited, or glass compositions may be free of $WO_3$. In embodiments, the glass composition may contain tungsten oxide ($WO_3$) in an amount from greater than or equal to 0.0 mol. % to less than or equal to 5.0 mol. % and all ranges and sub-ranges between the foregoing values. In some other embodiments, the glass composition may contain $WO_3$ in an amount less than or equal to 5.0 mol. %, less than or equal to 2.5 mol. %, less than or equal to 2.0 mol. %, less than or equal to 1.8 mol. %, less than or equal to 1.6 mol. %, or less than or equal to 1.0 mol. %. In some more embodiments, the glass composition may contain $WO_3$ in an amount greater than or equal to 0.0 mol. % and less than or equal to 2.0 mol. %, greater than or equal to 0.0 mol. % and less than or equal to 1.8 mol. %, greater than or equal to 0.0 mol. % and less than or equal to 1.6 mol. %, greater than or equal to 0.0 mol. % and less than or equal to 1.0 mol. %, greater than or equal to 0.0 mol. % and less than or equal to 5.0 mol. %.

Glass composition may include zirconia ($ZrO_2$). Zirconia can increase the refractive index while maintaining an acceptably low density. $ZrO_2$ can also increase the viscosity of the melt, which may help to protect the melt from crystallization. $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon ($ZrSiO_4$), calcium zirconate ($CaZrO_3$) and others, which may decrease the glass forming ability of the melt. In embodiments, the glass composition may contain zirconia ($ZrO_2$) in an amount from greater than or equal to 0.0 mol. % to less than or equal to 11.0 mol. % and all ranges and sub-ranges between the foregoing values. In some embodiments, the glass composition may contain $ZrO_2$ in an amount greater than or equal to 0.0 mol. %, greater than or equal to 1.0 mol. %, greater than or equal to 4.0 mol. %, greater than or equal to 5.0 mol. %, greater than or equal to 5.3 mol. %, greater than or equal to 5.6 mol. %, greater than or equal to 6.5 mol. %, greater than or equal to 7.3 mol. %, greater than or equal to 8.0 mol. %, greater than or equal to 9.0 mol. %, or greater than or equal to 10.0 mol. %. In some other embodiments, the glass composition may contain $ZrO_2$ in an amount less than or equal to 11.0 mol. %, less than or equal to 10.0 mol. %, less than or equal to 9.0 mol. %, less than or equal to 8.1 mol. %, less than or equal to 8.0 mol. %, less than or equal to 5.0 mol. %, or less than or equal to 1.0 mol. %. In some more embodiments, the glass composition may contain $ZrO_2$ in an amount greater than or equal to 0.0 mol. % and less than or equal to 10.0 mol. %, greater than or equal to 4.0 mol. % and less than or equal to 9.0 mol. %, greater than or equal to 5.3 mol. % and less than or equal to 8.1 mol. %, greater than or equal to 5.6 mol. % and less than or equal to 8.0 mol. %, greater than or equal to 6.5 mol. % and less than or equal to 8.0 mol. %, greater than or equal to 7.34 mol. % and less than or equal to 7.98 mol. %, greater than or equal to 0.0 mol. % and less than or equal to 11.0 mol. %, greater than or equal to 1.0 mol. % and less than or equal to 5.0 mol. %, greater than or equal to 5.0 mol. % and less than or equal to 8.0 mol. %, greater than or equal to 8.0 mol. % and less than or equal to 8.1 mol. %, greater than or equal to 9.0 mol. % and less than or equal to 10.0 mol. %.

Glass composition may include Hafnium oxide ($HfO_2$). Hafnium oxide generally works like zirconium oxide described in this disclosure; in addition, $HfO_2$ is expensive. Accordingly, the content of hafnium oxide should be limited, or glass compositions may be free of $HfO_2$. In embodiments, the glass composition may contain Hafnia ($HfO_2$) in an amount from greater than or equal to 0.0 mol. % to less than or equal to 11.0 mol. % and all ranges and sub-ranges between the foregoing values. In some embodiments, the glass composition may contain $HfO_2$ in an amount greater than or equal to 0.0 mol. %, greater than or equal to 1.0 mol. %, greater than or equal to 4.0 mol. %, greater than or equal to 5.0 mol. %, greater than or equal to 5.3 mol. %, greater than or equal to 5.6 mol. %, greater than or equal to 6.5 mol. %, greater than or equal to 7.3 mol. %, greater than or equal to 8.0 mol. %, greater than or equal to 9.0 mol. %, or greater than or equal to 10.0 mol. %. In some other embodiments, the glass composition may contain $HfO_2$ in an amount less than or equal to 11.0 mol. %, less than or equal to 10.0 mol. %, less than or equal to 9.0 mol. %, less than or equal to 8.1 mol. %, less than or equal to 8.0 mol. %, less than or equal to 5.0 mol. %, or less than or equal to 1.0 mol. %. In some more embodiments, the glass composition may contain $HfO_2$ in an amount greater than or equal to 0.0 mol. % and less than or equal to 10.0 mol. %, greater than or equal to 4.0 mol. % and less than or equal to 9.0 mol. %, greater than or equal to 5.3 mol. % and less than or equal to 8.1 mol. %, greater than or equal to 5.6 mol. % and less than or equal to 8.0 mol. %, greater than or equal to 6.5 mol. % and less than or equal to 8.0 mol. %, greater than or equal to 7.34 mol. % and less than or equal to 7.98 mol. %, greater than or equal to 0.0 mol. % and less than or equal to 11.0 mol. %, greater than or equal to 1.0 mol. % and less than or equal to 5.0 mol. %, greater than or equal to 5.0 mol. % and less than or equal to 8.0 mol. %, greater than or equal to 8.0 mol. % and less than or equal to 8.1 mol. %, greater than or equal to 9.0 mol. % and less than or equal to 10.0 mol. %.

Glass composition may include niobia ($Nb_2O_5$). Niobia can be used to increase the refractive index of glass while maintaining a low density. However, niobia can introduce a yellow coloring to the glass that cannot be bleached in the same manner as titania, which can result in a loss of transmittance, particularly in the blue and UV range. Niobia may cause crystallization and/or phase separation of the melt. In some embodiments, the glasses may be substantially free of $Nb_2O_5$. In embodiments, the glass composition may contain niobia ($Nb_2O_5$) in an amount from greater than or equal to 0.0 mol. % to less than or equal to 10.5 mol. % and all ranges and sub-ranges between the foregoing values. In some embodiments, the glass composition may contain $Nb_2O_5$ in an amount greater than or equal to 0.0 mol. %, greater than or equal to 1.0 mol. %, greater than or equal to 2.5 mol. %, greater than or equal to 4.0 mol. %, greater than or equal to 4.5 mol. %, greater than or equal to 5.0 mol. %, greater than or equal to 5.1 mol. %, greater than or equal to 6.09 mol. %, greater than or equal to 7.5 mol. %, greater than or equal to 8.5 mol. %, greater than or equal to 9.5 mol. %, or greater than or equal to 10.0 mol. %. In some other embodiments, the glass composition may contain $Nb_2O_5$ in an amount less than or equal to 10.5 mol. %, less than or equal to 10.0 mol. %, less than or equal to 9.5 mol. %, less than or equal to 9.25 mol. %, less than or equal to 8.6 mol. %, less than or equal to 8.5 mol. %, less than or equal to 7.5 mol. %, less than or equal to 6.7 mol. %, less than or equal to 5.0 mol. %, or less than or equal to 1.0 mol. %. In some more embodiments, the glass composition may contain $Nb_2O_5$ in an amount greater than or equal to 0.0 mol. % and less than or equal to 10.5 mol. %, greater than or equal to 0.0 mol. % and less than or equal to 6.75 mol. %, greater than or equal to 2.5 mol. % and less than or equal to 10.0 mol. %, greater than or equal to 4.0 mol. % and less than or equal to 10.0 mol. %, greater than or equal to 4.5 mol. % and less than or equal to 9.25 mol. %, greater than or equal to 5.0 mol. % and less than or equal to 6.7 mol. %, greater than or equal to 5.1 mol. % and less than or equal to 8.6 mol. %, greater than or equal to 6.09 mol. % and less than or equal to 6.77 mol. %, greater than or equal to 0.0 mol. % and less than or equal to 1.0 mol. %, greater than or equal to 7.5 mol. % and less than or equal to 10.5 mol. %, greater than or equal to 7.5 mol. % and less than or equal to 8.5 mol. %, greater than or equal to 8.5 mol. % and less than or equal to 10.5 mol. %, greater than or equal to 8.5 mol. % and less than or equal to 8.6 mol. %, greater than or equal to 8.6 mol. % and less than or equal to 9.25 mol. %.

Glass composition may include titania ($TiO_2$). The levels of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ is limited. In embodiments, the glass composition may contain titania ($TiO_2$) in an amount from greater than or equal to 0.0 mol. % to less than or equal to 40.0 mol. % and all ranges and sub-ranges between the foregoing values. In some embodiments, the glass composition may contain $TiO_2$ in an amount greater than or equal to 0.0 mol. %, greater than or equal to 1.0 mol. %, greater than or equal to 5.0 mol. %, greater than or equal to 20.0 mol. %, greater than or equal to 20.25 mol. %, greater than or equal to 22.0 mol. %, greater than or equal to 25.0 mol. %, greater than or equal to 30.0 mol. %, or greater than or equal to 35.0 mol. %. In some other embodiments, the glass composition may contain $TiO_2$ in an amount less than or equal to 40.0 mol. %, less than or equal to 35.0 mol. %, less than or equal to 30.0 mol. %, less than or equal to 28.0 mol. %, less than or equal to 27.5 mol. %, less than or equal to 26.0 mol. %, less than or equal to 25.5 mol. %, less than or equal to 25.2 mol. %, less than or equal to 25.0 mol. %, less than or equal to 23.0 mol. %, less than or equal to 20.0 mol. %, or less than or equal to 5.0 mol. %. In some more embodiments, the glass composition may contain $TiO_2$ in an amount greater than or equal to 0.0 mol. % and less than or equal to 25.2 mol. %, greater than or equal to 1.0 mol. % and less than or equal to 40.0 mol. %, greater than or equal to 20.0 mol. % and less than or equal to 28.0 mol. %, greater than or equal to 20.0 mol. % and less than or equal to 27.5 mol. %, greater than or equal to 20.25 mol. % and less than or equal to 26.0 mol. %, greater than or equal to 20.25 mol. % and less than or equal to 25.5 mol. %, greater than or equal to 20.47 mol. % and less than or equal to 23.3 mol. %, greater than or equal to 22.0 mol. % and less than or equal to 25.0 mol. %, greater than or equal to 0.0 mol. % and less than or equal to 40.0 mol. %, greater than or equal to 0.0 mol. % and less than or equal to 5.0 mol. %, greater than or equal to 5.0 mol. % and less than or equal to 40.0 mol. %, greater than or equal to 20.0 mol. % and less than or equal to 23.0 mol. %, greater than or equal to 23.0 mol. % and less than or equal to 25.0 mol. %, greater than or equal to 25.0 mol. % and less than or equal to 40.0 mol. %, greater than or equal to 25.0 mol. % and less than or equal to 25.2 mol. %, greater than or equal to 25.2 mol. % and less than or equal to 25.5 mol. %.

In some embodiments, the glass composition may have a sum of $CaO+SrO+BaO+Y_2O_3$ greater than or equal to 0.0 mol. %, or greater than or equal to 0.3 mol. %.

In some embodiments, the glass composition may have a sum of $La_2O_3+TiO_2+B_2O_3+SiO_2+ZrO_2+Nb_2O_5$ greater than or equal to 97.0 mol. %, greater than or equal to 98.0 mol. %, or greater than or equal to 99.0 mol. %. In some more embodiments, the glass composition may have a sum of $La_2O_3+TiO_2+B_2O_3+SiO_2+ZrO_2+Nb_2O_5$ greater than or equal to 97.0 mol. % and less than or equal to 100 mol. %.

In some embodiments, the glass composition may have a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. %, or greater than or equal to 99.5 mol. %. In some more embodiments, the glass composition may have a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ greater than or equal to 99.0 mol. % and less than or equal to 100 mol. %.

In some embodiments, the glass composition may have a sum of $La_2O_3+Y_2O_3+Gd_2O_3+TiO_2$ greater than or equal to 0.0 mol. %, or greater than or equal to 45.3 mol. %.

In some embodiments, the glass composition may have a sum of $La_2O_3+Y_2O_3+Gd_2O_3+TiO_2+B_2O_3+SiO_2+ZrO_2+Nb_2O_5$ greater than or equal to 99.0 mol. %, or greater than or equal to 99.5 mol. %. In some more embodiments, the glass composition may have a sum of $La_2O_3+Y_2O_3+Gd_2O_3+TiO_2+B_2O_3+SiO_2+ZrO_2+Nb_2O_5$ greater than or equal to 99.0 mol. % and less than or equal to 100 mol. %.

In some embodiments, the glass composition may have a sum of $La_2O_3+Y_2O_3+Gd_2O_3+TiO_2+B_2O_3+SiO_2+ZrO_2+Nb_2O_5+CaO+BaO$ greater than or equal to 99.0 mol. %, or greater than or equal to 99.5 mol. %. In some more embodiments, the glass composition may have a sum of $La_2O_3+$ $Y_2O_3+Gd_2O_3+TiO_2+B_2O_3+SiO_2+ZrO_2+Nb_2O_5+CaO+BaO$ greater than or equal to 99.0 mol. % and less than or equal to 100 mol. %.

In some embodiments, the glass composition may have a sum of $La_2O_3+Yb_2O_3+Y_2O_3+Gd_2O_3+TiO_2$ greater than or equal to 0.0 mol. %, or greater than or equal to 45.3 mol. %.

In some embodiments, the glass composition may have a sum of $Nb_2O_5+ZrO_2$ greater than or equal to 0.0 mol. %, greater than or equal to 11.0 mol. %, or greater than or equal to 12.1 mol. %.

In some embodiments, the glass composition may have a sum of $R_2O+RO$ greater than or equal to 0.0 mol. %, greater than or equal to 10.0 mol. %, or greater than or equal to 20.0 mol. %. In some other embodiments, the glass composition may have a sum of $R_2O+RO$ less than or equal to 25.0 mol. %, less than or equal to 20.0 mol. %, less than or equal to 10.0 mol. %, less than or equal to 6.0 mol. %, or less than or equal to 1.0 mol. %. In some more embodiments, the glass composition may have a sum of $R_2O+RO$ greater than or equal to 0.0 mol. % and less than or equal to 25.0 mol. %, greater than or equal to 0.0 mol. % and less than or equal to 6.0 mol. %, greater than or equal to 0.0 mol. % and less than or equal to 1.0 mol. %, greater than or equal to 0.0 mol. % and less than or equal to 20.0 mol. %, greater than or equal to 0.0 mol. % and less than or equal to 10.0 mol. %, greater than or equal to 10.0 mol. % and less than or equal to 25.0 mol. %, or greater than or equal to 10.0 mol. % and less than or equal to 20.0 mol. %.

In some embodiments, the glass composition may have a sum of $SiO_2+B_2O_3$ greater than or equal to 0.0 mol. %, greater than or equal to 10.0 mol. %, or greater than or equal to 20.0 mol. %. In some other embodiments, the glass composition may have a sum of $SiO_2+B_2O_3$ less than or equal to 34.0 mol. % or less than or equal to 20.0 mol. %. In some more embodiments, the glass composition may have a sum of $SiO_2+B_2O_3$ greater than or equal to 0.0 mol. % and less than or equal to 34.0 mol. %, or greater than or equal to 0.0 mol. % and less than or equal to 20.0 mol. %, greater than or equal to 10.0 mol. % and less than or equal to 34.0 mol. %, or greater than or equal to 10.0 mol. % and less than or equal to 20.0 mol. %.

In some embodiments, the glass composition may have a sum of $SiO_2+B_2O_3+P_2O_5$ greater than or equal to 0.0 mol. %, or greater than or equal to 10.0 mol. %.

In some embodiments, glass composition may have limitations for a difference $B_2O_3-SiO_2$. It was empirically found that when the content of $B_2O_3$ significantly exceeds the content of $SiO_2$ in a glass of the present disclosure, chemical durability of glass may worsen and a glass forming melt may sometimes tend to liquid-liquid phase separation. For that reason, in some embodiments the difference $(B_2O_3-SiO_2)$ is limited. In some other embodiments, the glass may have a difference $B_2O_3-SiO_2$ less than or equal to 7.0 mol. %.

In some embodiments, glass composition may have limitations for a ratio $SiO_2/(SiO_2+B_2O_3)$. It was empirically found that $SiO_2$ and $B_2O_3$, when being presented together in a glass composition, may improve the glass forming ability of a melt and protect it from the liquid-liquid phase separation. Higher values of the ratio $SiO_2/(SiO_2+B_2O_3)$ may help to improve the chemical durability, whereas lower values of this ratio may improve the solubility of the high index components. In some embodiments, the glass may have a ratio $SiO_2/(SiO_2+B_2O_3)$ in mol. % greater than or equal to 0.0, greater than or equal to 0.38, or greater than or equal to 0.5. In some other embodiments, the glass may have a ratio $SiO_2/(SiO_2+B_2O_3)$ in mol. % less than or equal to 0.75, less than or equal to 0.5, or less than or equal to 0.4.

In some more embodiments, the glass may have a $SiO_2/(SiO_2+B_2O_3)$ in mol. % greater than or equal to 0.0 and less than or equal to 0.4, greater than or equal to 0.38 and less than or equal to 0.75, greater than or equal to 0.0 and less than or equal to 0.75, greater than or equal to 0.0 and less than or equal to 0.5, greater than or equal to 0.38 and less than or equal to 0.5, or greater than or equal to 0.38 and less than or equal to 0.4.

In some embodiments, glass composition may have limitations for a difference $TiO_2-B_2O_3$. As far as $TiO_2$ provides high refractive index at low density and $B_2O_3$ provides low refractive index, a high value of the difference $(TiO_2-B_2O_3)$ indirectly indicates a good relationship between the refractive index and density at others being similar. In some embodiments, the glass may have a difference $TiO_2-B_2O_3$ greater than or equal to −6.0 mol. %.

In some embodiments, glass composition may have limitations for a difference $TiO_2-La_2O_3$. Both $TiO_2$ and $La_2O_3$ provide high refractive indexes. However, $La_2O_3$ provides higher blue transmittance than $TiO_2$. Accordingly, a low (including negative) value of the difference $(TiO_2-La_2O_3)$ indirectly indicates potentially higher blue transmittance at a given value of the refractive index. In some other embodiments, the glass may have a difference $TiO_2-La_2O_3$ less than or equal to 5.0 mol. %.

In some embodiments, glass composition may have limitations for a difference $Y_2O_3-Gd_2O_3$. Yttria and gadolinia can be used as alternatives for $La_2O_3$. When using them, yttria provides lower density than gadolinia. Therefore, in order to reduce the density, it is preferable to add yttria, rather than gadolinia. In some embodiments, the glass may have a difference $Y_2O_3-Gd_2O_3$ greater than or equal to −2.0 mol. %.

In some embodiments, glass composition may have limitations for a difference $SiO_2+B_2O_3-TiO_2$. The difference $(SiO_2+B_2O_3-TiO_2)$ indirectly characterizes the tradeoff between the glass forming ability, which increases when adding $SiO_2$ and $B_2O_3$, and the blue transmittance, which reduces when adding $TiO_2$. Higher values of the difference $(SiO_2+B_2O_3-TiO_2)$ allow to improve the glass forming ability at a relatively high blue transmittance. In some embodiments, the glass may have a difference $SiO_2+B_2O_3-TiO_2$ greater than or equal to 7.05 mol. %.

In some embodiments, the glass may have the density at room temperature $d_{RT}$ from greater than or equal to 4.00 g/cm$^3$ to less than or equal to 6.00 g/cm$^3$ and all ranges and sub-ranges between the foregoing values. In some embodiments, the glass may have the density at room temperature $d_{RT}$ greater than or equal to 4.00 g/cm$^3$, greater than or equal to 4.50 g/cm$^3$, greater than or equal to 4.80 g/cm$^3$, greater than or equal to 5.00 g/cm$^3$, greater than or equal to 5.01 g/cm$^3$, greater than or equal to 5.40 g/cm$^3$, greater than or equal to 5.60 g/cm$^3$, or greater than or equal to 5.80 g/cm$^3$. In some other embodiments, the glass may have the density at room temperature $d_{RT}$ less than or equal to 6.00 g/cm$^3$, less than or equal to 5.80 g/cm$^3$, less than or equal to 5.60 g/cm$^3$, less than or equal to 5.50 g/cm$^3$, less than or equal to 5.40 g/cm$^3$, less than or equal to 5.30 g/cm$^3$, less than or equal to 5.12 g/cm$^3$, less than or equal to 5.00 g/cm$^3$, or less than or equal to 4.50 g/cm$^3$. In some more embodiments, the glass may have the density at room temperature $d_{RT}$ greater than or equal to 4.00 g/cm$^3$ and less than or equal to 6.00 g/cm$^3$, greater than or equal to 4.50 g/cm$^3$ and less than or equal to 5.50 g/cm$^3$, greater than or equal to 4.00 g/cm$^3$ and less than or equal to 4.50 g/cm$^3$, greater than or equal to 4.50 g/cm$^3$ and less than or equal to 6.00 g/cm$^3$, greater than or equal to 4.50 g/cm$^3$ and less than or equal to 5.00 g/cm$^3$, greater than or equal to 5.00 g/cm³ and less than or equal to 5.12 g/cm³, greater than or equal to 5.12 g/cm³ and less than or equal to 6.00 g/cm³, greater than or equal to 5.12 g/cm³ and less than or equal to 5.30 g/cm³, greater than or equal to 5.30 g/cm³ and less than or equal to 5.40 g/cm³.

In some embodiments, the glass may have the refractive index at 587.56 nm $n_d$ from greater than or equal to 1.950 to less than or equal to 2.070 and all ranges and sub-ranges between the foregoing values. In some embodiments, the glass may have the refractive index at 587.56 nm $n_d$ greater than or equal to 1.950, greater than or equal to 2.000, greater than or equal to 2.010, greater than or equal to 2.030, or greater than or equal to 2.050. In some other embodiments, the glass may have the refractive index at 587.56 nm $n_d$ less than or equal to 2.070, less than or equal to 2.050, less than or equal to 2.030, less than or equal to 2.010, or less than or equal to 2.000. In some more embodiments, the glass may have the refractive index at 587.56 nm $n_d$ greater than or equal to 1.950 and less than or equal to 2.070, greater than or equal to 1.950 and less than or equal to 2.000, greater than or equal to 2.000 and less than or equal to 2.070, greater than or equal to 2.000 and less than or equal to 2.010, greater than or equal to 2.010 and less than or equal to 2.070, greater than or equal to 2.010 and less than or equal to 2.030, greater than or equal to 2.030 and less than or equal to 2.070, greater than or equal to 2.030 and less than or equal to 2.050.

In some embodiments, the glass may have the liquidus temperature $T_{liq}$ less than or equal to 1260° C.

In some embodiments, the glass may have the transmittance at a wavelength of 460 nm $TX_{460\ nm}$, % greater than or equal to 85.

In some embodiments, the glass may have a quantity $n_d-(1.207+0.155*d_{RT})$ greater than or equal to 0.000.

In some embodiments, the glass may have a quantity $n_d-(1.217+0.155*d_{RT})$ greater than or equal to 0.000.

In some embodiments, the glass may have a quantity $(n_d-1)/d_{RT}-(0.196+0.0016*(TiO_2-La_2O_3))$ greater than or equal to 0.000.

In some embodiments, the glass may have a quantity $(n_d-1)/d_{RT}-(0.199+0.0016*(TiO_2-La_2O_3))$ greater than or equal to 0.000.

In some embodiments, the glass may have a quantity $(n_d-1)/d_{RT}-(0.199+0.0025*(TiO_2-La_2O_3))$ greater than or equal to 0.000.

In some embodiments, the glass may have a quantity $(n_d-1)/d_{RT}-(0.204+0.0025*(TiO_2-La_2O_3))$ greater than or equal to 0.000.

Refractive index $n_d$, density $d_{RT}$ and refraction $(n_d-1)/d_{RT}$ are properties of glass that can be predicted from the glass composition. A linear regression analysis of the Exemplary Glasses of the present disclosure in the EXAMPLES section below and other glass compositions reported in the literature was performed to determine equations that can predict the composition dependences of the refractive index $n_d$, density and refraction.

The training dataset of glass compositions satisfying the criteria specified in Table 1 below and having measured values of the properties of interest, about 100 glass compositions for each property ($(n_d$, density and refraction), was randomly selected from the literature data presented in the publicly available SciGlass Information System database and from the Exemplary Glasses from the embodiments presented herein. The linear regression analysis on the above-specified dataset was used to determine the formulas, with the exclusion of insignificant variables and outliers. The resulting formulas are presented in Table 2 below. Another part of glass compositions satisfying the same criteria was used as a validation set to evaluate the ability to interpolate within predefined compositional limits, which corresponds to the standard deviations specified in the Table 2. An external dataset of prior art glass compositions, also randomly selected from the SciGlass Information System database, was used to evaluate the ability to predict the properties outside of the specified compositional limits with a reasonable accuracy. Multiple iterations of this process were performed in order to determine the best variant for each property, corresponding to the above-mentioned regression formulas specified in the Table 2.

The data for the Comparative Glass compositions used in the linear regression modeling, including the training dataset, validation dataset and external dataset were obtained from the publically available SciGlass Information System database. Formulas (I), (II) and (III) below were obtained from the linear regression analysis and used to predict the refractive index $n_d$, density $d_{RT}$ and refraction $(n_d-1)/d_{RT}$, respectively, of the glasses:

$$
\begin{aligned}
P_n = & 1.844 + 0.0054162*La_2O_3 + 0.0031113*TiO_2 - \\
& 0.004212*B_2O_3 - 0.0035692*SiO_2 + \\
& 0.0027887*ZrO_2 + 0.0078026*Nb_2O_5 - \\
& 0.00012928*CaO + 0.00076566*BaO + \\
& 0.0043601*Y_2O_3 + 0.00067408*ZnO + \\
& 0.0068029*Gd_2O_3 - 0.0025106*Na_2O + \\
& 0.0039937*WO_3 - 0.0043208*Al_2O_3 - \\
& 0.0011666*Li_2O + 0.0051727*PbO + \\
& 0.012958*Bi_2O_3 - 0.0018753*GeO_2 - \\
& 0.0014084*TeO_2 + 0.0086647*Er_2O_3 + \\
& 0.0097345*Yb_2O_3 - 0.0038734*K_2O - \\
& 0.00041776*SrO - 0.0017294*MgO,
\end{aligned}
\tag{I}
$$

$$
\begin{aligned}
P_d(g/cm^3) = & 4.276 + 0.058714*La_2O_3 - \\
& 0.0077783*TiO_2 - 0.023741*B_2O_3 - \\
& 0.018272*SiO_2 + 0.010913*ZrO_2 - \\
& 0.0014478*CaO + 0.023857*BaO + \\
& 0.033560*Y_2O_3 + 0.010174*ZnO + \\
& 0.082094*Gd_2O_3 - 0.008237*Na_2O + \\
& 0.035497*WO_3 - 0.031171*Al_2O_3 - \\
& 0.0080004*Li_2O + 0.051830*PbO + \\
& 0.10437*Bi_2O_3 - 0.012816*GeO_2 - \\
& 0.0065609*TeO_2 + 0.10060*Er_2O_3 + \\
& 0.10637*Yb_2O_3 - 0.017097*K_2O + \\
& 0.009821*SrO - 0.0037906*MgO,
\end{aligned}
\tag{II}
$$

$$
\begin{aligned}
P_{ref}(cm^3/g) = & 0.201656 + 0.00018225*B_2O_3 - \\
& 0.0010873*BaO - 0.0024853*Bi_2O_3 - \\
& 0.0030326*Er_2O_3 - 0.0018856*Gd_2O_3 - \\
& 0.0017563*La_2O_3 - 0.0002505*Na_2O + \\
& 0.0017526*Nb_2O_5 - 0.0025472*Nd_2O_3 - \\
& 0.0016439*PbO + 0.000050096*SiO_2 + \\
& 0.0011794*TiO_2 - 0.00072112*WO_3 - \\
& 0.00079167*Y_2O_3 - 0.0031015*Yb_2O_3 - \\
& 0.00034209*ZnO.
\end{aligned}
\tag{III}
$$

In Formulas (I), (II) and (III) and Tables 1 and 2, refractive index parameter $P_n$ is a parameter that predicts the refractive index at 587.56 nm $n_d$, calculated from the components of the glass composition expressed in mol. %; density parameter $P_d$ is a parameter that predicts the density at room temperature $d_{RT}$ expressed in units of g/cm³, calculated from the components of the glass composition expressed in mol. %; and refraction parameter $P_{ref}$ is a parameter that predicts the refractive index to density ratio ("refraction") $(n_d-1)/d_{RT}$, in units of cm³/g, calculated from the components of the glass composition expressed in mol. %.

In Formulas (I), (II) and (III), each component of the glass composition is listed in terms of its chemical formula, where the chemical formula refers to the concentration of the component expressed in mol. %. For example, for purposes of Formulas (I), (II) and (III), $La_2O_3$ refers to the concentration of $La_2O_3$, expressed in mol. %, in the glass composition. It is understood that not all components listed in Formulas (I), (II) and (III) are necessarily present in a particular glass composition and that Formulas (I), (II) and (III) are equally valid for glass compositions that contain less than all of the components listed in the formulas. It is further understood that Formulas (I), (II) and (III) are also valid for glass compositions within the scope and claims of the present disclosure that contain components in addition to the components listed in the formulas. If a component listed in Formulas (I), (II) and (III) is absent in a particular glass composition, the concentration of the component in the glass composition is 0 mol. % and the contribution of the component to the value calculated from the formulas is zero.

Figure 3:
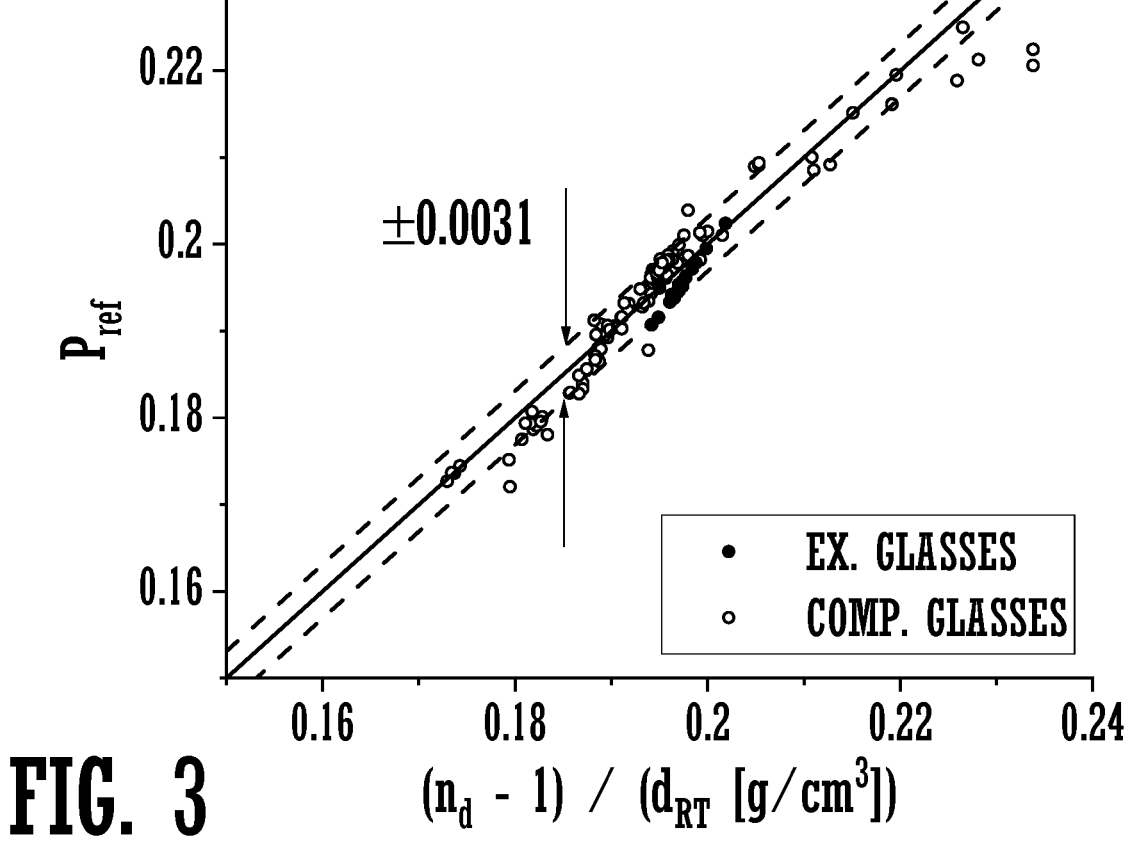
FIG. 3 is a plot illustrating the relationship between the refraction $(n_d-1)/d_{RT}$ and the refraction parameter $P_{ref}$ calculated by formula (III) for some Comparative Glasses and some Exemplary Glasses according to an embodiment of the present disclosure.

FIG. 3 is a plot of the parameter $P_{ref}$ calculated by Formula (III) as a function of measured refraction $(n_d-1)/d_{RT}$ for some Literature Glasses ("Comp. Glasses") and some Exemplary Glasses ("Ex. Glasses"). As illustrated by the data in FIG. 3, the compositional dependence of the parameter $P_{ref}$ had an error within a range of ±0.0031 unit of the measured $(n_d-1)/d_{RT}$ for the majority of glasses, that corresponds to the standard error specified in Table 2.

Table 3 identifies the combination of components and their respective amounts according to some embodiments of the present disclosure. The Exemplary Glasses A in Table 3 may include additional components according to any aspects of the present disclosure as described herein.

TABLE 1

| Composition Space Used for Modeling | | | | | |
|---|---|---|---|---|---|
| | Property | | | | |
| | $n_d$ | | $d_{RT}$, g/cm$^3$ | | $(n_d - 1)/d_{RT}$ |  |
| Component limits | Min, mol. % | Max, mol. % | Min, mol. % | Max, mol. % | Min, mol. % | Max, mol. % |
| La$_2$O$_3$ | 10 | 40 | 10 | 40 | 0 | 30 |
| TiO$_2$ | 10 | 40 | 10 | 40 | 10 | 40 |
| B$_2$O$_3$ | 10 | 30 | 15 | 30 | 15 | 25 |
| SiO$_2$ | 0 | 20 | 5 | 20 | 5 | 20 |
| ZrO$_2$ | 0 | 10 | 0 | 15 | 0 | 8 |
| Nb$_2$O$_5$ | 0 | 15 | 0 | 15 | 0 | 7.5 |
| CaO | 0 | 15 | 0 | 15 | 0 | 20 |
| BaO | 0 | 10 | 0 | 10 | 0 | 7.5 |
| Y$_2$O$_3$ | 0 | 10 | 0 | 10 | 0 | 5 |
| ZnO | 0 | 10 | 0 | 10 | Not limited | Not limited |
| Gd$_2$O$_3$ | 0 | 10 | 0 | 10 | Not limited | Not limited |
| Na$_2$O | 0 | 10 | 0 | 10 | Not limited | Not limited |
| WO$_3$ | 0 | 15 | 0 | 30 | Not limited | Not limited |
| Al$_2$O$_3$ | 0 | 10 | 0 | 10 | Not limited | Not limited |
| Li$_2$O | 0 | 8 | 0 | 8 | Not limited | Not limited |
| F | 0 | 0.5 [at. %] | Not limited | Not limited | Not limited | Not limited |
| GeO$_2$ | Not limited | Not limited | 0 | 8 | Not limited | Not limited |
| Bi$_2$O$_3$ | Not limited | Not limited | 0 | 15 | Not limited | Not limited |
| Other species | 0 | Not limited | 0 | Not limited | 0 | Not limited |

TABLE 2

| Property prediction models | | | | | | |
|---|---|---|---|---|---|---|
| Property | Abbreviation | Unit | Predicting Parameter | Regression Formula | Composition Unit | Standard error |
| Refractive index at 587.56 nm | $n_d$ | | $P_n$ | Formula (I) | Mol. % | 0.017 |
| Density at room temperature | $d_{RT}$ | g/cm$^3$ | $P_d$ | Formula (II) | Mol. % | 0.076 |
| Refractive index to density ratio ("refraction") | $(n_d - 1)/d_{RT}$ | cm$^3$/g | $P_{ref}$ | Formula (III) | Mol. % | 0.0031 |

FIG. 1 is a plot of the parameter $P_n$ calculated by Formula (I) as a function of measured refractive index $n_d$ for some Literature Glasses ("Comp. Glasses") and some Exemplary Glasses ("Ex. Glasses"). As illustrated by the data in FIG. 1, the compositional dependence of the parameter $P_n$ had an error within a range of ±0.017 unit of the measured $n_d$ for the majority of glasses, that corresponds to the standard error specified in Table 2.

Figure 2:
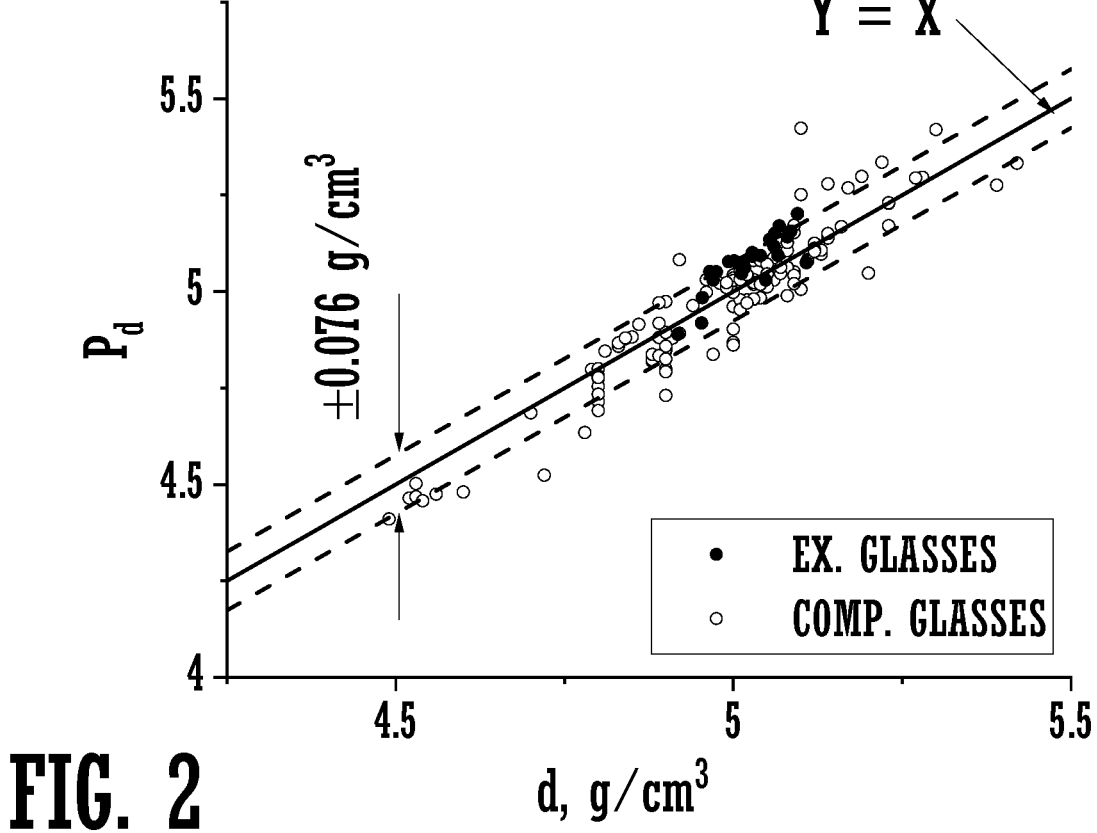
FIG. 2 is a plot illustrating the relationship between the density at room temperature $d_{RT}$ and the density parameter $P_d$ calculated by formula (II) for some Comparative Glasses and some Exemplary Glasses according to an embodiment of the present disclosure.

FIG. 2 is a plot of the parameter $P_d$ calculated by Formula (II) as a function of measured density $d_{RT}$ for some Literature Glasses ("Comp. Glasses") and some Exemplary Glasses ("Ex. Glasses"). As illustrated by the data in FIG. 2, the compositional dependence of the parameter $P_d$ had an error within a range of ±0.076 unit of the measured $d_{RT}$ for the majority of glasses, that corresponds to the standard error specified in Table 2.

TABLE 3

| Exemplary Glasses A | |
|---|---|
| Composition | Amount (mol. %) |
| B$_2$O$_3$ | 0.5 to 29.0 mol. % |
| TiO$_2$ | 0.0 to 25.2 mol. % |
| Bi$_2$O$_3$ | 0.0 to 20.0 mol. % |
| TeO$_2$ | 0.0 to 20.0 mol. % |
| P$_2$O$_5$ | 0.0 to 15.0 mol. % |
| Nb$_2$O$_5$ | 0.0 to 10.5 mol. % |
| Al$_2$O$_3$ | 0.0 to 10.0 mol. % |
| MoO$_3$ | 0.0 to 5.0 mol. % |
| Total sum of all oxides RmOn | ≥95.0 mol. % |
| Sum of (SiO$_2$ + B$_2$O$_3$ + P$_2$O$_5$) | ≥10.0 mol. % |
| Sum of (SiO$_2$ + B$_2$O$_3$) | ≤34.0 mol. % |
| Sum of (CaO + SrO + BaO + Y$_2$O$_3$) | ≥0.3 mol. % |

TABLE 3-continued

Exemplary Glasses A

| Composition | Amount (mol. %) |
| --- | --- |
| Total sum of rare earth metal oxides $RE_mO_n$ | 0.0 to 29.0 mol. % |
| Sum of ($R_2O$ + RO) | 0.0 to 25.0 mol. % |

Exemplary Glasses A according to embodiments of the present disclosure may satisfy the following condition:

$$Y_2O_3\text{-}Gd_2O_3 \text{ [mol. \%]} \geq -2.0,$$

where chemical formulas refer to the amounts of components in glass, expressed in mol. %.

According to some embodiments of the present disclosure, Exemplary Glasses A may also have a density at room temperature $d_{RT}$ [g/cm³] from 4 to 6.

According to some embodiments of the present disclosure, Exemplary Glasses A may also satisfy the following formula:

$$n_d\text{-}(1.207+0.155*d_{RT})>0.000,$$

where $n_d$ is a refractive index at 587.56 nm, and $d_{RT}$ is a density at room temperature.

According to some embodiments of the present disclosure, Exemplary Glasses A may also satisfy the following formula:

$$n_d\text{-}(1.217+0.155*d_{RT})>0.000,$$

where $n_d$ is a refractive index at 587.56 nm, and $d_{RT}$ is a density at room temperature.

Table 4 identifies the combination of components and their respective amounts according to some embodiments of the present disclosure. The Exemplary Glasses B in Table 4 may include additional components according to any aspects of the present disclosure as described herein.

TABLE 4

Exemplary Glasses B

| Composition | Amount (mol. %) |
| --- | --- |
| $TiO_2$ | 1.0 to 40.0 mol. % |
| $B_2O_3$ | 1.0 to 40.0 mol. % |
| $SiO_2$ | 0.0 to 35.0 mol. % |
| $La_2O_3$ | 0.0 to 30.0 mol. % |
| $ZrO_2$ | 0.0 to 10.0 mol. % |
| $GeO_2$ | 0.0 to 10.0 mol. % |
| $Al_2O_3$ | 0.0 to 10.0 mol. % |
| $Nb_2O_5$ | 0.0 to 6.8 mol. % |
| $Y_2O_3$ | 0.0 to 6.7 mol. % |
| Sum of ($La_2O_3$ + $Y_2O_3$ + $Gd_2O_3$ + $TiO_2$) | ≥45.3 mol. % |
| Sum of ($Nb_2O_5$ + $ZrO_2$) | ≥12.1 mol. % |
| Total sum of divalent metal oxides RO | 0.0 to 25.0 mol. % |
| Total sum of monovalent metal oxides $R_2O$ | 0.0 to 25.0 mol. % |

Exemplary Glasses B according to embodiments of the present disclosure may satisfy the following condition:

$$SiO_2+B_2O_3\text{-}TiO_2 \text{ [mol. \%]} \geq 7.05,$$

where chemical formulas refer to the amounts of components in glass, expressed in mol. %.

According to some embodiments of the present disclosure, Exemplary Glasses B may also satisfy the following condition:

$$B_2O_3\text{-}SiO_2 \text{ [mol. \%]} \leq 7.0,$$

where chemical formulas refer to the amounts of components in glass, expressed in mol. %.

According to some embodiments of the present disclosure, Exemplary Glasses B may also satisfy the following formula:

$$(n_d\text{-}1)/d_{RT}\text{-}(0.196+0.0016*(TiO_2\text{-}La_2O_3))>0.000,$$

where $(n_d-1)/d_{RT}$ is a refractive index to density ratio ("refraction").

According to some embodiments of the present disclosure, Exemplary Glasses B may also satisfy the following formula:

$$(n_d\text{-}1)/d_{RT}\text{-}(0.199+0.0016*(TiO_2\text{-}La_2O_3))>0.000,$$

where $(n_d-1)/d_{RT}$ is a refractive index to density ratio ("refraction").

Table 5 identifies the combination of components and their respective amounts according to some embodiments of the present disclosure. The Exemplary Glasses C in Table 5 may include additional components according to any aspects of the present disclosure as described herein.

TABLE 5

Exemplary Glasses C

| Composition | Amount (mol. %) |
| --- | --- |
| $TiO_2$ | 1.0 to 40.0 mol. % |
| $B_2O_3$ | 1.0 to 40.0 mol. % |
| $SiO_2$ | 0.0 to 35.0 mol. % |
| $La_2O_3$ | 0.0 to 30.0 mol. % |
| CaO | 0.0 to 20.0 mol. % |
| $ZrO_2$ | 0.0 to 10.0 mol. % |
| $GeO_2$ | 0.0 to 10.0 mol. % |
| $Al_2O_3$ | 0.0 to 10.0 mol. % |
| $Nb_2O_5$ | 0.0 to 6.8 mol. % |
| BaO | 0.0 to 5.5 mol. % |
| Sum of ($La_2O_3$ + $Yb_2O_3$ + $Y_2O_3$ + $Gd_2O_3$ + $TiO_2$) | ≥45.3 mol. % |
| Sum of ($Nb_2O_5$ + $ZrO_2$) | ≥11.0 mol. % |
| Total sum of divalent metal oxides RO | 0.0 to 25.0 mol. % |
| Total sum of monovalent metal oxides $R_2O$ | 0.0 to 25.0 mol. % |

Exemplary Glasses C according to embodiments of the present disclosure may satisfy the following condition:

$$TiO_2\text{-}B_2O_3 \text{ [mol. \%]} \geq -6.0,$$

where chemical formulas refer to the amounts of components in glass, expressed in mol. %.

According to some embodiments of the present disclosure, Exemplary Glasses C may also satisfy the following condition:

$$TiO_2\text{-}La_2O_3 \text{ [mol. \%]} \leq 5.0,$$

where chemical formulas refer to the amounts of components in glass, expressed in mol. %.

According to some embodiments of the present disclosure, Exemplary Glasses C may also satisfy the following formula:

$$(n_d\text{-}1)/d_{RT}\text{-}(0.199+0.0025*(TiO_2\text{-}La_2O_3))>0.000,$$

where $(n_d-1)/d_{RT}$ is a refractive index to density ratio ("refraction").

According to some embodiments of the present disclosure, Exemplary Glasses C may also satisfy the following formula:

$$(n_d\text{-}1)/d_{RT}\text{-}(0.204+0.0025*(TiO_2\text{-}La_2O_3))>0.000,$$

where $(n_d-1)/d_{RT}$ is a refractive index to density ratio ("refraction").

EXAMPLES

The following examples describe various features and advantages provided by the disclosure, and are in no way intended to limit the invention and appended claims.

Figure 4:
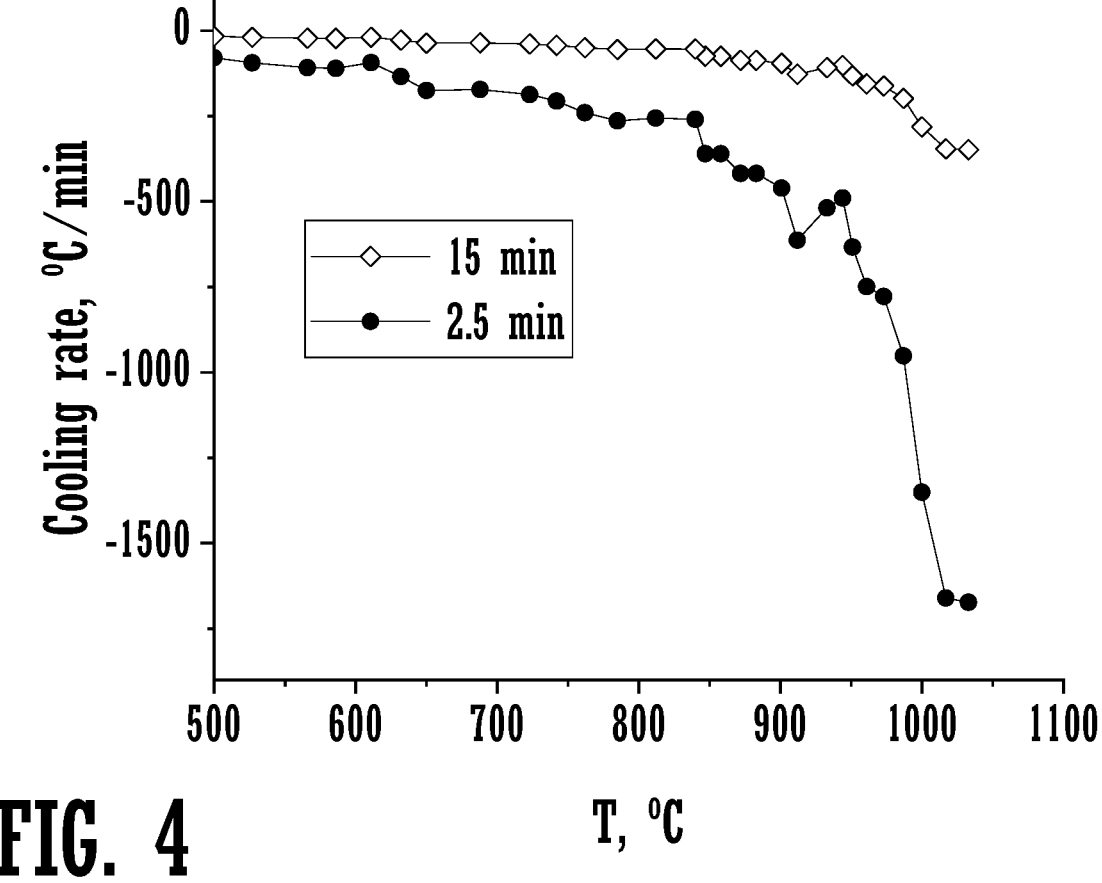
FIG. 4 is a plot of an exemplary cooling schedule according to a "15 min test" condition and a "2.5 min test" condition for some Exemplary Glasses according to an embodiment of the present disclosure.

To prepare the glass samples for some exemplary glasses of the present disclosure, about 15 grams of each sample (content of intended components in the as-batched compositions was more than 99.99 wt %) was melted from batch raw materials at a temperature of about 1300° C. in platinum or platinum-rhodium crucibles (Pt:Rh=80:20) for 1 hour. Two controlled cooling conditions were applied. In the first condition (referred to as "15 min test" or "15 min devit test"), the cooling conditions were controlled so that it took about 15 min for the samples to cool from 1100° C. to 500° C. in air inside a furnace. In the second condition (referred to as "2.5 min test" or "2.5 min devit test"), the cooling conditions were controlled so that it took about 2.5 min for the samples to cool from 1100° C. to 500° C. in air inside a furnace. Temperature readings were obtained by direct reading of the furnace temperature or using an IR camera reading with calibration scaling. The first condition (15 min test) approximately corresponds to a cooling rate of up to 300° C./min at a temperature of 1000° C. and the second test approximately corresponds to a cooling rate of up to 600° C./min at 1000° C. (the temperature of 1000° C. corresponds approximately to the temperature at which the cooling rate was expected to approach a maximum). When the temperature is lower, the cooling rate also decreases significantly. Typical schedules of the first and second cooling regimes are shown in FIG. 4. For these samples, observations referred to as "15-min devit test" and "2.5-min devit test", are specified in Table 6 below; the observation "1" is used to denote that a glass composition passed the indicated devit test, where a composition is deemed to have passed the indicated devit test if a melt of the composition forms a glass free of crystals visible under an optical microscope under magnification from 100× to 500×. The observation "0" is used to denote that a glass composition failed the indicated devit test.

To prepare other glass samples for exemplary glasses of the present disclosure, unless otherwise specified, a one kilogram of batch of the components was prepared in a pure platinum crucible. The crucible was placed in a furnace set at a temperature of 1250° C., after which, the temperature in the furnace was raised to 1300° C. and held at 1300° C. for 2 hours. The furnace temperature was then reduced to 1250° C. and the glass was allowed to equilibrate at this temperature for an hour before being poured on a steel table followed by annealing at Tg for an hour.

To prepare some more samples for exemplary glasses of the present disclosure, unless otherwise specified, a one kilogram of batch of the components was prepared in a pure platinum crucible. The crucible was placed in a furnace set at a temperature of between 1300° C. and 1400° C. for 3 hours and subsequently poured on a steel table followed by annealing at Tg for an hour.

Some sample melts were also melted in a "one liter" platinum crucible heated by Joule effect. In this process, approximately 4800 g of raw materials were used. The crucible was filled in 1.5 hours at temperatures between 1250 and 1300° C. The samples then were heated to a temperature between 1300° C. and 1375° C. and held for one hour. During this step, the glass was continuously stirred at 60 rpm. Then the samples were cooled to a temperature between 1250° C. and 1310° C. to equilibrate for 30 minutes, and the stirring speed was decreased to 20 rpm. The delivery tube was heated top a temperature between 1250° C. and 1310° C., and the glass was cast on a cooled graphite table. The glass was formed into a bar of approximately 25 mm in thickness, 50 mm in width, and 90 cm in length. The prepared bars were inspected under an optical microscope to check for crystallization and were all crystal free. The glass quality observed under the optical microscope was good with the bars being free of striae and bubbles. The glass was placed at Tg in a lehr oven for 1 hour for a rough annealing. The bars were then annealed in a static furnace for one hour at Tg and the temperature was then lowered at 1° C./min.

Some of samples were bleached after melting to improve the transmittance. Bleaching process was performed at the temperatures between 500° C. and the crystallization onset temperature $T_x$. When the temperature is less than about 500° C., the bleaching process may take too long time because of its slow rate. When the temperature of bleaching exceeds $T_x$, the glass may crystallize when heat-treating. The higher the bleaching temperature, the faster the bleaching process goes, but the lower value of resulting transmittance can be obtained. Accordingly, the temperature and time of bleaching was selected to come to an acceptable transmittance within a reasonable time, such as less than or equal to 24 hours, or less than or equal to 48 hours, or less than or equal to 96 hours, or like.

Some Exemplary Glasses were exposed to Nano Strip 2X cleaning solution. The dried samples were submerged in 600 ml of Nanostrip 2X solution (Capitol Scientific, 85% $H_2SO_4$ and <1% $H_2O_2$) for 50 min at 70° C. with a stir at 400 rpm speed. The ratio of surface area to volume used in this test is 0.08 cm$^{-1}$. After 50 minutes, the samples were quenched in deionized water and rinsed in 18 MΩ water, and then dried by high-pure nitrogen gas and placed in a desiccator for overnight. Weight loss normalized to surface area (mg/cm$^2$) and weight loss percentage (wt %) was calculated.

No chemical analysis of the tested samples was performed because chemical analysis was performed for similar samples prepared in independent meltings by XRF method (X-ray fluorescence—for all oxides, except for $B_2O_3$ and $Li_2O$), by ICP-OES method (inductively coupled plasma optical emission spectroscopy—for $B_2O_3$) and by FES method (flame emission spectroscopy—for $Li_2O$). These analyses gave deviations from the batched compositions within ±2.0 mass % for the major components such as $Nb_2O_5$ which is equivalently less than about 1 mol. %.

In Tables 6 and 7, the abbreviation "n" with a subscript refers to the refractive index at a corresponding wavelength in nm; for example, $n_{632.8\ nm}$ refers to the refractive index at wavelengths of 632.8 nm. $T_x$ refers to the crystallization onset temperature. $TX_{460\ nm}$ refers to the total transmittance of a 10 mm thick sample of the glass at a wavelength of 460 nm after bleaching. Total transmittance refers to transmittance that has not been corrected for Fresnel losses and was measured with a Cary 5000 spectrometer.

TABLE 6

| Exemplary Glass | | 1 | 2 | 3 | 4 | 5 | 6 | 7 | 8 |
|---|---|---|---|---|---|---|---|---|---|
| Composition - mol. % | | | | | | | | | |
| $B_2O_3$ | mol. % | 16.70 | 20.38 | 20.37 | 18.77 | 18.78 | 18.78 | 16.70 | 20.37 |
| $La_2O_3$ | mol. % | 28.00 | 25.54 | 24.54 | 24.00 | 23.70 | 20.70 | 28.00 | 25.44 |
| $TiO_2$ | mol. % | 24.50 | 24.58 | 20.58 | 22.00 | 22.00 | 25.00 | 25.00 | 20.55 |
| $SiO_2$ | mol. % | 18.28 | 11.27 | 11.27 | 15.22 | 15.22 | 15.22 | 18.29 | 11.18 |
| CaO | mol. % | 0 | 0 | 0 | 0 | 0 | 0 | 0 | 2.12 |
| $Nb_2O_5$ | mol. % | 5.50 | 6.70 | 6.70 | 6.50 | 6.50 | 6.50 | 7.00 | 6.69 |
| $Ga_2O_3$ | mol. % | 0 | 0 | 1.00 | 0 | 0 | 0 | 0 | 0 |
| $ZrO_2$ | mol. % | 7.00 | 7.88 | 7.88 | 8.00 | 8.00 | 8.00 | 4.99 | 7.88 |
| $Y_2O_3$ | mol. % | 0 | 0.88 | 0.88 | 3.50 | 4.50 | 4.50 | 0 | 0.90 |
| BaO | mol. % | 0 | 2.48 | 6.48 | 0.71 | 0 | 0 | 0 | 4.67 |
| $Gd_2O_3$ | mol. % | 0 | 0.29 | 0.30 | 1.29 | 1.30 | 1.30 | 0 | 0 |
| SrO | mol. % | 0 | 0 | 0 | 0 | 0 | 0 | 0 | 0.0306 |
| $CeO_2$ | mol. % | 0 | 0 | 0 | 0 | 0 | 0 | 0 | 0.15 |
| $Na_2O$ | mol. % | 0 | 0 | 0 | 0 | 0 | 0 | 0 | 0.0256 |
| $Al_2O_3$ | mol. % | 0.0154 | 0 | 0 | 0 | 0 | 0 | 0.0156 | 0 |
| $Ta_2O_5$ | mol. % | 0.0035 | 0 | 0 | 0 | 0 | 0 | 0.0072 | 0.0072 |
| Measured properties | | | | | | | | | |
| $n_d$ | | 1.9952 | 2.007 | | | | | | |
| $d_{RT}$ | g/cm³ | 5.018 | 5.066 | | | 5.060 | 4.953 | 4.984 | |
| $(n_d - 1)/d_{RT}$ | cm³/g | 0.19833 | 0.19878 | 0.19374 | | | | | |
| 15-min devit test (0/1) | | | | | | | | | 1 |
| $T_g$ | °C. | 736.80 | 720.00 | | | | | 725.00 | |
| $T_x$ | | 875.40 | | | | | | 863.20 | |
| $n_{531.9\ nm}$ | | | 2.0072 | | | | | | |
| $n_{632.8\ nm}$ | | | 1.9891 | | | | | | |
| E | GPa | 127.01 | | | | | | | |
| $\alpha_{20\text{-}300} \times 10^7$ | K⁻¹ | 83.600 | 84.800 | | | | | | |
| Nanostrip 2X | mg/cm² | 0.45000 | | | | | | | |
| Predicted and calculated properties | | | | | | | | | |
| $P_d$ [for $d_{RT}$] | g/cm³ | 5.075 | 5.0935 | 5.1616 | 5.1179 | 5.1176 | 4.9183 | 5.0486 | 5.1469 |
| $P_n$ [for $n_d$] | | 1.9987 | 2.0147 | 2.000 | 2.0067 | 2.0089 | 2.002 | 2.0063 | 2.0014 |
| $P_{ref}$ [for $(n_d - 1)/d_{RT}$] | cm³/g | 0.195 | 0.1979 | 0.1905 | 0.1951 | 0.1955 | 0.2043 | 0.1982 | 0.1914 |
| $P_n - (1.207 + 0.155 * P_d)$ | | 0.0050 | 0.0182 | −0.0071 | 0.0064 | 0.0087 | 0.0327 | 0.0167 | −0.0034 |
| $P_n - (1.217 + 0.155 * P_d)$ | | −0.0050 | 0.0083 | −0.0171 | −0.0036 | −0.0013 | 0.0227 | 0.0067 | −0.0134 |
| $P_{ref} - (0.196 + 0.0016 * (TiO_2 - La_2O_3))$ | | 0.0046 | 0.0034 | 8.900E−04 | 0.0023 | 0.0023 | 0.0015 | 0.0070 | 0.0032 |
| $P_{ref} - (0.199 + 0.0016 * (TiO_2 - La_2O_3))$ | | 0.0016 | 4.100E−04 | −0.0021 | −7.500E−04 | −7.300E−04 | −0.0015 | 0.0040 | 2.300E−04 |
| $P_{ref} - (0.199 + 0.0025 * (TiO_2 - La_2O_3))$ | | 0.0047 | 0.0013 | 0.0015 | 0.0010 | 8.000E−04 | −0.0054 | 0.0067 | 0.0046 |
| $P_{ref} - (0.204 + 0.0025 * (TiO_2 - La_2O_3))$ | | −2.700E−04 | −0.0037 | −0.0035 | −0.0040 | −0.0042 | −0.0104 | 0.0017 | −3.600E−04 |

| Exemplary Glass | | 9 | 10 | 11 | 12 | 13 | 14 | 15 | 16 |
|---|---|---|---|---|---|---|---|---|---|
| Composition - mol. % | | | | | | | | | |
| $B_2O_3$ | mol. % | 20.36 | 20.34 | 20.35 | 20.34 | 20.09 | 20.66 | 20.37 | 19.56 |
| $La_2O_3$ | mol. % | 25.44 | 25.44 | 25.44 | 25.44 | 27.41 | 21.66 | 25.55 | 24.29 |
| $TiO_2$ | mol. % | 20.55 | 21.68 | 21.65 | 20.25 | 24.49 | 21.29 | 20.27 | 21.48 |
| $SiO_2$ | mol. % | 11.18 | 10.65 | 10.66 | 11.16 | 12.41 | 17.54 | 11.27 | 12.38 |
| CaO | mol. % | 3.61 | 2.00 | 3.40 | 0.0569 | 0 | 0 | 2.99 | 4.37 |
| $Nb_2O_5$ | mol. % | 6.68 | 6.09 | 6.11 | 6.69 | 4.70 | 6.19 | 6.70 | 6.77 |
| $WO_3$ | mol. % | 0 | 0 | 0 | 0 | 0.60 | 0.48 | 0 | 0 |
| $ZrO_2$ | mol. % | 7.88 | 7.89 | 7.88 | 7.88 | 6.90 | 7.98 | 7.89 | 8.08 |
| $Y_2O_3$ | mol. % | 0.90 | 0.90 | 0.90 | 0.90 | 3.40 | 2.68 | 0.88 | 1.28 |
| BaO | mol. % | 3.17 | 4.80 | 3.40 | 4.51 | 0 | 0 | 3.48 | 1.50 |
| ZnO | mol. % | 0 | 0 | 0 | 2.28 | 0 | 0 | 0.31 | 0 |
| $Gd_2O_3$ | mol. % | 0 | 0 | 0 | 0.30 | 0 | 1.51 | 0.29 | 0.30 |
| SrO | mol. % | 0.0303 | 0.0304 | 0.0302 | 0.0308 | 0 | 0 | 0 | 0 |
| $CeO_2$ | mol. % | 0.16 | 0.16 | 0.15 | 0.15 | 0 | 0 | 0 | 0 |
| $Na_2O$ | mol. % | 0.0253 | 0.0254 | 0.0252 | 0.0258 | 0 | 0 | 0 | 0 |
| $Ta_2O_5$ | mol. % | 0.0071 | 0.0071 | 0.0071 | 0.0072 | 0 | 0 | 0 | 0 |
| Measured properties | | | | | | | | | |
| $n_d$ | | | | | | | | 1.9864 | 1.986 |
| $d_{RT}$ | g/cm³ | | | | | 5.095 | 4.918 | 5.062 | 4.970 |
| $(n_d - 1)/d_{RT}$ | cm³/g | | | | | | | 0.19488 | 0.19839 |
| 15-min devit test (0/1) | | 1 | 1 | 1 | 1 | | | | |

TABLE 6-continued

| Exemplary Glass Compositions | | | | | | | | |
|---|---|---|---|---|---|---|---|---|

Predicted and calculated properties

| | | | | | | | | | |
|---|---|---|---|---|---|---|---|---|---|
| $P_d$ [for $d_{RT}$] | g/cm³ | 5.1092 | 5.1518 | 5.1161 | 5.1969 | 5.2018 | 4.8891 | 5.1507 | 5.0298 |
| $P_n$ [for $n_d$] | | 2.000 | 2.0024 | 2.001 | 2.0043 | 2.0129 | 1.9724 | 2.0021 | 1.9994 |
| $P_{ref}$ [for $(n_d - 1)/d_{RT}$] | cm³/g | 0.193 | 0.1915 | 0.193 | 0.1899 | 0.1918 | 0.1989 | 0.1916 | 0.1972 |
| $P_n - (1.207 + 0.155 * P_d)$ | | 0.0011 | −0.0031 | 0.0011 | −0.0082 | −3.900E−04 | 0.0076 | −0.0033 | 0.0128 |
| $P_n - (1.217 + 0.155 * P_d)$ | | −0.0089 | −0.0131 | −0.0090 | −0.0182 | −0.0104 | −0.0025 | −0.0133 | 0.0028 |
| $P_{ref} - (0.196 + 0.0016 * (TiO_2 - La_2O_3))$ | | 0.0049 | 0.0015 | 0.0031 | 0.0022 | 4.600E−04 | 0.0035 | 0.0040 | 0.0057 |
| $P_{ref} - (0.199 + 0.0016 * (TiO_2 - La_2O_3))$ | | 0.0019 | −0.0015 | 9.800E−05 | −8.200E−04 | −0.0025 | 5.000E−04 | 0.0010 | 0.0027 |
| $P_{ref} - (0.199 + 0.0025 * (TiO_2 - La_2O_3))$ | | 0.0063 | 0.0019 | 0.0035 | 0.0039 | 8.500E−05 | 8.300E−04 | 0.0058 | 0.0052 |
| $P_{ref} - (0.204 + 0.0025 * (TiO_2 - La_2O_3))$ | | 0.0013 | −0.0031 | −0.0015 | −0.0011 | −0.0049 | −0.0042 | 7.800E−04 | 2.000E−04 |

| Exemplary Glass | | 17 | 18 | 19 | 20 | 21 | 22 | 23 | 24 |
|---|---|---|---|---|---|---|---|---|---|

Composition - mol. %

| | | | | | | | | | |
|---|---|---|---|---|---|---|---|---|---|
| $B_2O_3$ | mol. % | 19.57 | 20.38 | 20.39 | 20.41 | 18.64 | 19.40 | 16.70 | 20.37 |
| $La_2O_3$ | mol. % | 25.80 | 25.54 | 25.53 | 23.55 | 24.68 | 22.50 | 28.00 | 23.54 |
| $TiO_2$ | mol. % | 20.48 | 22.58 | 26.58 | 20.57 | 23.30 | 20.29 | 26.51 | 20.27 |
| $SiO_2$ | mol. % | 12.38 | 11.27 | 11.27 | 11.25 | 15.44 | 11.31 | 17.79 | 11.25 |
| CaO | mol. % | 3.51 | 0 | 0 | 3.47 | 0 | 0 | 0 | 3.48 |
| $Nb_2O_5$ | mol. % | 6.77 | 6.70 | 6.70 | 6.70 | 6.98 | 6.70 | 4.00 | 6.72 |
| $Ga_2O_3$ | mol. % | 0 | 0 | 0 | 0 | 0 | 9.00 | 0 | 0 |
| $ZrO_2$ | mol. % | 7.96 | 7.88 | 7.88 | 7.88 | 8.00 | 6.89 | 7.00 | 7.88 |
| $Y_2O_3$ | mol. % | 0.89 | 0.88 | 0.88 | 2.88 | 2.54 | 3.90 | 0 | 2.88 |
| BaO | mol. % | 0 | 4.48 | 0.48 | 3.00 | 0 | 0 | 0 | 0 |
| ZnO | mol. % | 2.34 | 0 | 0 | 0 | 0 | 0 | 0 | 3.32 |
| $Gd_2O_3$ | mol. % | 0.30 | 0.30 | 0.29 | 0.29 | 0.42 | 0 | 0 | 0.29 |
| $Al_2O_3$ | mol. % | 0 | 0 | 0 | 0 | 0 | 0 | 0.0151 | 0 |
| $Ta_2O_5$ | mol. % | 0 | 0 | 0 | 0 | 0 | 0 | 0.0035 | 0 |

Measured properties

| | | | | | | | | | |
|---|---|---|---|---|---|---|---|---|---|
| $n_d$ | | 1.990 | 1.997 | 2.019 | | | | | 1.991 |
| $d_{RT}$ | g/cm³ | 5.028 | 5.085 | 5.048 | | | | | 5.012 |
| $(n_d - 1)/d_{RT}$ | cm³/g | 0.19690 | 0.19607 | 0.20186 | | | | | 0.19773 |

Predicted and calculated properties

| | | | | | | | | | |
|---|---|---|---|---|---|---|---|---|---|
| $P_d$ [for $d_{RT}$] | g/cm³ | 5.1008 | 5.1564 | 5.0296 | 5.0816 | 5.0261 | 4.9779 | 5.0681 | 5.0468 |
| $P_n$ [for $n_d$] | | 2.0029 | 2.010 | 2.0193 | 2.0001 | 2.0072 | 1.9954 | 1.9949 | 1.9994 |
| $P_{ref}$ [for $(n_d - 1)/d_{RT}$] | cm³/g | 0.1945 | 0.1933 | 0.2024 | 0.1945 | 0.1994 | 0.1988 | 0.1947 | 0.1963 |
| $P_n - (1.207 + 0.155 * P_d)$ | | 0.0053 | 0.0038 | 0.0327 | 0.0055 | 0.0212 | 0.0168 | 0.0024 | 0.0101 |
| $P_n - (1.217 + 0.155 * P_d)$ | | −0.0047 | −0.0062 | 0.0227 | −0.0045 | 0.0112 | 0.0068 | −0.0076 | 1.200E−04 |
| $P_{ref} - (0.196 + 0.0016 * (TiO_2 - La_2O_3))$ | | 0.0070 | 0.0021 | 0.0047 | 0.0033 | 0.0056 | 0.0064 | 0.0011 | 0.0055 |
| $P_{ref} - (0.199 + 0.0016 * (TiO_2 - La_2O_3))$ | | 0.0040 | −9.300E−04 | 0.0017 | 2.600E−04 | 0.0026 | 0.0034 | −0.0019 | 0.0025 |
| $P_{ref} - (0.199 + 0.0025 * (TiO_2 - La_2O_3))$ | | 0.0088 | 0.0017 | 7.900E−04 | 0.0029 | 0.0038 | 0.0054 | −5.900E−04 | 0.0055 |
| $P_{ref} - (0.204 + 0.0025 * (TiO_2 - La_2O_3))$ | | 0.0038 | −0.0033 | −0.0042 | −0.0021 | −0.0012 | 3.500E−04 | −0.0056 | 4.900E−04 |

| Exemplary Glass | | 25 | 26 | 27 | 28 | 29 | 30 | 31 | 32 |
|---|---|---|---|---|---|---|---|---|---|

Composition - mol. %

| | | | | | | | | | |
|---|---|---|---|---|---|---|---|---|---|
| $B_2O_3$ | mol. % | 20.37 | 20.37 | 20.37 | 20.37 | 19.58 | 19.36 | 19.58 | 19.58 |
| $La_2O_3$ | mol. % | 25.54 | 23.54 | 23.64 | 23.54 | 25.81 | 24.55 | 24.78 | 25.81 |
| $TiO_2$ | mol. % | 20.28 | 22.27 | 20.27 | 20.27 | 20.47 | 21.26 | 20.47 | 20.47 |
| $SiO_2$ | mol. % | 11.26 | 11.26 | 11.25 | 11.27 | 12.39 | 12.27 | 12.39 | 12.39 |
| CaO | mol. % | 6.49 | 0 | 6.48 | 2.99 | 5.53 | 5.01 | 5.55 | 5.53 |
| $Nb_2O_5$ | mol. % | 6.70 | 6.70 | 7.61 | 7.61 | 6.77 | 5.70 | 6.77 | 6.77 |
| $ZrO_2$ | mol. % | 7.88 | 7.88 | 7.88 | 7.89 | 7.96 | 7.78 | 7.96 | 7.96 |
| $Y_2O_3$ | mol. % | 0.88 | 0.89 | 1.88 | 1.88 | 0.89 | 1.88 | 1.91 | 0.89 |
| BaO | mol. % | 0 | 6.48 | 0 | 3.48 | 0 | 1.48 | 0 | 0 |
| ZnO | mol. % | 0.30 | 0.33 | 0.32 | 0.31 | 0.31 | 0.32 | 0.30 | 0.31 |
| $Gd_2O_3$ | mol. % | 0.29 | 0.29 | 0.30 | 0.39 | 0.30 | 0.39 | 0.30 | 0.30 |

Measured properties

| | | | | | | | | | |
|---|---|---|---|---|---|---|---|---|---|
| $n_d$ | | 1.9882 | 1.9893 | 1.990 | 1.988 | 1.9855 | 1.9828 | 1.9836 | 1.988 |
| $d_{RT}$ | g/cm³ | 5.017 | 5.040 | 4.954 | 5.006 | 4.993 | 5.001 | 4.975 | 5.015 |
| $(n_d - 1)/d_{RT}$ | cm³/g | 0.19699 | 0.19629 | 0.19984 | 0.19736 | 0.19738 | 0.19652 | 0.19772 | 0.19701 |
| $T_{liq}$ | °C. | 1290.0 | | | | 1290.0 | 1270.0 | | |

TABLE 6-continued

Exemplary Glass Compositions

Predicted and calculated properties

| | | | | | | | | | |
|---|---|---|---|---|---|---|---|---|---|
| $P_d$ [for $d_{RT}$] | g/cm³ | 5.0622 | 5.0932 | 4.9845 | 5.0742 | 5.0772 | 5.0794 | 5.0511 | 5.0772 |
| $P_n$ [for $n_d$] | | 1.9989 | 2.0001 | 2.0001 | 2.0033 | 2.0012 | 1.9955 | 2.0001 | 2.0012 |
| $P_{ref}$ [for $(n_d - 1)/d_{RT}$] | cm³/g | 0.1954 | 0.1942 | 0.1995 | 0.1957 | 0.1952 | 0.1938 | 0.1962 | 0.1952 |
| $P_n - (1.207 + 0.155 * P_d)$ | | 0.0073 | 0.0037 | 0.0205 | 0.0098 | 0.0073 | 0.0012 | 0.0102 | 0.0073 |
| $P_n - (1.217 + 0.155 * P_d)$ | | −0.0027 | −0.0064 | 0.0105 | −2.200E−04 | −0.0028 | −0.0088 | 1.700E−04 | −0.0028 |
| $P_{ref} - (0.196 + 0.0016 * (TiO_2 - La_2O_3))$ | | 0.0078 | 2.200E−04 | 0.0089 | 0.0050 | 0.0077 | 0.0031 | 0.0071 | 0.0077 |
| $P_{ref} - (0.199 + 0.0016 * (TiO_2 - La_2O_3))$ | | 0.0048 | −0.0028 | 0.0059 | 0.0020 | 0.0047 | 6.400E−05 | 0.0041 | 0.0047 |
| $P_{ref} - (0.199 + 0.0025 * (TiO_2 - La_2O_3))$ | | 0.0095 | −0.0016 | 0.0089 | 0.0049 | 0.0095 | 0.0030 | 0.0079 | 0.0095 |
| $P_{ref} - (0.204 + 0.0025 * (TiO_2 - La_2O_3))$ | | 0.0045 | −0.0066 | 0.0039 | −9.900E−05 | 0.0045 | −0.0020 | 0.0029 | 0.0045 |

| Exemplary Glass | | 33 | 34 | 35 | 36 | 37 | 38 | 39 | 40 |
|---|---|---|---|---|---|---|---|---|---|

Composition - mol. %

| | | | | | | | | | |
|---|---|---|---|---|---|---|---|---|---|
| $B_2O_3$ | mol. % | 19.56 | 20.39 | 17.00 | 16.01 | 20.00 | 20.36 | 20.37 | 20.37 |
| $La_2O_3$ | mol. % | 25.81 | 19.48 | 23.50 | 23.50 | 24.50 | 25.45 | 25.46 | 25.45 |
| $TiO_2$ | mol. % | 20.47 | 20.59 | 20.61 | 20.60 | 20.60 | 20.55 | 20.56 | 21.70 |
| $SiO_2$ | mol. % | 10.37 | 11.18 | 14.50 | 15.50 | 11.60 | 11.19 | 11.17 | 10.63 |
| CaO | mol. % | 5.54 | 0 | 6.79 | 6.79 | 6.81 | 5.02 | 6.78 | 5.02 |
| $Nb_2O_5$ | mol. % | 6.77 | 6.69 | 6.70 | 6.70 | 6.70 | 6.69 | 6.69 | 6.09 |
| $ZrO_2$ | mol. % | 7.96 | 7.90 | 7.89 | 7.90 | 7.90 | 7.88 | 7.88 | 7.88 |
| $Y_2O_3$ | mol. % | 0.89 | 6.90 | 3.00 | 3.00 | 0.90 | 0.90 | 0.90 | 0.90 |
| BaO | mol. % | 0 | 6.80 | 0 | 0 | 0 | 1.76 | 0 | 1.77 |
| ZnO | mol. % | 2.32 | 0 | 0 | 0 | 0 | 0 | 0 | 0 |
| $Gd_2O_3$ | mol. % | 0.30 | 0 | 0 | 0 | 0 | 0 | 0 | 0 |
| SrO | mol. % | 0 | 0.0596 | 0 | 0 | 0 | 0.015 | 0 | 0.0149 |
| $Yb_2O_3$ | mol. % | 0 | 0 | 0 | 0 | 1.00 | 0 | 0 | 0 |
| $CeO_2$ | mol. % | 0 | 0 | 0 | 0 | 0 | 0.15 | 0.15 | 0.15 |
| $Na_2O$ | mol. % | 0 | 0 | 0 | 0 | 0 | 0.0251 | 0.0248 | 0.025 |
| $Ta_2O_5$ | mol. % | 0 | 0.007 | 0.0069 | 0.0069 | 0.007 | 0.007 | 0.007 | 0.007 |
| $Fe_2O_3$ | mol. % | 0 | 0 | 0 | 0.0095 | 0 | 0 | 0 | 0 |

Measured properties

| | | | | | | | | | |
|---|---|---|---|---|---|---|---|---|---|
| $n_d$ | | 1.994 | | | | | | | |
| $d_{RT}$ | g/cm³ | 5.054 | 4.965 | 4.868 | 4.916 | 4.980 | | | |
| $(n_d - 1)/d_{RT}$ | cm³/g | 0.19668 | | | | | | | |
| 15-min devit test (0/1) | | | | | | | 1 | 1 | 1 |
| $T_g$ | °C | | | 729.20 | 731.90 | 721.60 | | | |
| $T_x$ | °C | | | 891.30 | 899.90 | 870.00 | | | |

Predicted and calculated properties

| | | | | | | | | | |
|---|---|---|---|---|---|---|---|---|---|
| $P_d$ [for $d_{RT}$] | g/cm³ | 5.135 | 5.0518 | 5.0039 | 5.0094 | 5.0804 | 5.0733 | 5.0297 | 5.0748 |
| $P_n$ [for $n_d$] | | 2.0098 | 1.9973 | 1.9986 | 1.9991 | 2.0022 | 1.9988 | 1.9974 | 1.9997 |
| $P_{ref}$ [for $(n_d - 1)/d_{RT}$] | cm³/g | 0.1944 | 0.1949 | 0.1979 | 0.1977 | 0.1951 | 0.1946 | 0.1965 | 0.1948 |
| $P_n - (1.207 + 0.155 * P_d)$ | | 0.0069 | 0.0073 | 0.0160 | 0.0157 | 0.0078 | 0.0054 | 0.0108 | 0.0061 |
| $P_n - (1.217 + 0.155 * P_d)$ | | −0.0031 | −0.0027 | 0.0060 | 0.0057 | −0.0023 | −0.0046 | 8.300E−04 | −0.0039 |
| $P_{ref} - (0.196 + 0.0016 * (TiO_2 - La_2O_3))$ | | 0.0069 | −0.0029 | 0.0065 | 0.0064 | 0.0053 | 0.0064 | 0.0083 | 0.0048 |
| $P_{ref} - (0.199 + 0.0016 * (TiO_2 - La_2O_3))$ | | 0.0039 | −0.0059 | 0.0035 | 0.0034 | 0.0023 | 0.0034 | 0.0053 | 0.0018 |
| $P_{ref} - (0.199 + 0.0025 * (TiO_2 - La_2O_3))$ | | 0.0087 | −0.0069 | 0.0061 | 0.0060 | 0.0058 | 0.0078 | 0.0097 | 0.0052 |
| $P_{ref} - (0.204 + 0.0025 * (TiO_2 - La_2O_3))$ | | 0.0037 | −0.0119 | 0.0011 | 9.900E−04 | 8.200E−04 | 0.0028 | 0.0047 | 2.100E−04 |

| Exemplary Glass | | 41 | 42 | 43 | 44 | 45 | 46 | 47 | 48 |
|---|---|---|---|---|---|---|---|---|---|

Composition - mol. %

| | | | | | | | | | |
|---|---|---|---|---|---|---|---|---|---|
| $B_2O_3$ | mol. % | 20.34 | 20.36 | 20.63 | 18.01 | 19.99 | 19.99 | 18.34 | 20.39 |
| $La_2O_3$ | mol. % | 25.43 | 20.46 | 24.90 | 23.51 | 24.51 | 24.52 | 25.24 | 23.54 |
| $TiO_2$ | mol. % | 23.82 | 20.24 | 23.98 | 22.48 | 22.49 | 22.49 | 21.69 | 20.58 |
| $SiO_2$ | mol. % | 10.43 | 11.17 | 12.12 | 10.77 | 10.79 | 10.79 | 9.55 | 11.26 |
| CaO | mol. % | 0.0569 | 0.0278 | 0 | 10.00 | 5.00 | 1.99 | 4.83 | 0 |
| $Nb_2O_5$ | mol. % | 6.68 | 6.68 | 6.00 | 4.88 | 5.88 | 5.88 | 7.17 | 6.70 |
| $WO_3$ | mol. % | 0 | 0 | 0.50 | 0 | 0 | 2.00 | 0 | 0 |
| $ZrO_2$ | mol. % | 5.33 | 7.88 | 6.00 | 6.34 | 7.34 | 7.34 | 8.44 | 7.88 |
| $Y_2O_3$ | mol. % | 0.90 | 5.89 | 3.43 | 0 | 2.00 | 2.00 | 3.06 | 2.88 |
| BaO | mol. % | 6.78 | 6.49 | 2.05 | 4.00 | 2.00 | 2.00 | 0 | 6.48 |
| ZnO | mol. % | 0 | 0.31 | 0.39 | 0 | 0 | 0 | 1.35 | 0 |
| $Gd_2O_3$ | mol. % | 0 | 0.30 | 0 | 0 | 0 | 0 | 0.32 | 0.29 |
| SrO | mol. % | 0.0462 | 0.0452 | 0 | 0 | 0 | 1.00 | 0 | 0 |

TABLE 6-continued

| Exemplary Glass Compositions | | | | | | | | | |
|---|---|---|---|---|---|---|---|---|---|
| $CeO_2$ | mol. % | 0.15 | 0.12 | 0 | 0 | 0 | 0 | 0 | 0 |
| $Na_2O$ | mol. % | 0.0257 | 0.0252 | 0 | 0 | 0 | 0 | 0 | 0 |
| $Ta_2O_5$ | mol. % | 0.0072 | 0.0071 | 0 | 0 | 0 | 0 | 0 | 0 |
| Measured properties | | | | | | | | | |
| $n_d$ | | | | | | | | | 1.984 |
| $d_{RT}$ | g/cm³ | | 5.028 | | | | 5.080 | | 5.068 |
| $(n_d - 1)/d_{RT}$ | cm³/g | | | | | | | | 0.19416 |
| 15-min devit test (0/1) | | 1 | 1 | | | | | | |
| Predicted and calculated properties | | | | | | | | | |
| $P_d$ [for $d_{RT}$] | g/cm³ | 5.1607 | 5.0986 | 5.0916 | 5.0075 | 5.0559 | 5.1416 | 5.207 | 5.1698 |
| $P_n$ [for $n_d$] | | 2.009 | 1.9991 | 2.0057 | 1.9845 | 2.000 | 2.008 | 2.0322 | 2.0033 |
| $P_{ref}$ [for $(n_d - 1)/d_{RT}$] | cm³/g | 0.1929 | 0.1932 | 0.1956 | 0.1949 | 0.1959 | 0.1944 | 0.1958 | 0.1907 |
| $P_n - (1.207 + 0.155 * P_d)$ | | 0.0021 | 0.0018 | 0.0095 | 0.0014 | 0.0093 | 0.0040 | 0.0181 | -0.0051 |
| $P_n - (1.217 + 0.155 * P_d)$ | | -0.0079 | -0.0082 | -5.200E-04 | -0.0086 | -7.100E-04 | -0.0060 | 0.0081 | -0.0151 |
| $P_{ref} - (0.196 + 0.0016 * (TiO_2 - La_2O_3))$ | | -4.900E-04 | -0.0025 | 0.0011 | 5.500E-04 | 0.0031 | 0.0017 | 0.0055 | -5.400E-04 |
| $P_{ref} - (0.199 + 0.0016 * (TiO_2 - La_2O_3))$ | | -0.0035 | -0.0055 | -0.0019 | -0.0025 | 1.000E-04 | -0.0013 | 0.0025 | -0.0035 |
| $P_{ref} - (0.199 + 0.0025 * (TiO_2 - La_2O_3))$ | | -0.0020 | -0.0053 | -0.0010 | -0.0015 | 0.0019 | 4.800E-04 | 0.0057 | -8.700E-04 |
| $P_{ref} - (0.204 + 0.0025 * (TiO_2 - La_2O_3))$ | | -0.0070 | -0.0103 | -0.0060 | -0.0065 | -0.0031 | -0.0045 | 6.900E-04 | -0.0059 |

| Exemplary Glass | | 49 | 50 | 51 | 52 | 53 | 54 | 55 | 56 |
|---|---|---|---|---|---|---|---|---|---|
| Composition - mol. % | | | | | | | | | |
| $B_2O_3$ | mol. % | 20.37 | 20.39 | 18.63 | 18.40 | 18.78 | 18.77 | 20.11 | 16.49 |
| $La_2O_3$ | mol. % | 23.54 | 23.53 | 24.67 | 23.54 | 22.89 | 21.03 | 25.41 | 25.49 |
| $TiO_2$ | mol. % | 22.59 | 20.58 | 21.31 | 20.57 | 22.99 | 22.99 | 21.49 | 20.59 |
| $SiO_2$ | mol. % | 11.26 | 11.27 | 15.44 | 13.25 | 15.23 | 15.22 | 12.39 | 15.08 |
| CaO | mol. % | 0 | 6.49 | 0 | 0 | 0 | 0 | 0 | 0 |
| $Nb_2O_5$ | mol. % | 6.70 | 6.70 | 6.98 | 6.70 | 8.00 | 7.50 | 9.70 | 6.70 |
| $WO_3$ | mol. % | 0 | 0 | 2.00 | 0 | 0 | 0 | 0.60 | 0 |
| $ZrO_2$ | mol. % | 7.89 | 7.87 | 8.00 | 7.88 | 7.99 | 8.01 | 6.90 | 7.90 |
| $Y_2O_3$ | mol. % | 0.89 | 2.88 | 2.54 | 2.88 | 3.50 | 6.00 | 3.40 | 0.90 |
| BaO | mol. % | 6.48 | 0 | 0 | 6.48 | 0.61 | 0.47 | 0 | 6.80 |
| $Gd_2O_3$ | mol. % | 0.29 | 0.30 | 0.42 | 0.29 | 0 | 0 | 0 | 0 |
| SrO | mol. % | 0 | 0 | 0 | 0 | 0 | 0 | 0 | 0.0464 |
| $Ta_2O_5$ | mol. % | 0 | 0 | 0 | 0 | 0 | 0 | 0 | 0.0072 |
| Measured properties | | | | | | | | | |
| $d_{RT}$ | g/cm³ | | | | | | | | 5.003 |
| $T_g$ | °C. | | | | | | | | 719.40 |
| $T_x$ | °C. | | | | | | | | 875.20 |
| Predicted and calculated properties | | | | | | | | | |
| $P_d$ [for $d_{RT}$] | g/cm³ | 5.0872 | 5.0052 | 5.1124 | 5.1805 | 4.936 | 4.9083 | 5.1075 | 5.2245 |
| $P_n$ [for $n_d$] | | 2.0008 | 1.9974 | 2.009 | 2.0045 | 2.0065 | 2.0035 | 2.0317 | 2.0062 |
| $P_{ref}$ [for $(n_d - 1)/d_{RT}$] | cm³/g | 0.1947 | 0.1978 | 0.1956 | 0.1905 | 0.2034 | 0.2039 | 0.2005 | 0.1886 |
| $P_n - (1.207 + 0.155 * P_d)$ | | 0.0053 | 0.0145 | 0.0096 | -0.0055 | 0.0344 | 0.0357 | 0.0330 | -0.0106 |
| $P_n - (1.217 + 0.155 * P_d)$ | | -0.0047 | 0.0046 | -3.900E-04 | -0.0155 | 0.0244 | 0.0257 | 0.0230 | -0.0206 |
| $P_{ref} - (0.196 + 0.0016 * (TiO_2 - La_2O_3))$ | | 2.000E-04 | 0.0065 | 0.0050 | -7.900E-04 | 0.0072 | 0.0048 | 0.0108 | 4.100E-04 |
| $P_{ref} - (0.199 + 0.0016 * (TiO_2 - La_2O_3))$ | | -0.0028 | 0.0035 | 0.0020 | -0.0038 | 0.0042 | 0.0018 | 0.0078 | -0.0026 |
| $P_{ref} - (0.199 + 0.0025 * (TiO_2 - La_2O_3))$ | | -0.0019 | 0.0062 | 0.0050 | -0.0011 | 0.0041 | 1.200E-06 | 0.0113 | 0.0018 |
| $P_{ref} - (0.204 + 0.0025 * (TiO_2 - La_2O_3))$ | | -0.0069 | 0.0012 | 2.300E-05 | -0.0061 | -9.000E-04 | -0.0050 | 0.0063 | -0.0032 |

| Exemplary Glass | | 57 | 58 | 59 | 60 | 61 | 62 | 63 | 64 |
|---|---|---|---|---|---|---|---|---|---|
| Composition - mol. % | | | | | | | | | |
| $B_2O_3$ | mol. % | 17.49 | 18.38 | 17.96 | 16.66 | 17.97 | 20.35 | 20.35 | 20.34 |
| $La_2O_3$ | mol. % | 25.50 | 25.54 | 25.96 | 26.28 | 25.95 | 25.45 | 25.44 | 25.43 |
| $TiO_2$ | mol. % | 20.60 | 20.27 | 19.95 | 22.24 | 19.95 | 22.61 | 24.93 | 23.79 |
| $SiO_2$ | mol. % | 14.08 | 13.26 | 8.98 | 9.32 | 9.97 | 10.20 | 10.17 | 10.15 |
| CaO | mol. % | 0 | 0 | 14.98 | 14.97 | 9.98 | 3.60 | 0.0568 | 0.0568 |
| $Nb_2O_5$ | mol. % | 6.70 | 6.70 | 7.99 | 5.37 | 7.98 | 5.61 | 6.68 | 6.42 |
| $ZrO_2$ | mol. % | 7.89 | 7.89 | 3.99 | 4.97 | 3.99 | 7.88 | 4.48 | 5.90 |
| $Y_2O_3$ | mol. % | 0.90 | 0.88 | 0 | 0 | 0 | 0.90 | 0.90 | 0.90 |
| BaO | mol. % | 6.79 | 6.48 | 0 | 0 | 3.99 | 3.19 | 6.78 | 6.78 |
| ZnO | mol. % | 0 | 0.32 | 0 | 0 | 0 | 0 | 0 | 0 |
| $Gd_2O_3$ | mol. % | 0 | 0.29 | 0 | 0 | 0 | 0 | 0 | 0 |

TABLE 6-continued

| Exemplary Glass Compositions | | | | | | | | | |
|---|---|---|---|---|---|---|---|---|---|
| SrO | mol. % | 0.0464 | 0 | 0 | 0 | 0.0303 | 0.03 | 0.0461 | 0.0461 |
| $CeO_2$ | mol. % | 0 | 0 | 0.15 | 0.16 | 0.16 | 0.15 | 0.15 | 0.15 |
| $Na_2O$ | mol. % | 0 | 0 | 0.0247 | 0.0242 | 0.0254 | 0.025 | 0.0257 | 0.0257 |
| $Ta_2O_5$ | mol. % | 0.0073 | 0 | 0.0035 | 0 | 0.0036 | 0.0035 | 0.0072 | 0.0072 |
| $Fe_2O_3$ | mol. % | 0 | 0 | 0.0096 | 0.0094 | 0.0098 | 0 | 0 | 0 |

| Measured properties | | |
|---|---|---|
| $n_d$ | | 1.9829 |
| $d_{RT}$ | g/cm$^3$ | 5.013 |
| $(n_d - 1)/d_{RT}$ | cm$^3$/g | 0.19607 |
| $T_g$ | ° C. | 721.80 |
| $T_x$ | ° C. | 859.60 |
| $n_{531.9\ nm}$ | | 1.9941 |
| $n_{632.8\ nm}$ | | 1.9764 |
| E | GPa | 120.80 |
| Nanostrip 2X | mg/cm$^2$ | 0.63000 |

| Predicted and calculated properties | | | | | | | | | |
|---|---|---|---|---|---|---|---|---|---|
| $P_d$ [for $d_{RT}$] | g/cm$^3$ | 5.2192 | 5.2368 | 5.076 | 5.1127 | 5.1599 | 5.1119 | 5.1475 | 5.1722 |
| $P_n$ [for $n_d$] | | 2.0056 | 2.006 | 2.0104 | 2.0058 | 2.0105 | 2.0016 | 2.011 | 2.0094 |
| $P_{ref}$ [for $(n_d - 1)/d_{RT}$] | cm$^3$/g | 0.1887 | 0.1881 | 0.1973 | 0.1946 | 0.193 | 0.1935 | 0.1942 | 0.1924 |
| $P_n - (1.207 + 0.155 * P_d)$ | | −0.0103 | −0.0127 | 0.0167 | 0.0064 | 0.0037 | 0.0023 | 0.0061 | 7.600E−04 |
| $P_n - (1.217 + 0.155 * P_d)$ | | −0.0203 | −0.0227 | 0.0067 | −0.0036 | −0.0063 | −0.0077 | −0.0039 | −0.0092 |
| $P_{ref} - (0.196 + 0.0016 * (TiO_2 - La_2O_3))$ | | 5.400E−04 | 5.000E−04 | 0.0109 | 0.0051 | 0.0066 | 0.0020 | −9.700E−04 | −9.500E−04 |
| $P_{ref} - (0.199 + 0.0016 * (TiO_2 - La_2O_3))$ | | −0.0025 | −0.0025 | 0.0079 | 0.0021 | 0.0036 | −9.700E−04 | −0.0040 | −0.0040 |
| $P_{ref} - (0.199 + 0.0025 * (TiO_2 - La_2O_3))$ | | 0.0020 | 0.0023 | 0.0133 | 0.0057 | 0.0090 | 0.0016 | −0.0035 | −0.0025 |
| $P_{ref} - (0.204 + 0.0025 * (TiO_2 - La_2O_3))$ | | −0.0031 | −0.0028 | 0.0083 | 7.300E−04 | 0.0040 | −0.0034 | −0.0085 | −0.0075 |

| Exemplary Glass | | 65 | 66 | 67 | 68 | 69 | 70 | 71 | 72 |
|---|---|---|---|---|---|---|---|---|---|
| Composition - mol. % | | | | | | | | | |
| $B_2O_3$ | mol. % | 20.31 | 20.32 | 20.33 | 20.91 | 28.44 | 22.93 | 24.89 | 22.88 |
| $La_2O_3$ | mol. % | 22.92 | 20.93 | 20.93 | 20.94 | 24.94 | 25.44 | 25.43 | 25.44 |
| $TiO_2$ | mol. % | 20.52 | 22.92 | 16.97 | 17.67 | 26.63 | 20.25 | 20.25 | 20.24 |
| $SiO_2$ | mol. % | 10.96 | 10.55 | 8.96 | 9.47 | 6.88 | 8.57 | 6.61 | 8.63 |
| CaO | mol. % | 0.0569 | 0.0552 | 0.0297 | 0.0296 | 0.0542 | 0.0571 | 0.0571 | 0.0567 |
| $Nb_2O_5$ | mol. % | 9.47 | 9.46 | 9.47 | 9.47 | 6.51 | 6.68 | 6.68 | 6.68 |
| $WO_3$ | mol. % | 0 | 0 | 7.84 | 8.78 | 0 | 0 | 0 | 0 |
| $ZrO_2$ | mol. % | 7.87 | 7.87 | 7.59 | 7.56 | 6.36 | 7.88 | 7.88 | 7.88 |
| $Y_2O_3$ | mol. % | 0.90 | 0.90 | 0.89 | 0.58 | 0 | 0.90 | 0.90 | 0.89 |
| BaO | mol. % | 6.78 | 6.78 | 6.78 | 4.39 | 0 | 4.63 | 4.64 | 3.30 |
| ZnO | mol. % | 0 | 0 | 0 | 0 | 0 | 2.14 | 2.15 | 3.48 |
| $Gd_2O_3$ | mol. % | 0 | 0 | 0 | 0 | 0 | 0.30 | 0.30 | 0.30 |
| SrO | mol. % | 0.0462 | 0.0597 | 0.0483 | 0.032 | 0 | 0.0309 | 0.0309 | 0.0307 |
| $CeO_2$ | mol. % | 0.14 | 0.13 | 0.13 | 0.13 | 0.15 | 0.15 | 0.15 | 0.15 |
| $Na_2O$ | mol. % | 0.0257 | 0.025 | 0.0269 | 0.0268 | 0.0245 | 0.0258 | 0.0258 | 0.0257 |
| $Ta_2O_5$ | mol. % | 0.0072 | 0.007 | 0.0075 | 0.0075 | 0.0069 | 0.0072 | 0.0072 | 0.0072 |
| Predicted and calculated properties | | | | | | | | | |
| $P_d$ [for $d_{RT}$] | g/cm$^3$ | 5.0573 | 4.9293 | 5.2794 | 5.2174 | 4.8016 | 5.1842 | 5.1734 | 5.166 |
| $P_n$ [for $n_d$] | | 2.0121 | 2.0102 | 2.0279 | 2.0264 | 1.9861 | 2.0026 | 2.0013 | 2.0024 |
| $P_{ref}$ [for $(n_d - 1)/d_{RT}$] | cm$^3$/g | 0.1984 | 0.2047 | 0.1919 | 0.195 | 0.2062 | 0.1901 | 0.1904 | 0.1911 |
| $P_n - (1.207 + 0.155 * P_d)$ | | 0.0212 | 0.0392 | 0.0026 | 0.0107 | 0.0349 | −0.0080 | −0.0076 | −0.0053 |
| $P_n - (1.217 + 0.155 * P_d)$ | | 0.0112 | 0.0292 | −0.0074 | 7.200E−04 | 0.0249 | −0.0180 | −0.0176 | −0.0153 |
| $P_{ref} - (0.196 + 0.0016 * (TiO_2 - La_2O_3))$ | | 0.0062 | 0.0055 | 0.0023 | 0.0043 | 0.0075 | 0.0024 | 0.0027 | 0.0034 |
| $P_{ref} - (0.199 + 0.0016 * (TiO_2 - La_2O_3))$ | | 0.0032 | 0.0025 | −7.400E−04 | 0.0013 | 0.0045 | −5.800E−04 | −3.200E−04 | 4.300E−04 |
| $P_{ref} - (0.199 + 0.0025 * (TiO_2 - La_2O_3))$ | | 0.0054 | 6.900E−04 | 0.0028 | 0.0042 | 0.0030 | 0.0041 | 0.0044 | 0.0051 |
| $P_{ref} - (0.204 + 0.0025 * (TiO_2 - La_2O_3))$ | | 3.600E−04 | −0.0043 | −0.0022 | −7.900E−04 | −0.0020 | −9.000E−04 | −6.600E−04 | 1.100E−04 |

Table 7 below lists the glass compositions and properties for Comparative Glasses C1-C32.

TABLE 7

| Compositions and Properties of Comparative Example Glasses | | | | | | | | | |
|---|---|---|---|---|---|---|---|---|---|
| Comparative Examples | | C1 | C2 | C3 | C4 | C5 | C6 | C7 | C8 |
| Reference | | [1] | [2] | [2] | [2] | [1] | [1] | [6] | [3] |
| Composition - mol. % | | | | | | | | | |
| La$_2$O$_3$ | mol. % | 22.83 | 20.95 | 20.95 | 20.95 | 22.88 | 25.54 | 25.17 | 16.66 |
| Nb$_2$O$_5$ | mol. % | 5.99 | 9.48 | 9.48 | 9.48 | 6.00 | 6.70 | 6.11 | 5.64 |
| B$_2$O$_3$ | mol. % | 22.69 | 21.18 | 21.27 | 21.60 | 21.69 | 20.37 | 12.27 | 20.52 |
| TiO$_2$ | mol. % | 18.13 | 10.25 | 14.30 | 11.35 | 18.15 | 20.27 | 22.46 | 22.36 |
| ZrO$_2$ | mol. % | 7.05 | 7.17 | 7.36 | 7.18 | 7.06 | 7.89 | 8.88 | 7.42 |
| SiO$_2$ | mol. % | 10.57 | 7.66 | 8.78 | 8.17 | 11.80 | 11.26 | 18.47 | 20.21 |
| CaO | mol. % | 8.35 | 0.0323 | 0.0309 | 0.032 | 8.35 | 0 | 0 | 0 |
| BaO | mol. % | 1.67 | 3.20 | 2.87 | 1.53 | 2.75 | 6.47 | 0 | 0 |
| Gd$_2$O$_3$ | mol. % | 0.26 | 0 | 0 | 0 | 0.26 | 0.29 | 3.58 | 3.00 |
| Y$_2$O$_3$ | mol. % | 0.41 | 0.43 | 0.38 | 0.21 | 0.41 | 0.88 | 0.38 | 4.11 |
| WO$_3$ | mol. % | 0.37 | 19.46 | 14.41 | 19.32 | 0.38 | 0 | 0 | 0 |
| Na$_2$O | mol. % | 1.40 | 0.0292 | 0.0279 | 0.0289 | 0 | 0 | 0 | 0 |
| ZnO | mol. % | 0.29 | 0 | 0 | 0 | 0.27 | 0.32 | 0 | 0 |
| CeO$_2$ | mol. % | 0 | 0.13 | 0.12 | 0.12 | 0 | 0 | 0 | 0 |
| Ta$_2$O$_5$ | mol. % | 0 | 0.0082 | 0.0078 | 0.0081 | 0 | 0 | 2.32 | 0 |
| SrO | mol. % | 0 | 0.0175 | 0.0167 | 0.0173 | 0 | 0 | 0 | 0 |
| As$_2$O$_3$ | mol. % | 0 | 0 | 0 | 0 | 0 | 0 | 0.35 | 0.0722 |
| Measured properties | | | | | | | | | |
| n$_d$ | | | | | | | | | 1.9575 |
| d$_{RT}$ | g/cm$^3$ | | | | | | | | 4.830 |
| (n$_d$ − 1)/d$_{RT}$ | cm$^3$/g | | | | | | | | 0.19824 |
| T$_{liq}$ | ° C. | | | | | | | 1300.0 | |
| n$_{531.9\ nm}$ | | | | | | | | | 1.9683 |
| n$_{632.8\ nm}$ | | | | | | | | | 1.9509 |
| Predicted and calculated properties | | | | | | | | | |
| P$_d$ [for d$_{RT}$] | g/cm$^3$ | 4.888 | 5.644 | 5.403 | 5.564 | 4.930 | 5.226 | 5.354 | 4.689 |
| P$_n$ [for n$_d$] | | 1.959 | 2.049 | 2.037 | 2.046 | 1.964 | 2.005 | 2.031 | 1.948 |
| P$_{ref}$ [for (n$_d$ − 1)/d$_{RT}$] | cm$^3$/g | 0.1947 | 0.1799 | 0.1888 | 0.1834 | 0.1938 | 0.1883 | 0.1907 | 0.2045 |

| Comparative Examples | | C9 | C10 | C11 | C12 | C13 | C14 | C15 | C16 |
|---|---|---|---|---|---|---|---|---|---|
| Reference | | [4] | [5] | [3] | [3] | [4] | [4] | [4] | [4] |
| Composition - mol. % | | | | | | | | | |
| La$_2$O$_3$ | mol. % | 19.16 | 20.97 | 16.42 | 25.18 | 21.42 | 19.01 | 21.42 | 20.86 |
| Nb$_2$O$_5$ | mol. % | 6.12 | 4.50 | 5.03 | 6.11 | 5.07 | 5.32 | 5.07 | 5.07 |
| B$_2$O$_3$ | mol. % | 20.39 | 17.70 | 22.24 | 12.27 | 17.77 | 20.24 | 17.77 | 17.77 |
| TiO$_2$ | mol. % | 21.38 | 25.34 | 22.03 | 22.47 | 25.44 | 22.72 | 25.43 | 25.43 |
| ZrO$_2$ | mol. % | 7.28 | 7.85 | 7.31 | 8.87 | 7.13 | 7.23 | 7.14 | 7.14 |
| SiO$_2$ | mol. % | 14.35 | 15.51 | 19.91 | 18.48 | 15.57 | 14.24 | 15.57 | 15.56 |
| Gd$_2$O$_3$ | mol. % | 4.54 | 4.44 | 2.95 | 3.58 | 3.90 | 4.51 | 4.46 | 4.46 |
| Y$_2$O$_3$ | mol. % | 1.59 | 0.74 | 4.05 | 0.38 | 0.74 | 1.58 | 0.18 | 0.74 |
| ZnO | mol. % | 5.19 | 2.95 | 0 | 0 | 2.96 | 5.16 | 2.95 | 2.96 |
| Ta$_2$O$_5$ | mol. % | 0 | 0 | 0 | 2.32 | 0 | 0 | 0 | 0 |
| As$_2$O$_3$ | mol. % | 0 | 0 | 0.0711 | 0.35 | 0 | 0 | 0 | 0 |
| Measured properties | | | | | | | | | |
| n$_d$ | | 1.9855 | 1.9988 | 1.9463 | 2.0214 | 2.0011 | 1.9859 | 2.0017 | 2.0011 |
| d$_{RT}$ | g/cm$^3$ | 5.070 | 5.120 | 4.780 | 5.400 | 5.110 | 5.060 | 5.140 | 5.120 |
| (n$_d$ − 1)/d$_{RT}$ | cm$^3$/g | 0.19438 | 0.19508 | 0.19797 | 0.18915 | 0.19591 | 0.19484 | 0.19488 | 0.19553 |
| T$_{liq}$ | ° C. | | 1220.0 | | | | | | |
| T$_g$ | ° C. | 698.00 | 713.00 | | | 719.00 | 700.00 | 717.00 | 718.00 |
| n$_{531.9\ nm}$ | | 1.9966 | 2.0102 | 1.9568 | 2.0383 | 2.0127 | 1.9970 | 2.0132 | 2.0127 |
| n$_{632.8\ nm}$ | | 1.9788 | 1.9919 | 1.9399 | 2.0114 | 1.9941 | 1.9791 | 1.9947 | 1.9941 |
| Predicted and calculated properties | | | | | | | | | |
| P$_d$ [for d$_{RT}$] | g/cm$^3$ | 5.046 | 5.111 | 4.634 | 5.354 | 5.083 | 5.029 | 5.110 | 5.096 |
| P$_n$ [for n$_d$] | | 1.987 | 1.999 | 1.934 | 2.031 | 2.000 | 1.984 | 2.001 | 2.001 |
| P$_{ref}$ [for (n$_d$ − 1)/d$_{RT}$] | cm$^3$/g | 0.1968 | 0.1966 | 0.2039 | 0.1907 | 0.198 | 0.1973 | 0.1974 | 0.1979 |

| Comparative Examples | | C17 | C18 | C19 | C20 | C21 | C22 | C23 | C24 |
|---|---|---|---|---|---|---|---|---|---|
| Reference | | [4] | [6] | [6] | [10] | [5] | [7] | [9] | [11] |
| Composition - mol. % | | | | | | | | | |
| La$_2$O$_3$ | mol. % | 21.35 | 25.43 | 21.81 | 25.15 | 25.75 | 25.20 | 24.62 | 22.50 |
| Nb$_2$O$_5$ | mol. % | 4.50 | 6.17 | 5.48 | 5.17 | 4.49 | 4.65 | 5.26 | 4.30 |
| B$_2$O$_3$ | mol. % | 17.70 | 12.40 | 21.81 | 28.35 | 17.66 | 20.41 | 10.58 | 24.70 |

TABLE 7-continued

Compositions and Properties of Comparative Example Glasses

| | | | | | | | | | |
|---|---|---|---|---|---|---|---|---|---|
| $TiO_2$ | mol. % | 25.35 | 22.69 | 26.35 | 24.12 | 26.40 | 25.81 | 26.41 | 24.99 |
| $ZrO_2$ | mol. % | 7.85 | 8.97 | 6.96 | 7.05 | 7.10 | 7.31 | 7.27 | 7.00 |
| $SiO_2$ | mol. % | 15.50 | 17.24 | 11.55 | 3.94 | 15.46 | 12.34 | 19.79 | 12.81 |
| $Gd_2O_3$ | mol. % | 4.07 | 3.62 | 3.08 | 2.09 | 0 | 0 | 0 | 0 |
| $Y_2O_3$ | mol. % | 0.74 | 0.38 | 0.36 | 0.84 | 0.19 | 3.28 | 0 | 3.50 |
| $WO_3$ | mol. % | 0 | 0 | 0.44 | 0 | 0 | 0.50 | 0 | 0.20 |
| $ZnO$ | mol. % | 2.95 | 0 | 0 | 3.30 | 2.95 | 0 | 0 | 0 |
| $Ta_2O_5$ | mol. % | 0 | 2.35 | 0 | 0 | 0 | 0 | 4.76 | 0 |
| $As_2O_3$ | mol. % | 0 | 0.17 | 0 | 0 | 0 | 0 | 0 | 0 |
| $SnO_2$ | mol. % | 0 | 0.57 | 0.68 | 0 | 0 | 0 | 0 | 0 |
| $Li_2O$ | mol. % | 0 | 0 | 1.47 | 0 | 0 | 0.52 | 0 | 0 |
| $Sb_2O_3$ | mol. % | 0 | 0 | 0.0104 | 0 | 0 | 0 | 0 | 0 |
| $PbO$ | mol. % | 0 | 0 | 0 | 0 | 0 | 0 | 1.31 | 0 |
| Measured properties | | | | | | | | | |
| $n_d$ | | 1.9991 | 2.0237 | 2.0014 | 2.0001 | 2.0022 | 2.000 | 2.0373 | 1.980 |
| $d_{RT}$ | g/cm³ | 5.120 | | | | 5.030 | | | 4.800 |
| $(n_d - 1)/d_{RT}$ | cm³/g | 0.19514 | | | | 0.19924 | | | 0.20417 |
| $T_{liq}$ | °C | | 1300.0 | 1180.0 | | 1210.0 | | | 1125.0 |
| $Log(\eta_{liq})$ | P | | | | | | | | 0.80000 |
| $T_g$ | °C | 716.00 | | | | 713.00 | | | 717.00 |
| $n_{531.9\,nm}$ | | 2.0105 | 2.0353 | 2.0131 | 2.0115 | 2.0138 | 2.0114 | 2.0502 | 1.9909 |
| $n_{632.8\,nm}$ | | 1.9921 | 2.0165 | 1.9942 | 1.9932 | 1.9952 | 1.9931 | 2.0295 | 1.9734 |
| Predicted and calculated properties | | | | | | | | | |
| $P_d$ [for $d_{RT}$] | g/cm³ | 5.104 | 5.391 | 4.967 | 5.130 | 4.995 | 5.048 | 5.051 | 4.783 |
| $P_n$ [for $n_d$] | | 1.999 | 2.038 | 1.996 | 2.002 | 1.994 | 2.003 | 2.012 | 1.963 |
| $P_{ref}$ [for $(n_d - 1)/d_{RT}$] | | 0.1967 | 0.1906 | 0.2022 | 0.1946 | 0.1983 | 0.1974 | 0.1996 | 0.2014 |

| Comparative Examples | | C25 | C26 | C27 | C28 | C29 | C30 | C31 | C32 |
|---|---|---|---|---|---|---|---|---|---|
| Reference | | [8] | [11] | [3] | [5] | [11] | [11] | [5] | [5] |
| Composition - mol. % | | | | | | | | | |
| $La_2O_3$ | mol. % | 22.91 | 20.50 | 25.43 | 23.31 | 22.50 | 20.50 | 22.49 | 23.41 |
| $Nb_2O_5$ | mol. % | 5.57 | 4.00 | 6.17 | 4.59 | 4.30 | 4.00 | 5.36 | 4.62 |
| $B_2O_3$ | mol. % | 23.21 | 21.00 | 12.40 | 20.33 | 21.69 | 21.00 | 21.37 | 20.51 |
| $TiO_2$ | mol. % | 23.68 | 25.01 | 22.69 | 22.46 | 25.00 | 25.01 | 26.05 | 25.82 |
| $ZrO_2$ | mol. % | 7.25 | 7.00 | 8.97 | 7.26 | 7.00 | 7.00 | 7.27 | 7.29 |
| $SiO_2$ | mol. % | 10.85 | 15.79 | 17.24 | 15.82 | 12.80 | 15.80 | 12.07 | 12.10 |
| $CaO$ | mol. % | 0 | 3.00 | 0 | 0 | 3.00 | 0 | 0 | 0 |
| $Gd_2O_3$ | mol. % | 4.05 | 0 | 3.62 | 3.02 | 0 | 0 | 2.38 | 3.22 |
| $Y_2O_3$ | mol. % | 0.57 | 3.50 | 0.38 | 0.19 | 3.50 | 3.50 | 0.38 | 0.38 |
| $WO_3$ | mol. % | 0 | 0.20 | 0 | 0 | 0.20 | 0.20 | 0 | 0 |
| $ZnO$ | mol. % | 1.92 | 0 | 0 | 3.02 | 0 | 0 | 2.64 | 2.64 |
| $Ta_2O_5$ | mol. % | 0 | 0 | 2.35 | 0 | 0 | 0 | 0 | 0 |
| $As_2O_3$ | mol. % | 0 | 0 | 0.17 | 0 | 0 | 0 | 0 | 0 |
| $SnO_2$ | mol. % | 0 | 0 | 0.57 | 0 | 0 | 0 | 0 | 0 |
| $Li_2O$ | mol. % | 0 | 0 | 0 | 0 | 0 | 2.99 | 0 | 0 |
| Measured properties | | | | | | | | | |
| $n_d$ | | 2.0015 | 1.970 | 2.025 | 1.9795 | 1.980 | 1.970 | 2.0034 | 2.0017 |
| $d_{RT}$ | g/cm³ | | 4.800 | 5.380 | 5.070 | 4.900 | 4.800 | 5.030 | 5.120 |
| $(n_d - 1)/d_{RT}$ | cm³/g | | 0.20208 | 0.19052 | 0.19320 | 0.20000 | 0.20208 | 0.19948 | 0.19564 |
| $T_{liq}$ | °C | | 1150.0 | | 1190.0 | 1137.0 | 1150.0 | 1190.0 | 1190.0 |
| $Log(\eta_{liq})$ | P | | 0.70000 | | | 0.70000 | 0.60000 | | |
| $T_g$ | °C | | 717.00 | | 713.00 | 717.00 | 696.00 | 706.00 | 714.00 |
| $n_{531.9\,nm}$ | | 2.0129 | 1.9815 | 2.0368 | 1.9902 | 1.9912 | 1.9815 | 2.0151 | 2.0131 |
| $n_{632.8\,nm}$ | | 1.9946 | 1.9630 | 2.0178 | 1.9729 | 1.9732 | 1.9630 | 1.9963 | 1.9947 |
| Predicted and calculated properties | | | | | | | | | |
| $P_d$ [for $d_{RT}$] | g/cm³ | 5.137 | 4.695 | 5.391 | 5.063 | 4.851 | 4.675 | 4.980 | 5.125 |
| $P_n$ [for $n_d$] | | 2.000 | 1.954 | 2.038 | 1.978 | 1.975 | 1.951 | 1.996 | 2.003 |
| $P_{ref}$ [for $(n_d - 1)/d_{RT}$] | | 0.1951 | 0.2039 | 0.1906 | 0.1929 | 0.2008 | 0.2039 | 0.2011 | 0.1962 |

The reference key for each of the Comparative Glasses listed in Table 7 is as follows: [1] SP20-266PZ; [2] SP21-055PZ; [3] U.S. Pat. No. 4,584,279A; [4] U.S. Pat. No. 8,661,853B2; [5] U.S. Pat. No. 8,728,963B2; [6] WO2012099168A1; [7] CN111320384; [8] TW202012333; [9] U.S. Pat. No. 4,439,531A; [10] U.S. Pat. No. 9,487,432B2; [11] WO2020045417A1.

Figure 5:
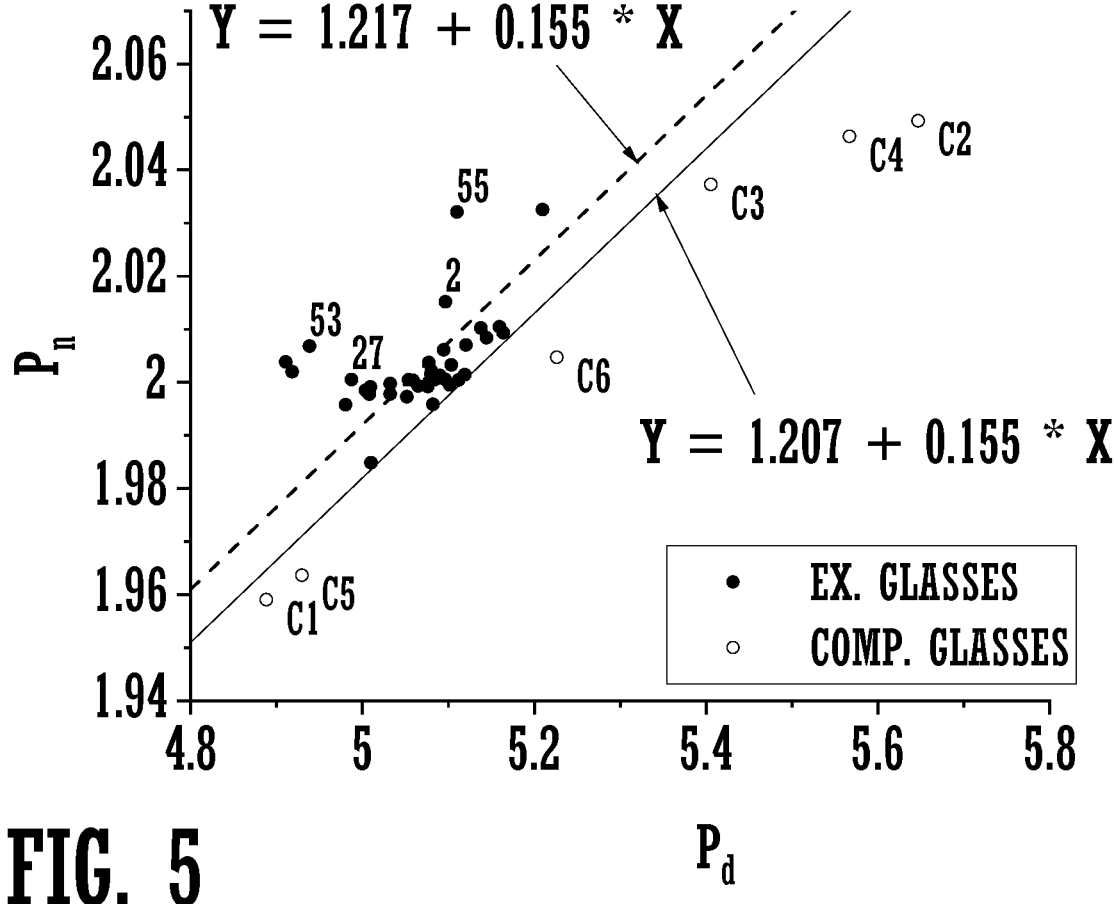
FIG. 5 is a plot illustrating the relationship between the density parameter $P_d$ calculated by formula (II) and the refractive index parameter $P_n$ calculated by formula (I) for some Comparative Glasses and some Exemplary Glasses according to an embodiment of the present disclosure.

FIG. 5 is a plot showing the relationship between the density parameter $P_d$ and the refractive index parameter $P_n$ for some of the Exemplary Glasses and some of the Comparative Glasses. The Exemplary Glasses (filled circles) are the Examples 2, 4, 6, 9, 11, 16 to 18, 20, 22, 25 to 47, 49, 50 and 53 to 55 from Table 6. The Comparative Glasses (open circles) are the Examples C1 to C6 from Table 7. The density parameter $P_d$ that predicts density at room temperature was determined according to Formula (II). The refractive index parameter $P_n$ that predicts refractive index at 587.56 nm was determined according to Formula (I). All of the Exemplary Glasses and Comparative Glasses shown in FIG. 5 have the features specified in Table 8. In Table 8, the specification "Not limited" refers to a limitation that was not considered when selecting the compositions.

TABLE 8

| Limitations for glass compositions shown in FIG. 5 | | | |
|---|---|---|---|
| Quantity | Unit | Min | Max |
| $B_2O_3$ | mol. % | 0.5 | 29 |
| $TiO_2$ | mol. % | 0 | 25.2 |
| $Bi_2O_3$ | mol. % | 0 | 20 |
| $TeO_2$ | mol. % | 0 | 20 |
| $P_2O_5$ | mol. % | 0 | 15 |
| $Nb_2O_5$ | mol. % | 0 | 10.5 |
| $Al_2O_3$ | mol. % | 0 | 10 |
| $MoO_3$ | mol. % | 0 | 5 |
| $V_2O_5$ | mol. % | 0 | 4 |
| $GeO_2$ | mol. % | 0 | 2.5 |
| ZnO | mol. % | 0 | 2.5 |
| $Ta_2O_5$ | mol. % | 0 | 1 |
| $R_mO_n$ | mol. % | 95 | Not limited |
| $RE_mO_n$ | mol. % | 0 | 29 |
| $SiO_2 + B_2O_3 + P_2O_5$ | mol. % | 10 | Not limited |
| $SiO_2 + B_2O_3$ | mol. % | Not limited | 34 |
| $CaO + SrO + BaO + Y_2O_3$ | mol. % | 0.3 | Not limited |
| $R_2O + RO$ | mol. % | 0 | 25 |
| $Y_2O_3 - Gd_2O_3$ | mol. % | −2 | Not limited |
| $P_d$ | g/cm³ | Not limited | 6 |

The above-enumerated Comparative Glasses were selected as having the highest refractive index parameter $P_n$ at comparable values of density parameter $P_d$ among the known glasses that have the features specified in Table 8.

The line corresponding to the formula y=1.207+0.155*x shown in FIG. 5 provides a visual representation of the differences between the Comparative Glasses having the features specified in Table 8 and the Exemplary Glasses 2, 4, 6, 9, 11, 16 to 18, 20, 22, 25 to 47, 49, 50 and 53 to 55. As can be seen in FIG. 5, the mentioned Exemplary Glasses (filled circles) and none of the Comparative Glasses (open circles) represented in FIG. 5 fall above the line y=1.207+0.155*x, where y corresponds to the refractive index parameter $P_n$ and x corresponds to the density parameter $P_d$. In other words, some of the Exemplary Glasses and none of the Comparative Glasses represented in FIG. 5 satisfy the following formula (IV)(a):

$$P_n-(1.207+0.155*P_d)>0.00 \quad\quad\quad (IV)(a)$$

As can also be seen in FIG. 5, some of Exemplary Glasses and none of the Comparative Glasses represented in FIG. 5 fall above the line y=1.217+0.155*x, where y corresponds to the refractive index parameter $P_n$ and x corresponds to the density parameter $P_d$. In other words, some of the Exemplary Glasses and none of the Comparative Glasses represented in FIG. 5 satisfy the following formula (IV)(b):

$$P_n-(1.217+0.155*P_d)>0.00 \quad\quad\quad (IV)(b)$$

The Exemplary Examples represented in FIG. 5 are, by prediction, superior in terms of the combination of $d_{RT}$ and $n_d$ to the best known Comparative Glasses that have the features specified in Table 8.

Figure 6:
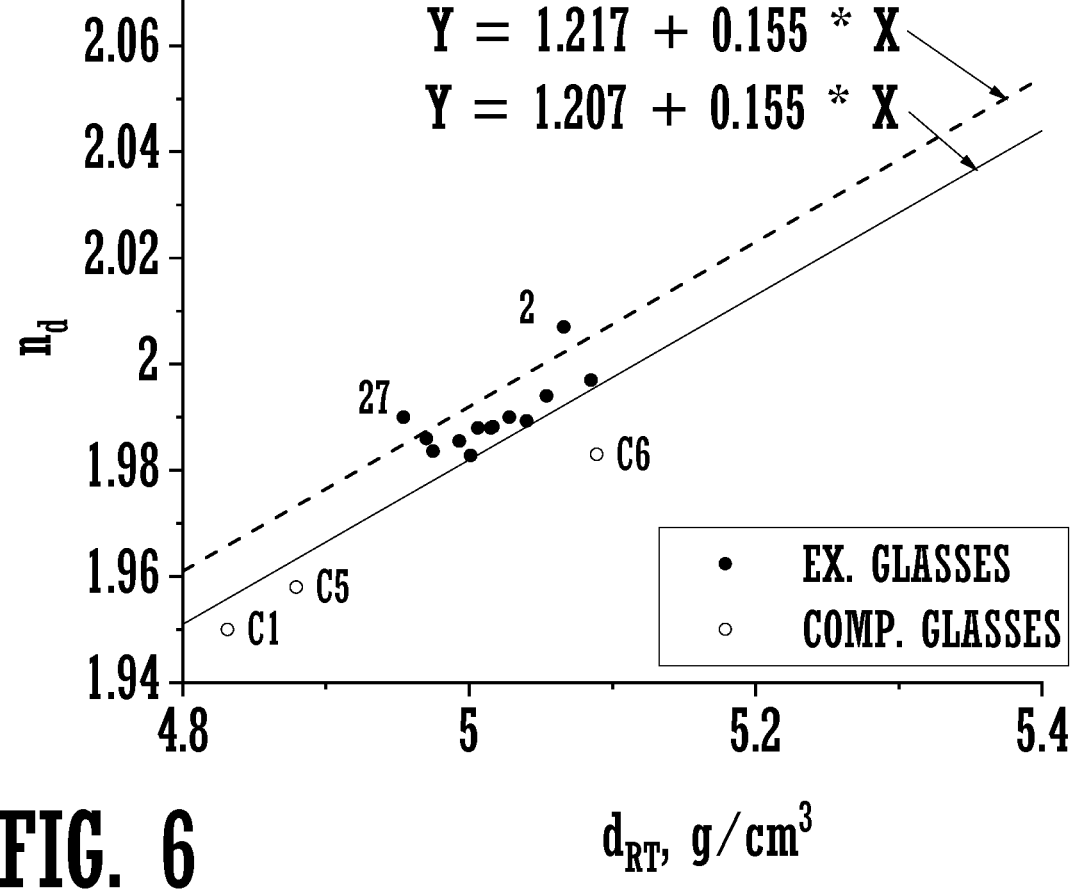
FIG. 6 is a plot illustrating the relationship between the density at room temperature $d_{RT}$ and the refractive index at 587.56 nm $n_d$ for some Comparative Glasses and some Exemplary Glasses according to an embodiment of the present disclosure.

FIG. 6 is a plot showing the relationship between $d_{RT}$ and $n_d$ for some of the Exemplary Glasses and some of the Comparative Glasses. The Exemplary Glasses (filled circles) are the Examples 2, 16 to 18 and 25 to 33 from Table 6. The Comparative Glasses (open circles) are the Examples C1, C5 and C6 from Table 7. All of the Exemplary Glasses and Comparative Glasses shown in FIG. 6 have the features specified in Table 9. In Table 9, the specification "Not limited" refers to a limitation that was not considered when selecting the compositions.

TABLE 9

| Limitations for glass compositions shown in FIG. 6 | | | |
|---|---|---|---|
| Quantity | Unit | Min | Max |
| $B_2O_3$ | mol. % | 0.5 | 29 |
| $TiO_2$ | mol. % | 0 | 25.2 |
| $Bi_2O_3$ | mol. % | 0 | 20 |
| $TeO_2$ | mol. % | 0 | 20 |
| $P_2O_5$ | mol. % | 0 | 15 |
| $Nb_2O_5$ | mol. % | 0 | 10.5 |
| $Al_2O_3$ | mol. % | 0 | 10 |
| $MoO_3$ | mol. % | 0 | 5 |
| $V_2O_5$ | mol. % | 0 | 4 |
| $GeO_2$ | mol. % | 0 | 2.5 |
| ZnO | mol. % | 0 | 2.5 |
| $Ta_2O_5$ | mol. % | 0 | 1 |
| $R_mO_n$ | mol. % | 95 | Not limited |
| $RE_mO_n$ | mol. % | 0 | 29 |
| $SiO_2 + B_2O_3 + P_2O_5$ | mol. % | 10 | Not limited |
| $SiO_2 + B_2O_3$ | mol. % | Not limited | 34 |
| $CaO + SrO + BaO + Y_2O_3$ | mol. % | 0.3 | Not limited |
| $R_2O + RO$ | mol. % | 0 | 25 |
| $Y_2O_3 - Gd_2O_3$ | mol. % | −2 | Not limited |
| $d_{RT}$ | g/cm³ | Not limited | 6 |

The above-enumerated Comparative Glasses were selected as having the highest measured values of $n_d$ at comparable values of $d_{RT}$ among the known glasses that have the mentioned features specified in Table 9.

The line corresponding to the formula y=1.207+0.155*x shown in FIG. 6 provides a visual representation of the differences between the Comparative Glasses having the features specified in Table 9 and the Exemplary Glasses 2, 16 to 18 and 25 to 33. As can be seen in FIG. 6, the mentioned Exemplary Glasses (filled circles) and none of the Comparative Glasses (open circles) represented in FIG. 6 fall above the line y=1.207+0.155*x, where y corresponds to $n_d$ and x corresponds to $d_{RT}$. In other words, some of the Exemplary Glasses and none of the Comparative Glasses represented in FIG. 6 satisfy the following formula (V)(a):

$$n_d-(1.207+0.155*d_{RT})>0.00 \quad\quad\quad (V)(a)$$

As can also be seen in FIG. 6, some of the Exemplary Glasses and none of the Comparative Glasses represented in FIG. 6 fall above the line y=1.217+0.155*x, where y corresponds to $n_d$ and x corresponds to $d_{RT}$. In other words, some of the Exemplary Glasses and none of the Comparative Glasses represented in FIG. 6 satisfy the following formula (V)(b):

$$n_d-(1.217+0.155*d_{RT})>0.00 \quad\quad\quad (V)(b)$$

The Exemplary Examples represented in FIG. 6 are, according to measurement, superior in terms of combination of $d_{RT}$ and $n_d$ to the best known Comparative Glasses that have the features specified in Table 9.

The values of all attributes specified in Tables 8 and 9 and Formulas (IV)(a), (IV)(b), (V)(a) and (V)(b) for the Comparative Glasses C1 to C6 plotted in FIGS. 5 and 6 are presented in Table 10 below. Full compositions of comparative example glasses are presented in Table 7. Full compositions and above-mentioned attributes of the Exemplary Glasses from the present disclosure are presented in Table 6.

TABLE 10

| Ex. # | | C1 | C2 | C3 | C4 | C5 | C6 |
|---|---|---|---|---|---|---|---|
| Attributes of Comparative Example Glasses Having the Features Specified in Tables 8 and 9 | | | | | | | |
| Composition | | | | | | | |
| $B_2O_3$ | mol. % | 22.69 | 21.10 | 21.19 | 21.51 | 21.69 | 20.37 |
| $RE_mO_n$ | mol. % | 0 | 0 | 0 | 0 | 0 | 0 |
| $TiO_2$ | mol. % | 18.13 | 10.25 | 14.29 | 11.35 | 18.15 | 20.27 |
| $Bi_2O_3$ | mol. % | 0 | 0 | 0 | 0 | 0 | 0 |
| $TeO_2$ | mol. % | 0 | 0 | 0 | 0 | 0 | 0 |
| $P_2O_5$ | mol. % | 0 | 0 | 0 | 0 | 0 | 0 |
| $Nb_2O_5$ | mol. % | 5.99 | 9.49 | 9.48 | 9.49 | 6.00 | 6.70 |
| $Al_2O_3$ | mol. % | 0 | 0 | 0 | 0 | 0 | 0 |
| $MoO_3$ | mol. % | 0 | 0 | 0 | 0 | 0 | 0 |
| $V_2O_5$ | mol. % | 0 | 0 | 0 | 0 | 0 | 0 |
| $GeO_2$ | mol. % | 0 | 0 | 0 | 0 | 0 | 0 |
| ZnO | mol. % | 0.29 | 0 | 0 | 0 | 0.27 | 0.32 |
| $Ta_2O_5$ | mol. % | 0 | 0.0082 | 0.0078 | 0.0081 | 0 | 0 |
| $SiO_2 + B_2O_3 + P_2O_5$ | mol. % | 33.27 | 28.77 | 30.00 | 29.70 | 33.49 | 31.63 |
| $SiO_2 + B_2O_3$ | mol. % | 33.27 | 28.77 | 30.00 | 29.70 | 33.49 | 31.63 |
| $CaO + SrO + BaO + Y_2O_3$ | mol. % | 10.42 | 3.69 | 3.31 | 1.79 | 11.50 | 7.36 |
| $R_2O + RO$ | mol. % | 11.69 | 3.29 | 2.95 | 1.61 | 11.37 | 6.79 |
| $Y_2O_3 - Gd_2O_3$ | mol. % | 0.1462 | 0.4255 | 0.3834 | 0.2065 | 0.1407 | 0.5915 |
| Measured properties | | | | | | | |
| $d_{RT}$ | g/cm$^3$ | 4.831 | | | | 4.879 | 5.089 |
| $n_d$ | | 1.950 | | | | 1.958 | 1.983 |
| $n_d - (1.207 + 0.155 * d_{RT})$ | | −0.0058 | | | | −0.0053 | −0.0128 |
| $n_d - (1.217 + 0.155 * d_{RT})$ | | −0.0158 | | | | −0.0153 | −0.0228 |
| Predicted and calculated properties | | | | | | | |
| $P_d$ | g/cm$^3$ | 4.8882 | 5.6468 | 5.4055 | 5.5668 | 4.9296 | 5.2263 |
| $P_n$ | | 1.9591 | 2.0493 | 2.0373 | 2.0464 | 1.9637 | 2.0047 |
| $P_n - (1.207 + 0.155 * P_d)$ | | −0.0056 | −0.0330 | −0.0076 | −0.0235 | −0.0074 | −0.0124 |
| $P_n - (1.217 + 0.155 * P_d)$ | | −0.0156 | −0.0430 | −0.0176 | −0.0335 | −0.0174 | −0.0224 |

As follows from FIGS. 5 and 6, both predicted and measured property data confirms that some of the Exemplary Glasses have a better combination of $d_{RT}$ and $n_d$ than the best of the Comparative Glasses that have the features specified in Tables 8 and 9 accordingly.

Two major high refractive index components of glasses of the present disclosure are titania ($TiO_2$) and lanthanum oxide ($La_2O_3$). $TiO_2$ provides high refractive index at a lower density, but may cause some loss of blue transmittance. $La_2O_3$ provides higher blue transmittance, but may increase the density. Some of the glasses of the present disclosure have an advantageous combination of these three attributes: refractive index $n_d$, density $d_{RT}$ and transmittance, which result in higher values of "refraction" $(n_d-1)/d_{RT}$ at a given value of the difference ($TiO_2-La_2O_3$). In embodiments of the present disclosure, other components, such as $B_2O_3$, $SiO_2$, $Nb_2O_5$, CaO, BaO, $Y_2O_3$ and/or others may be added to the glass compositions. However, if these components are added in high concentrations, then either the refractive index decreases, or the liquidus temperature increases, which may impair the glass forming ability of glass compositions, or promote liquid-liquid phase separation, which may result in the loss of transmittance and/or crystallization of the glass forming melts when cooling. Accordingly, the content of these components in the glass compositions of the present disclosure is limited.

Figure 7:
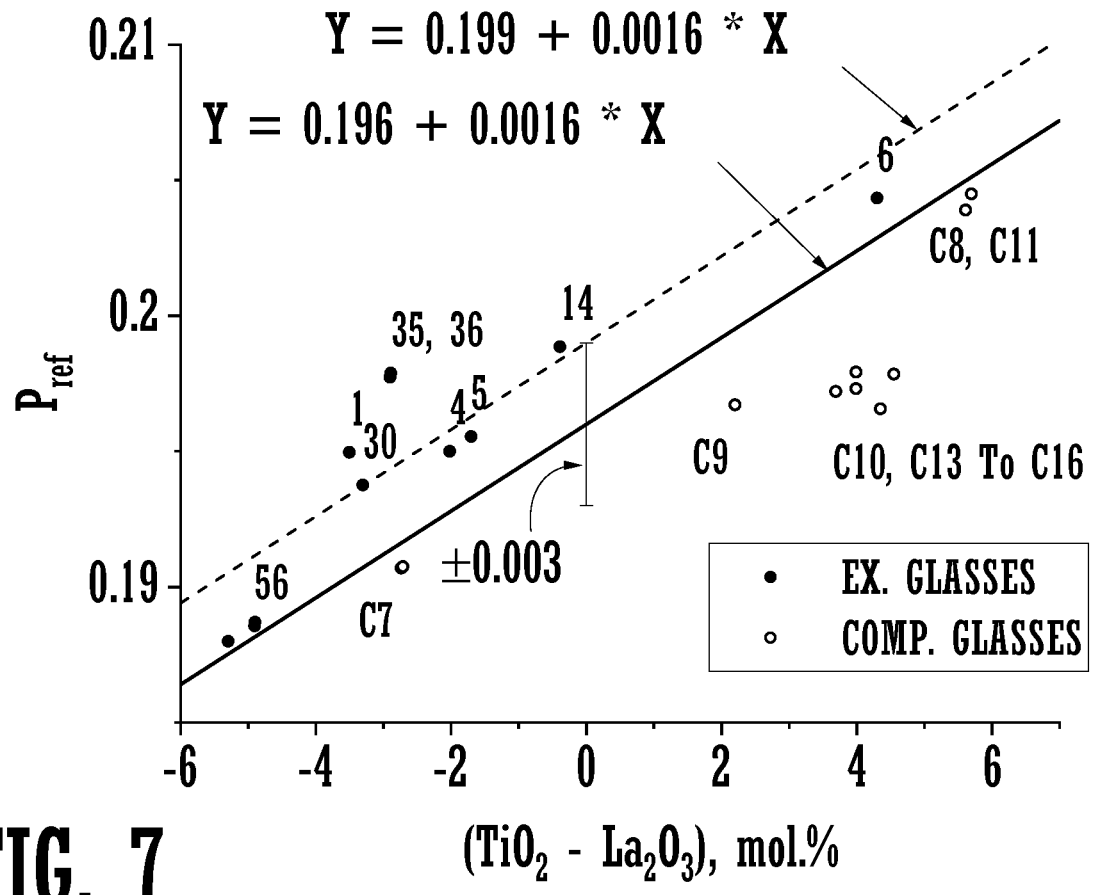
FIG. 7 is a plot illustrating the relationship between the difference $TiO_2-La_2O_3$ and the refraction parameter $P_{ref}$ calculated by formula (III) for some Comparative Glasses and some Exemplary Glasses according to an embodiment of the present disclosure.

FIG. 7 is a plot showing the relationship between the difference TiO2–La2O3 and the refraction parameter $P_{ref}$ for some of the Exemplary Glasses and some of the Comparative Glasses. The Exemplary Glasses (filled circles) are the Examples 1, 4 to 6, 14, 30, 35, 36 and 56 to 58 from Table 6. The Comparative Glasses (open circles) are the Examples C7 to C16 from Table 7. The refraction parameter $P_{ref}$ that predicts refractive index to density ratio ("refraction") was determined according to Formula (III). All of the Exemplary Glasses and Comparative Glasses shown in FIG. 7 have the features specified in Table 11. In Table 11, the specification "Not limited" refers to a limitation that was not considered when selecting the compositions.

TABLE 11

Figure 8:
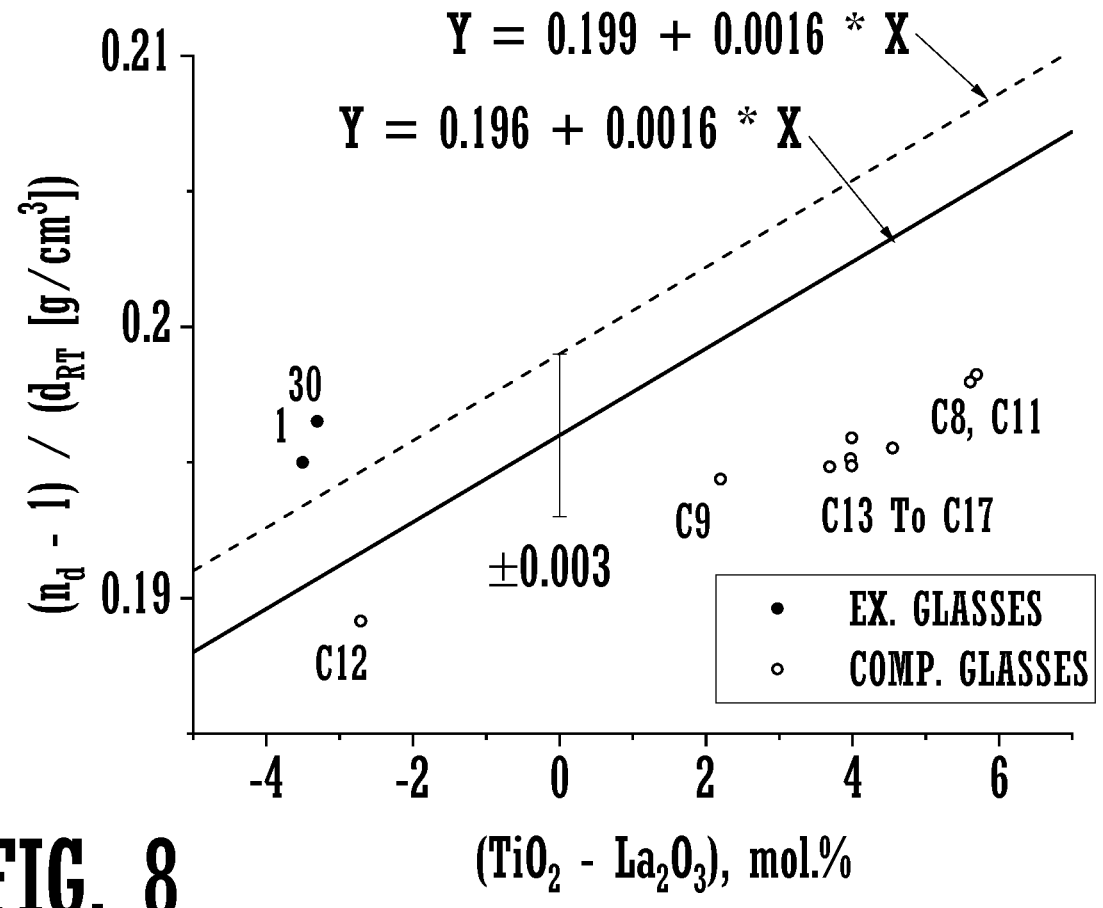
FIG. 8 is a plot illustrating the relationship between the difference $TiO_2-La_2O_3$ and the refractive index to density ratio ("refraction") $(n_d-1)/d_{RT}$ for some Comparative Glasses and some Exemplary Glasses according to an embodiment of the present disclosure.

Limitations for glass compositions shown in FIGS. 7 and 8

| Quantity | Unit | Min | Max |
|---|---|---|---|
| $TiO_2$ | mol. % | 1 | 40 |
| $B_2O_3$ | mol. % | 1 | 40 |
| $SiO_2$ | mol. % | 0 | 35 |
| $La_2O_3$ | mol. % | 0 | 30 |
| $ZrO_2$ | mol. % | 0 | 10 |
| $GeO_2$ | mol. % | 0 | 10 |
| $Al_2O_3$ | mol. % | 0 | 10 |
| $Nb_2O_5$ | mol. % | 0 | 6.75 |
| $Y_2O_3$ | mol. % | 0 | 6.7 |
| RO | mol. % | 0 | 25 |
| $R_2O$ | mol. % | 0 | 25 |
| $La_2O_3 + Y_2O_3 + Gd_2O_3 + TiO_2$ | mol. % | 45.3 | Not limited |
| $Nb_2O_5 + ZrO_2$ | mol. % | 12.1 | Not limited |
| $SiO_2 + B_2O_3 - TiO_2$ | mol. % | 7.05 | Not limited |
| $B_2O_3 - SiO_2$ | mol. % | Not limited | 7 |

The above-enumerated Comparative Glasses were selected as having the highest refraction parameter $P_{ref}$ at comparable values of difference $TiO_2-La_2O_3$ among the known glasses that have the features specified in Table 11.

The line corresponding to the formula y=0.196+0.0016*x shown in FIG. 7 provides a visual representation of the differences between the Comparative Glasses having the features specified in Table 11 and the Exemplary Glasses 1, 4 to 6, 14, 30, 35, 36 and 56 to 58. As can be seen in FIG. 7, the mentioned Exemplary Glasses (filled circles) and none of the Comparative Glasses (open circles) represented in FIG. 7 fall above the line y=0.196+0.0016*x, where y corresponds to the refraction parameter $P_{ref}$ and x corresponds to the difference $TiO_2-La_2O_3$. In other words, some of the Exemplary Glasses and none of the Comparative Glasses represented in FIG. 7 satisfy the following formula (VI)(a):

$$P_{ref}-(0.196+0.0016*(TiO_2-La_2O_3))>0.0 \qquad (VI)(a)$$

As can also be seen in FIG. 7, some of the Exemplary Glasses and none of the Comparative Glasses represented in FIG. 7 fall above the line y=0.199+0.0016*x, where y corresponds to the refraction parameter $P_{ref}$ and x corresponds to the difference $TiO_2-La_2O_3$. In other words, some of the Exemplary Glasses and none of the Comparative Glasses represented in FIG. 7 satisfy the following formula (VI)(b):

$$P_{ref}-(0.199+0.0016*(TiO_2-La_2O_3))>0.0 \qquad (VI)(b)$$

The Exemplary Examples represented in FIG. 7 are, by prediction, superior in terms of the combination of $TiO_2-La_2O_3$ and $(n_d-1)/d_{RT}$ to the best known Comparative Glasses that have the features specified in Table 11.

FIG. 8 is a plot showing the relationship between the difference $TiO_2-La_2O_3$ and the refractive index to density ratio ("refraction") $(n_d-1)/d_{RT}$ for some of the Exemplary Glasses and some of the Comparative Glasses. The Exemplary Glasses (filled circles) are the Examples 1 and 30 from Table 6. The Comparative Glasses (open circles) are the Examples C8, C9 and C11 to C17 from Table 7. All of the Exemplary Glasses and Comparative Glasses shown in FIG. 8 have the features specified in Table 11. In Table 11, the specification "Not limited" refers to a limitation that was not considered when selecting the compositions.

The above-enumerated Comparative Glasses were selected as having the highest measured values of the refractive index to density ratio ("refraction") $(n_d-1)/d_{RT}$ at comparable values of the difference $TiO_2-La_2O_3$ among the known glasses that have the mentioned features specified in Table 11.

The line corresponding to the formula y=0.196+0.0016*x shown in FIG. 8 provides a visual representation of the differences between the Comparative Glasses having the features specified in Table 11 and the Exemplary Glasses 1 and 30. As can be seen in FIG. 8, the mentioned Exemplary Glasses (filled circles) and none of the Comparative Glasses (open circles) represented in FIG. 8 fall above the line y=0.196+0.0016*x, where y corresponds to the $(n_d-1)/d_{RT}$ and x corresponds to the difference $TiO_2-La_2O_3$. In other words, some of the Exemplary Glasses and none of the Comparative Glasses represented in FIG. 8 satisfy the following formula (VII)(a):

$$(n_d-1)/d_{RT}-(0.196+0.0016*(TiO_2-La_2O_3))>0.0 \qquad (VII)(a)$$

As can also be seen in FIG. 8, some of Exemplary Glasses and none of the Comparative Glasses represented in FIG. 8 fall above the line y=0.199+0.0016*x, where y corresponds to $(n_d-1)/d_{RT}$ and x corresponds to $TiO_2- La_2O_3$. In other words, the said Exemplary Glasses and none of the Comparative Glasses represented in FIG. 8 satisfy the following formula (VII)(b):

$$(n_d-1)/d_{RT}-(0.199+0.0016*(TiO_2-La_2O_3))>0.0 \qquad (VII)(b)$$

The Exemplary Examples represented in FIG. are, according to measurement, superior in terms of combination of $TiO_2-La_2O_3$ and $(n_d-1)/d_{RT}$ to the best known Comparative Glasses that have the features specified in Table 11.

The values of all attributes specified in Table 11 and Formulas (VI)(a), (VI)(b), (VII)(a) and (VII)(b) for the Comparative Glasses C7 to C17 plotted in FIGS. 7 and 8 are presented in Table 12 below. Full compositions of comparative example glasses are presented in Table 7. Full compositions and above-mentioned attributes of the Exemplary Glasses from the present disclosure are presented in Table 6.

TABLE 12

| Attributes of Comparative Example Glasses Having the Features Specified in Table 11 | | | | | | | | | |
|---|---|---|---|---|---|---|---|---|---|
| Ex. # | | C7 | C8 | C9 | C10 | C11 | C12 | C13 | C14 |
| Composition | | | | | | | | | |
| $B_2O_3$ | mol. % | 12.21 | 20.52 | 20.30 | 17.62 | 22.24 | 12.27 | 17.68 | 20.15 |
| $SiO_2$ | mol. % | 18.52 | 20.21 | 14.38 | 15.54 | 19.91 | 18.49 | 15.60 | 14.28 |
| $La_2O_3$ | mol. % | 25.18 | 16.66 | 19.16 | 20.98 | 16.42 | 25.17 | 21.43 | 19.02 |
| RO | mol. % | 0 | 0 | 5.22 | 2.97 | 0 | 0 | 2.98 | 5.18 |
| $R_2O$ | mol. % | 0 | 0 | 0 | 0 | 0 | 0 | 0 | 0 |
| $ZrO_2$ | mol. % | 8.90 | 7.42 | 7.30 | 7.87 | 7.31 | 8.87 | 7.16 | 7.24 |
| $GeO_2$ | mol. % | 0 | 0 | 0 | 0 | 0 | 0 | 0 | 0 |
| $Al_2O_3$ | mol. % | 0 | 0 | 0 | 0 | 0 | 0 | 0 | 0 |
| $Nb_2O_5$ | mol. % | 6.11 | 5.64 | 6.12 | 4.50 | 5.03 | 6.11 | 5.08 | 5.32 |
| $Y_2O_3$ | mol. % | 0.38 | 4.11 | 1.59 | 0.74 | 4.05 | 0.38 | 0.74 | 1.58 |
| $La_2O_3 + Y_2O_3 + Gd_2O_3 + TiO_2$ | mol. % | 51.59 | 46.13 | 46.67 | 51.50 | 45.44 | 51.60 | 51.51 | 47.83 |
| $Nb_2O_5 + ZrO_2$ | mol. % | 15.01 | 13.06 | 13.42 | 12.37 | 12.34 | 14.98 | 12.23 | 12.57 |
| $TiO_2 - La_2O_3$ | mol. % | -2.735 | 5.694 | 2.200 | 4.350 | 5.609 | -2.713 | 3.989 | 3.689 |
| $SiO_2 + B_2O_3 - TiO_2$ | mol. % | 8.295 | 18.38 | 13.32 | 7.830 | 20.12 | 8.296 | 7.859 | 11.72 |
| $B_2O_3 - SiO_2$ | mol. % | -6.311 | 0.3098 | 5.918 | 2.080 | 2.327 | -6.213 | 2.084 | 5.873 |
| Measured properties | | | | | | | | | |
| $(n_d-1)/d_{RT}$ | $cm^3/g$ | | 0.19824 | 0.19438 | 0.19508 | 0.19797 | 0.18915 | 0.19591 | 0.19484 |
| $(n_d-1)/d_{RT}-(0.196 + 0.0016*TiO_2-La_2O_3)$ | | | -0.0069 | -0.0051 | | -0.007 | -0.0025 | -0.0065 | -0.0071 |
| $(n_d-1)/d_{RT}-(0.199 + 0.0016*TiO_2-La_2O_3)$ | | | -0.0099 | -0.0081 | | -0.010 | -0.0055 | -0.0095 | -0.0101 |

TABLE 12-continued

| Attributes of Comparative Example Glasses Having the Features Specified in Table 11 | | | | | | | | | |
|---|---|---|---|---|---|---|---|---|---|
| Predicted and calculated properties | | | | | | | | | |
| $P_{ref}$ | cm³/g | 0.1907 | 0.2045 | 0.1967 | 0.1966 | 0.2039 | 0.1907 | 0.1979 | 0.1972 |
| $P_{ref} - (0.196 + 0.0016 *$ $TiO_2 - La_2O_3)$ | | −9.309E−04 | −6.124E−04 | −0.0028 | −0.0064 | −0.0011 | −9.148E−04 | −0.0045 | −0.0047 |
| $P_{ref} - (0.199 + 0.0016 *$ $TiO_2 - La_2O_3)$ | | −0.0039 | −0.0036 | −0.0058 | −0.0094 | −0.0041 | −0.0039 | −0.0075 | −0.0077 |

| Ex.# | | C15 | C16 | C17 |
|---|---|---|---|---|
| Composition | | | | |
| $B_2O_3$ | mol. % | 17.68 | 17.68 | 17.62 |
| $SiO_2$ | mol. % | 15.60 | 15.60 | 15.54 |
| $La_2O_3$ | mol. % | 21.43 | 20.88 | 21.35 |
| RO | mol. % | 2.98 | 2.98 | 2.97 |
| $R_2O$ | mol. % | 0 | 0 | 0 |
| $ZrO_2$ | mol. % | 7.16 | 7.16 | 7.87 |
| $GeO_2$ | mol. % | 0 | 0 | 0 |
| $Al_2O_3$ | mol. % | 0 | 0 | 0 |
| $Nb_2O_5$ | mol. % | 5.08 | 5.08 | 4.50 |
| $Y_2O_3$ | mol. % | 0.19 | 0.74 | 0.74 |
| $La_2O_3 + Y_2O_3 + Gd_2O_3 +$ $TiO_2$ | mol. % | 51.51 | 51.51 | 51.50 |
| $Nb_2O_5 + ZrO_2$ | mol. % | 12.23 | 12.23 | 12.37 |
| $TiO_2 - La_2O_3$ | mol. % | 3.989 | 4.547 | 3.974 |
| $SiO_2 + B_2O_3 - TiO_2$ | mol. % | 7.859 | 7.859 | 7.830 |
| $B_2O_3 - SiO_2$ | mol. % | 2.084 | 2.084 | 2.076 |
| Measured properties | | | | |
| $(n_d - 1)/d_{RT}$ | cm³/g | 0.19488 | 0.19553 | 0.19514 |
| $(n_d - 1)/d_{RT} - (0.196 +$ $0.0016 * TiO_2 - La_2O_3)$ | | −0.0075 | −0.0077 | −0.0072 |
| $(n_d - 1)/d_{RT} - (0.199 +$ $0.0016 * TiO_2 - La_2O_3)$ | | −0.0105 | −0.0107 | −0.0102 |
| Predicted and calculated properties | | | | |
| $P_{ref}$ | cm³/g | 0.1973 | 0.1978 | 0.1967 |
| $P_{ref} - (0.196 + 0.0016 *$ $TiO_2 - La_2O_3)$ | | −0.0051 | −0.0054 | −0.0057 |
| $P_{ref} - (0.199 + 0.0016 *$ $TiO_2 - La_2O_3)$ | | −0.0081 | −0.0084 | −0.0087 |

As follows from FIGS. 7 and 8, both predicted and measured property data confirms that some of the Exemplary Glasses have better combination of refractive index to density ratio ("refraction") $(n_d-1)/d_{RT}$ than the best of the Comparative Glasses that have the features specified in Table 11.

Below, the composition space is considered, where, due to a balance between $TiO_2$, $La_2O_3$ and $B_2O_3$, the glasses have relatively high values of "refraction" $(n_d-1)/d_{RT}$ at a lower values of the difference ($TiO_2-La_2O_3$), including relatively high negative values, such as less than or equal to −2.0 mol. %, or less than or equal to −3.0 mol. %, or even less than or equal to −4.0 mol. %. These glasses, having relatively high content of $La_2O_3$, still have relatively low density at high refractive index, high transmittance and acceptably high glass forming ability.

Figure 9:
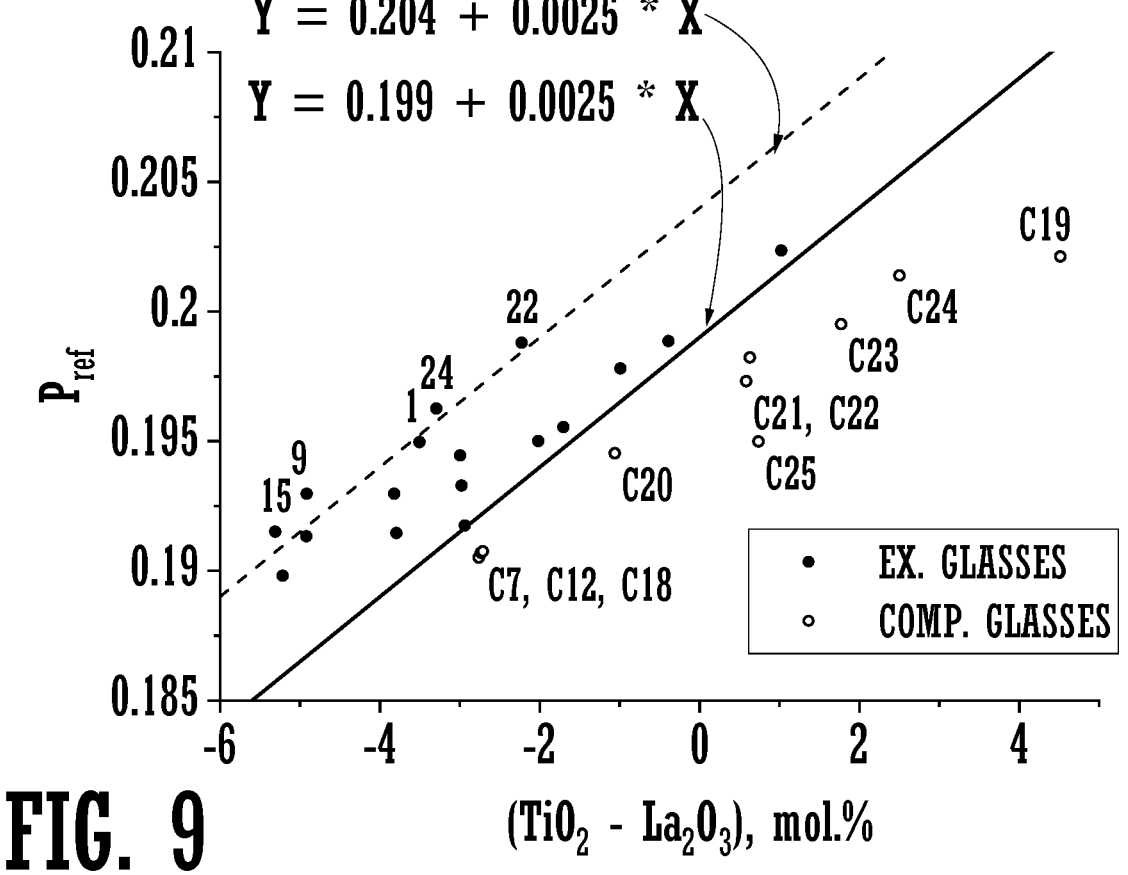
FIG. 9 is a plot illustrating the relationship between the difference $TiO_2-La_2O_3$ and the refraction parameter $P_{ref}$ calculated by formula (III) for some Comparative Glasses and some Exemplary Glasses according to an embodiment of the present disclosure.

FIG. 9 is a plot showing the relationship between the difference $TiO_2-La_2O_3$ and the refraction parameter $P_{ref}$ for some of the Exemplary Glasses and some of the Comparative Glasses. The Exemplary Glasses (filled circles) are the Examples 1, 2, 4, 5, 8 to 15, 18 to 20, 22, 24, 25, 30, 35 to 40, 45 and 50 from Table 6. The Comparative Glasses (open circles) are the Examples C7, C12 and C18 to C25 from Table 7. The refraction parameter $P_{ref}$ that predicts refractive index to density ratio ("refraction") was determined according to Formula (III). All of the Exemplary Glasses and Comparative Glasses shown in FIG. 9 have the features specified in Table 13. In Table 13, the specification "Not limited" refers to a limitation that was not considered when selecting the compositions.

TABLE 13

Figure 10:
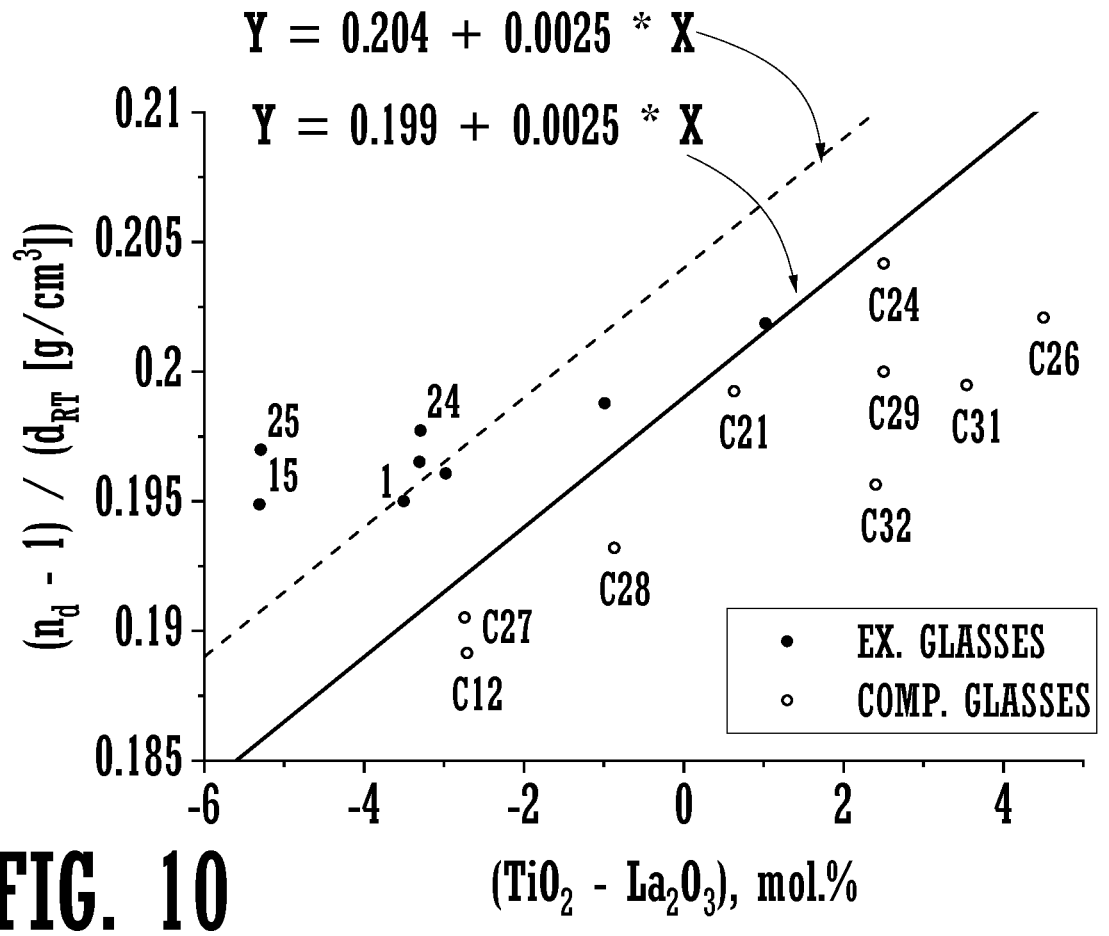
FIG. 10 is a plot illustrating the relationship between the difference $TiO_2$–$La_2O_3$ and the refractive index to density ratio ("refraction") $(n_d-1)/d_{RT}$ for some Comparative Glasses and some Exemplary Glasses according to an embodiment of the present disclosure.

| Limitations for glass compositions shown in FIGS. 9 and 10 | | | |
|---|---|---|---|
| Quantity | Unit | Min | Max |
| $TiO_2$ | mol. % | 1 | 40 |
| $B_2O_3$ | mol. % | 1 | 40 |
| $SiO_2$ | mol. % | 0 | 35 |
| $La_2O_3$ | mol. % | 0 | 30 |
| CaO | mol. % | 0 | 20 |
| $ZrO_2$ | mol. % | 0 | 10 |
| $GeO_2$ | mol. % | 0 | 10 |
| $Al_2O_3$ | mol. % | 0 | 10 |
| $Nb_2O_5$ | mol. % | 0 | 6.75 |
| BaO | mol. % | 0 | 5.5 |
| $Y_2O_3$ | mol. % | 0 | 4.6 |
| ZnO | mol. % | 0 | 3.5 |
| $WO_3$ | mol. % | 0 | 1 |
| RO | mol. % | 0 | 25 |
| $R_2O$ | mol. % | 0 | 25 |
| $La_2O_3 + Yb_2O_3 + Y_2O_3 +$ $Gd_2O_3 + TiO_2$ | mol. % | 45.3 | Not limited |
| $Nb_2O_5 + ZrO_2$ | mol. % | 11 | Not limited |
| $TiO_2 - B_2O_3$ | mol. % | −6 | Not limited |
| $TiO_2 - La_2O_3$ | mol. % | Not limited | 5 |

The above-enumerated Comparative Glasses were selected as having the highest refraction parameter $P_{ref}$ at comparable values of difference $TiO_2–La_2O_3$ among the known glasses that have the features specified in Table 13.

The line corresponding to the formula y=0.199+0.0025*x shown in FIG. 9 provides a visual representation of the differences between the Comparative Glasses having the features specified in Table 13 and the Exemplary Glasses 1, 2, 4, 5, 8 to 15, 18 to 20, 22, 24, 25, 30, 35 to 40, 45 and 50. As can be seen in FIG. 9, the mentioned Exemplary Glasses (filled circles) and none of the Comparative Glasses (open circles) represented in FIG. 9 fall above the line y=0.199+ 0.0025*x, where y corresponds to the refraction parameter $P_{ref}$ and x corresponds to the difference $TiO_2–La_2O_3$. In other words, some of the Exemplary Glasses and none of the Comparative Glasses represented in FIG. 9 satisfy the following formula (VIII)(a):

$$P_{ref}-(0.199+0.0025*(TiO_2-La_2O_3))>0.0 \qquad \text{(VIII)(a)}$$

As can also be seen in FIG. 9, some of Exemplary Glasses and none of the Comparative Glasses represented in FIG. 9 fall above the line y=0.204+0.0025*x, where y corresponds to the refraction parameter $P_{ref}$ and x corresponds to the difference $TiO_2–La_2O_3$. In other words, some of the Exemplary Glasses and none of the Comparative Glasses represented in FIG. 9 satisfy the following formula (VIII)(b):

$$P_{ref}-(0.204+0.0025*TiO_2-La_2O_3)>0.0 \qquad \text{(VIII)(b)}$$

The Exemplary Examples represented in FIG. 9 are, by prediction, superior in terms of the combination of $TiO_2–La_2O_3$ and $(n_d-1)/d_{RT}$ to the best known Comparative Glasses that have the features specified in Table 13.

FIG. 10 is a plot showing the relationship between the difference $TiO_2–La_2O_3$ and the refractive index to density ratio ("refraction") $(n_d-1)/d_{RT}$ for some of the Exemplary Glasses and some of the Comparative Glasses. The Exemplary Glasses (filled circles) are the Examples 1, 2, 15, 18, 19, 24, 25 and 30 from Table 6. The Comparative Glasses (open circles) are the Examples C12, C21, C24 and C26 to C32 from Table 7. All of the Exemplary Glasses and Comparative Glasses shown in FIG. 10 have the features specified in Table 13. In Table 13, the specification "Not limited" refers to a limitation that was not considered when selecting the compositions.

The above-enumerated Comparative Glasses were selected as having the highest measured values of the refractive index to density ratio ("refraction") $(n_d-1)/d_{RT}$ at comparable values of the difference $TiO_2–La_2O_3$ among the known glasses that have the mentioned features specified in Table 13.

The line corresponding to the formula y=0.199+0.0025*x shown in FIG. 10 provides a visual representation of the differences between the Comparative Glasses having the features specified in Table 13 and the Exemplary Glasses 1, 2, 15, 18, 19, 24, 25 and 30. As can be seen in FIG. 10, the mentioned Exemplary Glasses (filled circles) and none of the Comparative Glasses (open circles) represented in FIG. 10 fall above the line y=0.199+0.0025*x, where y corresponds to $(n_d-1)/d_{RT}$ and x corresponds to $TiO_2– La_2O_3$. In other words, some of the Exemplary Glasses and none of the Comparative Glasses represented in FIG. 10 satisfy the following formula (IX)(a):

$$(n_d-1)/d_{RT}-(0.199+0.0025*(TiO_2-La_2O_3))>0.0 \qquad \text{(IX)(a)}$$

As can also be seen in FIG. 10, some of Exemplary Glasses and none of the Comparative Glasses represented in FIG. 10 fall above the line y=0.204+0.0025*x, where y corresponds to $(n_d-1)/d_{RT}$ and x corresponds to $TiO_2–La_2O_3$. In other words, the said Exemplary Glasses and none of the Comparative Glasses represented in FIG. 10 satisfy the following formula (IX)(b):

$$(n_d-1)/d_{RT}-(0.204+0.0025*(TiO_2-La_2O_3))>0.0 \qquad \text{(IX)(b)}$$

The Exemplary Examples represented in FIG. 10 are, according to measurement, superior in terms of combination of $TiO_2–La_2O_3$ and $(n_d-1)/d_{RT}$ to the best known Comparative Glasses that have the features specified in Table 13.

The values of all attributes specified in Table 13 and Formulas (VIII)(a), (VIII)(b), (IX)(a) and (IX)(b) for the Comparative Glasses C7, C12 and C18 to C32 plotted in FIGS. 9 and 10 are presented in Table 14 below. Full compositions of comparative example glasses are presented in Table 7. Full compositions and above-mentioned attributes of the Exemplary Glasses from the present disclosure are presented in Table 6.

TABLE 14

| | Attributes of Comparative Example Glasses Having the Features Specified in Table 13 | | | | | | | | |
|---|---|---|---|---|---|---|---|---|---|
| Ex. # | | C7 | C12 | C18 | C19 | C20 | C21 | C22 | C23 |
| | | | Composition | | | | | | |
| $B_2O_3$ | mol. % | 12.21 | 12.27 | 12.34 | 21.73 | 28.24 | 17.58 | 20.32 | 10.53 |
| $SiO_2$ | mol. % | 18.52 | 18.49 | 17.28 | 11.59 | 3.95 | 15.51 | 12.37 | 19.83 |
| $La_2O_3$ | mol. % | 25.18 | 25.17 | 25.44 | 21.84 | 25.18 | 25.76 | 25.22 | 24.62 |
| RO | mol. % | 0 | 0 | 0 | 0 | 3.32 | 2.96 | 0 | 1.32 |
| $R_2O$ | mol. % | 0 | 0 | 0 | 1.45 | 0 | 0 | 0.52 | 0 |
| CaO | mol. % | 0 | 0 | 0 | 0 | 0 | 0 | 0 | 0 |
| $ZrO_2$ | mol. % | 8.90 | 8.87 | 8.99 | 6.99 | 7.07 | 7.12 | 7.33 | 7.29 |
| $GeO_2$ | mol. % | 0 | 0 | 0 | 0 | 0 | 0 | 0 | 0 |
| $Al_2O_3$ | mol. % | 0 | 0 | 0 | 0 | 0 | 0 | 0 | 0 |
| $Nb_2O_5$ | mol. % | 6.11 | 6.11 | 6.17 | 5.49 | 5.17 | 4.49 | 4.65 | 5.26 |
| BaO | mol. % | 0 | 0 | 0 | 0 | 0 | 0 | 0 | 0 |
| $Y_2O_3$ | mol. % | 0.38 | 0.38 | 0.38 | 0.36 | 0.84 | 0.19 | 3.28 | 0 |
| ZnO | mol. % | 0 | 0 | 0 | 0 | 3.32 | 2.96 | 0 | 0 |
| $WO_3$ | mol. % | 0 | 0 | 0 | 0.44 | 0 | 0 | 0.50 | 0 |
| $La_2O_3 + Yb_2O_3 + Y_2O_3 + Gd_2O_3 + TiO_2$ | mol. % | 51.59 | 51.60 | 52.13 | 51.64 | 52.24 | 52.34 | 54.31 | 51.01 |
| $Nb_2O_5 + ZrO_2$ | mol. % | 15.01 | 14.98 | 15.16 | 12.48 | 12.25 | 11.61 | 11.98 | 12.55 |
| $TiO_2 – La_2O_3$ | mol. % | -2.735 | -2.713 | -2.763 | 4.514 | -1.060 | 0.6300 | 0.5840 | 1.771 |
| $TiO_2 – B_2O_3$ | mol. % | 10.23 | 10.19 | 10.34 | 4.622 | -4.124 | 8.810 | 5.481 | 15.86 |

TABLE 14-continued

Attributes of Comparative Example Glasses Having the Features Specified in Table 13

Measured properties

| | | | | | | | | | |
|---|---|---|---|---|---|---|---|---|---|
| $(n_d - 1)/d_{RT}$ | cm³/g | 0.18915 | | | | 0.19924 | | | |
| $(n_d - 1)/d_{RT} - (0.199 + 0.0025 *$ $TiO_2 - La_2O_3)$ | | −0.0031 | | | | −0.0013 | | | |
| $(n_d - 1)/d_{RT} - (0.199 + 0.0025 *$ $TiO2 - La_2O_3)$ | | −0.0081 | | | | −0.0063 | | | |

Predicted and calculated properties

| | | | | | | | | | |
|---|---|---|---|---|---|---|---|---|---|
| $P_{ref}$ | cm³/g | 0.1907 | 0.1907 | 0.1905 | 0.2021 | 0.1945 | 0.1982 | 0.1973 | 0.1995 |
| $P_{ref} - (0.199 + 0.0025 *$ $TiO_2 - La_2O_3)$ | | −0.0015 | −0.0015 | −0.0016 | −0.0082 | −0.0018 | −0.0023 | −0.0032 | −0.0039 |
| $P_{ref} - (0.199 + 0.0025 *$ $TiO_2 - La_2O_3)$ | | −0.0065 | −0.0065 | −0.0066 | −0.0132 | −0.0068 | −0.0073 | −0.0082 | −0.0089 |

| Ex. # | | C24 | C25 | C26 | C27 | C28 | C29 | C30 | C31 | C32 |
|---|---|---|---|---|---|---|---|---|---|---|
| Composition | | | | | | | | | | |
| $B_2O_3$ | mol. % | 24.70 | 22.88 | 21.00 | 12.40 | 20.25 | 21.70 | 21.00 | 21.28 | 20.42 |
| $SiO_2$ | mol. % | 12.80 | 10.96 | 15.80 | 17.24 | 15.86 | 12.80 | 15.80 | 12.09 | 12.14 |
| $La_2O_3$ | mol. % | 22.50 | 22.99 | 20.50 | 25.44 | 23.32 | 22.50 | 20.50 | 22.51 | 23.42 |
| RO | mol. % | 0 | 1.94 | 3.00 | 0 | 3.03 | 3.00 | 0 | 2.65 | 2.66 |
| $R_2O$ | mol. % | 0 | 0 | 0 | 0 | 0 | 0 | 3.00 | 0 | 0 |
| CaO | mol. % | 0 | 0 | 3.00 | 0 | 0 | 3.00 | 0 | 0 | 0 |
| $ZrO_2$ | mol. % | 7.00 | 7.29 | 7.00 | 8.97 | 7.28 | 7.00 | 7.00 | 7.29 | 7.31 |
| $GeO_2$ | mol. % | 0 | 0 | 0 | 0 | 0 | 0 | 0 | 0 | 0 |
| $Al_2O_3$ | mol. % | 0 | 0 | 0 | 0 | 0 | 0 | 0 | 0 | 0 |
| $Nb_2O_5$ | mol. % | 4.30 | 5.58 | 4.00 | 6.17 | 4.59 | 4.30 | 4.00 | 5.36 | 4.62 |
| BaO | mol. % | 0 | 0 | 0 | 0 | 0 | 0 | 0 | 0 | 0 |
| $Y_2O_3$ | mol. % | 3.50 | 0.57 | 3.50 | 0.38 | 0.19 | 3.50 | 3.50 | 0.38 | 0.38 |
| ZnO | mol. % | 0 | 1.94 | 0 | 0 | 3.03 | 0 | 0 | 2.65 | 2.66 |
| $WO_3$ | mol. % | 0.20 | 0 | 0.20 | 0 | 0 | 0.20 | 0.20 | 0 | 0 |
| $La_2O_3 + Yb_2O_2 + Y_2O_3 +$ $Gd_2O_3 + TiO_2$ | mol. % | 51.00 | 51.35 | 49.00 | 52.13 | 48.99 | 51.00 | 49.00 | 51.33 | 52.85 |
| $Nb_2O_5 + ZrO_2$ | mol. % | 11.30 | 12.87 | 11.00 | 15.14 | 11.87 | 11.30 | 11.00 | 12.65 | 11.93 |
| $TiO_2 - La_2O_3$ | mol. % | 2.500 | 0.7375 | 4.500 | −2.741 | −0.8700 | 2.500 | 4.500 | 3.540 | 2.400 |
| $TiO_2 - B_2O_3$ | mol. % | 0.3000 | 0.8428 | 4.000 | 10.30 | 2.200 | 3.300 | 4.000 | 4.770 | 5.400 |
| Measured properties | | | | | | | | | | |
| $(n_d - 1)/d_{RT}$ | cm³/g | 0.20417 | | 0.20208 | 0.19052 | 0.19320 | 0.20000 | 0.20208 | 0.19948 | 0.19564 |
| $(n_d - 1)/d_{RT} - (0.199 + 0.0025 *$ $TiO_2 - La_2O_3)$ | | −0.0011 | | −0.0082 | −0.0016 | −0.0036 | −0.0053 | −0.0082 | −0.0084 | −0.0094 |
| $(n_d - 1)/d_{RT} - (0.199 + 0.0025 *$ $TiO_2 - La_2O_3)$ | | −0.0061 | | −0.0132 | −0.0066 | −0.0086 | −0.0103 | −0.0132 | −0.0134 | −0.0144 |
| Predicted and calculated properties | | | | | | | | | | |
| $P_{ref}$ | cm³/g | 0.2014 | 0.195 | 0.2039 | 0.1906 | 0.1929 | 0.2008 | 0.2039 | 0.2011 | 0.1962 |
| $P_{ref} - (0.199 + 0.0025 *$ $TiO_2 - La_2O_3)$ | | −0.0039 | −0.0059 | −0.0064 | −0.0016 | −0.0040 | −0.0044 | −0.0064 | −0.0068 | −0.0088 |
| $P_{ref} - (0.199 + 0.0025 *$ $TiO_2 - La_2O_3)$ | | −0.0089 | −0.0109 | −0.0114 | −0.0066 | −0.0090 | −0.0094 | −0.0114 | −0.0118 | −0.0138 |

As follows from FIGS. 9 and 10, both predicted and measured property data confirms that some of the Exemplary Glasses have a better combination of refractive index to density ratio ("refraction") $(n_d-1)/d_{RT}$ than the best of the Comparative Glasses that have the features specified in Table 13.

The following non-limiting aspects are encompassed by the present disclosure. To the extent not already described, any one of the features of the first through the sixty-eighth aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 0.5 mol. % and less than or equal to 29.0 mol. % $B_2O_3$, greater than or equal to 0.0 mol. % and less than or equal to 25.2 mol. % $TiO_2$, greater than or equal to 0.0 mol. % and less than or equal to 20.0 mol. % $Bi_2O_3$, greater than or equal to 0.0 mol. % and less than or equal to 20.0 mol. % $TeO_2$, greater than or equal to 0.0 mol. % and less than or equal to 15.0 mol. % $P_2O_5$, greater than or equal to 0.0 mol. % and less than or equal to 10.5 mol. % $Nb_2O_5$, greater than or equal to 0.0 mol. % and less than or equal to 10.0 mol. % $Al_2O_3$, greater than or equal to 0.0 mol. % and less than or equal to 5.0 mol. % $MoO_3$, greater than or equal to 0.0 mol. % and less than or equal to 4.0 mol. % $V_2O_5$, greater than or equal to 0.0 mol. % and less than or equal to 2.5 mol. % $GeO_2$, greater than or equal to 0.0 mol. % and less than or equal to 2.5 mol. % ZnO, greater than or equal to 0.0 mol. % and less than or equal to 1.0 mol. % $Ta_2O_5$, greater than or equal to 95.0 mol. % $R_mO_n$, greater than or equal to 0.0 mol. % and less than or equal to 29.0 mol. % $RE_mO_n$, greater than or equal to 10.0 mol. % $SiO_2+B_2O_3+P_2O_5$, less than or equal to 34.0 mol. % $SiO_2+B_2O_3$, greater than or equal to 0.3 mol. % $CaO+SrO+BaO+Y_2O_3$ and greater than or equal to 0.0 mol. % and less than or equal to 25.0 mol. % $R_2O+RO$, wherein the composition of the components satisfies the condition: $Y_2O_3$–$Gd_2O_3$ [mol. %]≥–2.0, and the glass satisfies the conditions: $4.0$ g/cm³≤$P_d$≤$6.0$ g/cm³ and $P_n$–$(1.207+0.155*P_d)$>$0.000$, where $P_n$ is a refractive index parameter, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \qquad (I)$$

$P_d$ is a density parameter, calculated from the glass composition in terms of mol. % of the components according to the Formula (II):

$$P_d=4.276+0.058714*La_2O_3-0.0077783*TiO_2-$$
$$0.023741*B_2O_3-0.018272*SiO_2+$$
$$0.010913*ZrO_2-0.0014478*CaO+$$
$$0.023857*BaO+0.033560*Y_2O_3+$$
$$0.010174*ZnO+0.082094*Gd_2O_3-$$
$$0.008237*Na_2O+0.035497*WO_3-$$
$$0.031171*Al_2O_3-0.0080004*Li_2O+$$
$$0.051830*PbO+0.10437*Bi_2O_3-$$
$$0.012816*GeO_2-0.0065609*TeO_2+$$
$$0.10060*Er_2O_3+0.10637*Yb_2O_3-$$
$$0.017097*K_2O+0.009821*SrO-$$
$$0.0037906*MgO, \qquad (II)$$

where $R_mO_n$ is a total sum of all oxides, $RE_mO_n$ is a total sum of rare earth metal oxides, $R_2O$ is a total sum of monovalent metal oxides, RO is a total sum of divalent metal oxides, and an asterisk (*) means multiplication.

According to a second aspect, the glass of the first aspect, wherein the glass has a density at room temperature, $d_{RT}$, that is greater than or equal to 4.0 g/cm³ and less than or equal to 6.0 g/cm³ and wherein the glass satisfies the condition: $n_d$–$(1.207+0.155*d_{RT})$>$0.000$, where $n_d$ is a refractive index at 587.56 nm.

According to a third aspect, the glass of any one of aspects 1-2, wherein the glass satisfies the conditions: $n_d$–$(1.217+0.155*d_{RT})$>$0.000$, where $n_d$ is a refractive index at 587.56 nm, $d_{RT}$[g/cm³] is a density at room temperature.

According to a fourth aspect, the glass of any one of aspects 1-3, wherein the glass satisfies the condition: $P_n$–$(1.217+0.155*P_d)$>$0.000$.

According to a fifth aspect, the glass of any one of aspects 1-4, wherein the composition of the components comprises greater than or equal to 20.0 mol. % and less than or equal to 25.2 mol. % $TiO_2$, greater than or equal to 15.0 mol. % and less than or equal to 29.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 10.0 mol. % $Y_2O_3$ and greater than or equal to 0.0 mol. % and less than or equal to 2.0 mol. % $WO_3$.

According to a sixth aspect, the glass of any one of aspects 1-5, wherein the composition of the components comprises one or more of the following: greater than or equal to 20.25 mol. % and less than or equal to 25.2 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 9.3 mol. % $Nb_2O_5$, greater than or equal to 0.5 mol. % and less than or equal to 6.3 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 6.5 mol. % BaO, greater than or equal to 0.0 mol. % and less than or equal to 1.8 mol. % $WO_3$, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a seventh aspect, the glass of any one of aspects 1-6, wherein the composition of the components comprises greater than or equal to 21.0 mol. % and less than or equal to 26.3 mol. % $La_2O_3$, greater than or equal to 20.25 mol. % and less than or equal to 25.2 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 8.6 mol. % $Nb_2O_5$, greater than or equal to 0.75 mol. % and less than or equal to 5.50 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 5.5 mol. % BaO, greater than or equal to 0.0 mol. % and less than or equal to 1.6 mol. % $WO_3$, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to an eighth aspect, the glass of any one of aspects 1-7, wherein the composition of the components satisfies one or more of the conditions: a sum of $La_2O_3$+$TiO_2$+$B_2O_3$+$SiO_2$+$ZrO_2$+$Nb_2O_5$+$BaO$+$Y_2O_3$+$CaO$+$Ga_2O_3$+$Gd_2O_3$+$ZnO$+$WO_3$+$CeO_2$+$SrO$+$Na_2O$+$Ta_2O_5$+$Al_2O_3$ is greater than or equal to 99.0 mol. %, a sum of $La_2O_3$+$Y_2O_3$+$Gd_2O_3$+$TiO_2$+$B_2O_3$+$SiO_2$+$ZrO_2$+$Nb_2O_5$ is greater than or equal to 99.0 mol. %, a sum of $La_2O_3$+$Y_2O_3$+$Gd_2O_3$+$TiO_2$+$B_2O_3$+$SiO_2$+$ZrO_2$+$Nb_2O_5$+$CaO$+$BaO$ is greater than or equal to 99.0 mol. % and a sum of $La_2O_3$+$TiO_2$+$B_2O_3$+$SiO_2$+$ZrO_2$+$Nb_2O_5$ is greater than or equal to 97.0 mol. %.

According to a ninth aspect, the glass of any one of aspects 1-8, wherein the composition of the components comprises greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$ and greater than or equal to 1.0 mol. % $ZrO_2$+$HfO_2$.

According to a tenth aspect, the glass of any one of aspects 1-9, wherein the composition of the components comprises greater than or equal to 0.0 mol. % and less than or equal to 6.0 mol. % $R_2O$+$RO$.

According to an eleventh aspect, the glass of the tenth aspect, wherein the composition of the components comprises greater than or equal to 0.0 mol. % and less than or equal to 1.0 mol. % $R_2O+RO$.

According to a twelfth aspect, the glass of any one of aspects 1-11, wherein the composition of the components satisfies the condition: $0.00 \leq SiO_2/(SiO_2+B_2O_3)$ [mol. %]$\leq 0.40$.

According to a thirteenth aspect, the glass of any one of aspects 1-12, wherein the composition of the components satisfies the condition: $0.38 \leq SiO_2/(SiO_2+B_2O_3)$ [mol. %]$\leq 0.75$.

According to a fourteenth aspect, the glass of any one of aspects 1-13, wherein the composition of the components comprises greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

According to a fifteenth aspect, the glass of any one of aspects 1-14, wherein the composition of the components comprises greater than or equal to 0.0 mol. % and less than or equal to 5.0 mol. % $Y_2O_3$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, and wherein the composition of the components is substantially free of fluorine and substantially free of $V_2O_5$.

According to a sixteenth aspect, the glass of any one of aspects 1-15, wherein the composition of the components comprises greater than or equal to 22.0 mol. % and less than or equal to 25.0 mol. % $TiO_2$, greater than or equal to 20.0 mol. % and less than or equal to 29.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO, greater than or equal to 0.0 mol. % and less than or equal to 2.0 mol. % $Gd_2O_3$, and greater than or equal to 98.0 mol. % $TiO_2+La_2O_3+B_2O_3+SiO_2+ZrO_2+Nb_2O_5+Y_2O_3+BaO+Gd_2O_3$.

According to a seventeenth aspect, the glass of any one of aspects 1-16, wherein the glass satisfies the conditions: 4.5 g/cm³$\leq P_d \leq 5.5$ g/cm³ and $1.95 \leq P_n \leq 2.07$, where $P_n$ a is refractive index parameter, calculated from the glass composition in terms of mol. % of the components according to the Formula (I):

$$P_n = 1.844 + 0.0054162*La_2O_3 + 0.0031113*TiO_2 - 0.004212*B_2O_3 - 0.0035692*SiO_2 + 0.0027887*ZrO_2 + 0.0078026*Nb_2O_5 - 0.00012928*CaO + 0.00076566*BaO + 0.0043601*Y_2O_3 + 0.00067408*ZnO + 0.0068029*Gd_2O_3 - 0.0025106*Na_2O + 0.0039937*WO_3 - 0.0043208*Al_2O_3 - 0.0011666*Li_2O + 0.0051727*PbO + 0.012958*Bi_2O_3 - 0.0018753*GeO_2 - 0.0014084*TeO_2 + 0.0086647*Er_2O_3 + 0.0097345*Yb_2O_3 - 0.0038734*K_2O - 0.00041776*SrO - 0.0017294*MgO, \quad (I)$$

$P_d$ is a density parameter, calculated from the glass composition in terms of mol. % of the components according to the Formula (II):

$$P_d = 4.276 + 0.058714*La_2O_3 - 0.0077783*TiO_2 - 0.023741*B_2O_3 - 0.018272*SiO_2 + 0.010913*ZrO_2 - 0.0014478*CaO + 0.023857*BaO + 0.033560*Y_2O_3 + 0.010174*ZnO + 0.082094*Gd_2O_3 - 0.008237*Na_2O + 0.035497*WO_3 - 0.031171*Al_2O_3 - 0.0080004*Li_2O + 0.051830*PbO + 0.10437*Bi_2O_3 - 0.012816*GeO_2 - 0.0065609*TeO_2 + 0.10060*Er_2O_3 + 0.10637*Yb_2O_3 - 0.017097*K_2O + 0.009821*SrO - 0.0037906*MgO. \quad (II)$$

According to an eighteenth aspect, the glass of any one of aspects 1-17, wherein the glass has a density at room temperature, $d_{RT}$, that is greater than or equal to 4.5 g/cm³ and less than or equal to 5.5 g/cm³ and a refractive index at 587.56 nm, $n_d$, that is greater than or equal to 1.95 and less than or equal to 2.07.

According to a nineteenth aspect, the glass of any one of aspects 1-18, wherein when cooled in air from 1100° C. to 500° C. in 2.5 minutes, the glass does not crystallize.

According to a twentieth aspect, the glass of any one of aspects 1-19, wherein when having a thickness of 10 mm, the glass has transmittance at a wavelength of 460 nm, $TX_{460\ nm}$, that is greater than or equal to 70%.

According to a twenty-first aspect, a method for manufacturing an optical element, the method comprising processing the glass of any one of aspects 1-20.

According to a twenty-second aspect, an optical element comprising the glass of any one of aspects 1-21.

According to a twenty-third aspect, the glass comprises a plurality of components, the glass having a composition of the components comprising greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0 mol. % and less than or equal to 6.8 mol. % $Nb_2O_5$, greater than or equal to 0.0 mol. % and less than or equal to 6.7 mol. % $Y_2O_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Y_2O_3+Gd_2O_3+TiO_2$, greater than or equal to 12.1 mol. % $Nb_2O_5+ZrO_2$ and may optionally contain one or more components selected from $Bi_2O_3$, $Er_2O_3$, $Nd_2O_3$, $WO_3$ and $Yb_2O_3$, wherein the composition of the components satisfies the conditions: $SiO_2+B_2O_3-TiO_2$ [mol. %]$\geq 7.05$ and $B_2O_3-SiO_2$ [mol. %]$\leq 7.0$, and the glass satisfying the condition: $P_{ref} - (0.196 + 0.0016*(TiO_2-La_2O_3)) > 0.000$, where $P_{ref}$ is a refraction parameter, calculated from the glass composition in terms of mol. % of the components according to the Formula (III):

$$P_{ref}(cm^3/g) = 0.201656 + 0.00018225*B_2O_3 - 0.0010873*BaO - 0.0024853*Bi_2O_3 - 0.0030326*Er_2O_3 - 0.0018856*Gd_2O_3 - 0.0017563*La_2O_3 - 0.0002505*Na_2O + 0.0017526*Nb_2O_5 - 0.0025472*Nd_2O_3 - 0.0016439*PbO + 0.000050096*SiO_2 + 0.0011794*TiO_2 - 0.00072112*WO_3 - 0.00079167*Y_2O_3 - 0.0031015*Yb_2O_3 - 0.00034209*ZnO, \quad (III)$$

where RO is a total sum of divalent metal oxides, $R_2O$ is a total sum of monovalent metal oxides, and an asterisk (*) means multiplication.

According to a twenty-fourth aspect, the glass of the twenty-third aspect, wherein the glass satisfies the conditions: $(n_d-1)/d_{RT}-(0.196+0.0016*(TiO_2-La_2O_3))>0.000$, where $n_d$ is a refractive index at 587.56 nm and $d_{RT}$ ($g/cm^3$) is a density at room temperature.

According to a twenty-fifth aspect, the glass of the twentieth fourth aspect, wherein the glass satisfies the conditions: $(n_d-1)/d_{RT}-(0.199+0.0016*(TiO_2-La_2O_3))>0.000$.

According to a twenty-sixth aspect, the glass of any one of aspects 23-25, wherein the glass satisfies the conditions: $P_{ref}-(0.199+0.0016*(TiO_2-La_2O_3))>0.000$.

According to a twenty-seventh aspect, the glass of any one of aspects 23-26, wherein the composition of the components comprises greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 6.8 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 4.0 mol. % ZnO and greater than or equal to 0.0 mol. % and less than or equal to 2.0 mol. % $WO_3$.

According to a twenty-eighth aspect, the glass of any one of aspects 23-27, wherein the composition of the components comprises one or more of the following: greater than or equal to 20.25 mol. % and less than or equal to 26.00 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 6.8 mol. % $Nb_2O_5$, greater than or equal to 0.5 mol. % and less than or equal to 6.3 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 6.5 mol. % BaO, greater than or equal to 0.0 mol. % and less than or equal to 3.0 mol. % ZnO, greater than or equal to 0.0 mol. % and less than or equal to 1.8 mol. % $WO_3$, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a twenty-ninth aspect, the glass of any one of aspects 23-28, wherein the composition of the components comprises greater than or equal to 21.0 mol. % and less than or equal to 26.3 mol. % $La_2O_3$, greater than or equal to 20.25 mol. % and less than or equal to 25.50 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 6.8 mol. % $Nb_2O_5$, greater than or equal to 0.75 mol. % and less than or equal to 5.50 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 5.5 mol. % BaO, greater than or equal to 0.0 mol. % and less than or equal to 2.7 mol. % ZnO, greater than or equal to 0.0 mol. % and less than or equal to 1.6 mol. % $WO_3$, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to a thirtieth aspect, the glass of any one of aspects 23-29, wherein the composition of the components satisfies one or more of the conditions: a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ is greater than or equal to 99.0 mol. %, a sum of $La_2O_3+Y_2O_3+Gd_2O_3+TiO_2+B_2O_3+SiO_2+ZrO_2+Nb_2O_5$ is greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ is greater than or equal to 99.0 mol. % and a sum of $La_2O_3+TiO_2+B_2O_3+SiO_2+ZrO_2+Nb_2O_5$ is greater than or equal to 97.0 mol. %.

According to a thirty-first aspect, the glass of any one of aspects 23-30, wherein the composition of the components comprises greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$, greater than or equal to 1.0 mol. % $ZrO_2+HfO_2$ and greater than or equal to 10.0 mol. % $SiO_2+B_2O_3$.

According to a thirty-second aspect, the glass of any one of aspects 23-31, wherein the composition of the components comprises greater than or equal to 0.0 mol. % and less than or equal to 6.0 mol. % $R_2O+RO$.

According to a thirty-third aspect, the glass of the thirty-second aspect, wherein the composition of the components comprises greater than or equal to 0.0 mol. % and less than or equal to 1.0 mol. % $R_2O+RO$.

According to a thirty-fourth aspect, the glass of any one of aspects 23-33, wherein the composition of the components satisfies the condition: $0.00 \leq SiO_2/(SiO_2+B_2O_3)$ [mol. %]$\leq 0.40$.

According to a thirty-fifth aspect, the glass of any one of aspects 23-34, wherein the composition of the components satisfies the condition: $0.38 \leq SiO_2/(SiO_2+B_2O_3)$ [mol. %]$\leq 0.75$.

According to a thirty-sixth aspect, the glass of any one of aspects 23-35, wherein the composition of the components comprises greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

According to a thirty-seventh aspect, the glass of any one of aspects 23-36, wherein the composition of the components comprises greater than or equal to 0.0 mol. % and less than or equal to 5.0 mol. % $Y_2O_3$, greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, wherein the composition of the components is substantially free of fluorine and substantially free of $V_2O_5$.

According to a thirty-eighth aspect, the glass of any one of aspects 23-28 and 30-37, wherein the composition of the components comprises greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 6.0 mol. % $Y_2O_3$, greater than or equal to 0.0 mol. % and less than or equal to 3.0 mol. % BaO, greater than or equal to 0.0 mol. % and less than or equal to 2.0 mol. % $Gd_2O_3$, and greater than or equal to 98.0 mol. % $TiO_2+La_2O_3+B_2O_3+SiO_2+ZrO_2+Nb_2O_5+Y_2O_3+BaO+Gd_2O_3$.

According to a thirty-ninth aspect, the glass of any one of aspects 23-38, wherein the glass satisfies the conditions: 4.5 $g/cm^3 \leq P_d \leq 5.5$ $g/cm^3$ and $1.95 \leq P_n \leq 2.07$, where $P_n$ is a refractive index parameter, calculated from the glass composition in terms of mol. % components according to the Formula (I):

$$P_n = 1.844+0.0054162*La_2O_3+0.0031113*TiO_2- \\ 0.004212*B_2O_3-0.0035692*SiO_2+ \\ 0.0027887*ZrO_2+0.0078026*Nb_2O_5- \\ 0.00012928*CaO+0.00076566*BaO+ \\ 0.0043601*Y_2O_3+0.00067408*ZnO+ \\ 0.0068029*Gd_2O_3-0.0025106*Na_2O+ \\ 0.0039937*WO_3-0.0043208*Al_2O_3- \\ 0.0011666*Li_2O+0.0051727*PbO+ \\ 0.012958*Bi_2O_3-0.0018753*GeO_2- \\ 0.0014084*TeO_2+0.0086647*Er_2O_3+ \\ 0.0097345*Yb_2O_3-0.0038734*K_2O- \\ 0.00041776*SrO-0.0017294*MgO, \tag{I}$$

$P_d$ is a density parameter, calculated from the glass composition in terms of mol. % of the components according to the Formula (II):

$$P_d = 4.276+0.058714*La_2O_3-0.0077783*TiO_2- \\ 0.023741*B_2O_3-0.018272*SiO_2+ \\ 0.010913*ZrO_2-0.0014478*CaO+ \\ 0.023857*BaO+0.033560*Y_2O_3+ \\ 0.010174*ZnO+0.082094*Gd_2O_3- \\ 0.008237*Na_2O+0.035497*WO_3- \\ 0.031171*Al_2O_3-0.0080004*Li_2O+ \\ 0.051830*PbO+0.10437*Bi_2O_3- \\ 0.012816*GeO_2-0.0065609*TeO_2+ \\ 0.10060*Er_2O_3+0.10637*Yb_2O_3- \\ 0.017097*K_2O+0.009821*SrO- \\ 0.0037906*MgO. \tag{II}$$

According to a fortieth aspect, the glass of any one of aspects 23-39, wherein the glass has density at room temperature, $d_{RT}$, that is greater than or equal to 4.5 $g/cm^3$ and less than or equal to 5.5 $g/cm^3$ and a refractive index at 587.56 nm, $n_d$, that is greater than or equal to 1.95 and less than or equal to 2.07.

According to a forty-first aspect, the glass of any one of aspects 23-40, wherein the glass has a liquidus temperature, $T_{liq}$, that is less than or equal to 1260° C.

According to a forty-second aspect, the glass of any one of aspects 23-41, wherein when cooled in air from 1100° C. to 500° C. in 2.5 minutes, the glass does not crystallize.

According to a forty-third aspect, the glass of any one of aspects 23-42, wherein when having a thickness of 10 mm, the glass has transmittance at a wavelength of 460 nm, $TX_{460\ nm}$, that is greater than or equal to 70%.

According to a forty-fourth aspect, a method for manufacturing an optical element, the method comprising processing the glass of any one of aspects 23-43.

According to a forty-fifth aspect, an optical element comprising the glass of any one of aspects 23-44.

According to a forty-sixth aspect, the glass comprises a plurality of components, the glass having a composition of the components comprising greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 20.0 mol. % CaO, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0 mol. % and less than or equal to 6.75 mol. % $Nb_2O_5$, greater than or equal to 0.0 mol. % and less than or equal to 5.5 mol. % BaO, greater than or equal to 0.0 mol. % and less than or equal to 4.6 mol. % $Y_2O_3$, greater than or equal to 0.0 mol. % and less than or equal to 3.5 mol. % ZnO, greater than or equal to 0.0 mol. % and less than or equal to 1.0 mol. % $WO_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Yb_2O_3+Y_2O_3+Gd_2O_3+TiO_2$, greater than or equal to 11.0 mol. % $Nb_2O_5+ZrO_2$ and may optionally contain one or more components selected from $Bi_2O_3$, $Er_2O_3$ and $Nd_2O_3$, wherein the composition of the components satisfies the conditions: $TiO_2-B_2O_3$ [mol. %]$\geq -6.0$ and $TiO_2-La_2O_3$ [mol. %]$\leq 5.0$, and the glass satisfies the condition: $P_{ref}-(0.199+0.0025*(TiO_2-La_2O_3))>0.000$, where $P_{ref}$ is a refraction parameter, calculated from the glass composition in terms of mol. % of the components according to the Formula (III):

$$P_{ref} = 0.201656+0.00018225*B_2O_3-0.0010873*BaO- \\ 0.0024853*Bi_2O_3-0.0030326*Er_2O_3- \\ 0.0018856*Gd_2O_3-0.0017563*La_2O_3- \\ 0.0002505*Na_2O+0.0017526*Nb_2O_5- \\ 0.0025472*Nd_2O_3-0.0016439*PbO+ \\ 0.000050096*SiO_2+0.0011794*TiO_2- \\ 0.00072112*WO_3-0.00079167*Y_2O_3- \\ 0.0031015*Yb_2O_3-0.00034209*ZnO, \tag{III}$$

where RO is a total sum of divalent metal oxides, $R_2O$ is a total sum of monovalent metal oxides, and an asterisk (*) means multiplication.

According to a forty-seventh aspect, the glass of the forty-sixth aspect, wherein the glass satisfies the conditions: $(n_d-1)/d_{RT}-(0.199+0.0025*(TiO_2-La_2O_3))>0.000$, where $n_d$ is a refractive index at 587.56 nm and $d_{RT}$ ($g/cm^3$) is a density at room temperature.

According to a forty-eighth aspect, the glass of any one of aspects 46-47, wherein the glass satisfies the conditions: $(n_d-1)/d_{RT}-(0.204+0.0025*(TiO_2-La_2O_3))>0.000$, where $n_d$ is a refractive index at 587.56 nm and $d_{RT}$ ($g/cm^3$) is a density at room temperature.

According to a forty-ninth aspect, the glass of any one of aspects 46-48, wherein the glass satisfies the conditions: $P_{ref}-(0.204+0.0025*(TiO_2-La_2O_3))>0.000$ According to a fiftieth aspect, the glass of any one of aspects 46-49, wherein the composition of the components comprises greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 6.8 mol. % $Nb_2O_5$, greater than or equal to 0.0 mol. % and less than or equal to 10.0 mol. % CaO and greater than or equal to 0.0 mol. % and less than or equal to 10.0 mol. % $Ga_2O_3$.

According to a fifty-first aspect, the glass of any one of aspects 46-50, wherein the composition of the components comprises one or more of the following: greater than or equal to 20.25 mol. % and less than or equal to 26.00 mol. % $TiO_2$, greater than or equal to 20.0 mol. % and less than or equal to 27.5 mol. % $La_2O_3$, greater than or equal to 16.4 mol. % and less than or equal to 20.4 mol. % $B_2O_3$, greater than or equal to 10.0 mol. % and less than or equal to 17.5 mol. % $SiO_2$, greater than or equal to 5.3 mol. % and less than or equal to 8.1 mol. % $ZrO_2$, greater than or equal to 4.5 mol. % and less than or equal to 6.8 mol. % $Nb_2O_5$, greater than or equal to 0.5 mol. % and less than or equal to 4.6 mol. % $Y_2O_3$, greater than or equal to 0.0 mol. % and less than or equal to 9.0 mol. % CaO, greater than or equal to 0.0 mol. % and less than or equal to 8.0 mol. % $Ga_2O_3$, greater than or equal to 0.0 mol. % and less than or equal to 3.0 mol. % ZnO, greater than or equal to 0 mol. % and less than or equal to 1.35 mol. % $Gd_2O_3$, greater than or equal to 0.0 mol. % and less than or equal to 0.9 mol. % SrO and greater than or equal to 0.0 mol. % and less than or equal to 0.9 mol. % $Yb_2O_3$.

According to a fifty-second aspect, the glass of any one of aspects 46-51, wherein the composition of the components comprises greater than or equal to 21.0 mol. % and less than or equal to 26.3 mol. % $La_2O_3$, greater than or equal to 20.25 mol. % and less than or equal to 25.50 mol. % $TiO_2$, greater than or equal to 16.9 mol. % and less than or equal to 20.4 mol. % $B_2O_3$, greater than or equal to 11.0 mol. % and less than or equal to 16.5 mol. % $SiO_2$, greater than or equal to 5.6 mol. % and less than or equal to 8.0 mol. % $ZrO_2$, greater than or equal to 5.1 mol. % and less than or equal to 6.8 mol. % $Nb_2O_5$, greater than or equal to 0.75 mol. % and less than or equal to 4.6 mol. % $Y_2O_3$, greater than or equal to 0.0 mol. % and less than or equal to 8.0 mol. % CaO, greater than or equal to 0.0 mol. % and less than or equal to 7.5 mol. % $Ga_2O_3$, greater than or equal to 0.0 mol. % and less than or equal to 2.7 mol. % ZnO, greater than or equal to 0.0 mol. % and less than or equal to 1.2 mol. % $Gd_2O_3$, greater than or equal to 0.0 mol. % and less than or equal to 0.8 mol. % SrO and greater than or equal to 0.0 mol. % and less than or equal to 0.8 mol. % $Yb_2O_3$.

According to a fifty-third aspect, the glass of any one of aspects 46-52, wherein the composition of the components satisfies one or more of the conditions: a sum of $La_2O_3$+$TiO_2$+$B_2O_3$+$SiO_2$+$ZrO_2$+$Nb_2O_5$+$BaO$+$Y_2O_3$+$CaO$+$Ga_2O_3$+$Gd_2O_3$+$ZnO$+$WO_3$+$CeO_2$+$SrO$+$Na_2O$+$Ta_2O_5$+$Al_2O_3$ is greater than or equal to 99.0 mol. %, a sum of $La_2O_3$+$Y_2O_3$+$Gd_2O_3$+$TiO_2$+$B_2O_3$+$SiO_2$+$ZrO_2$+$Nb_2O_5$ is greater than or equal to 99.0 mol. %, a sum of $La_2O_3$+$Y_2O_3$+$Gd_2O_3$+$TiO_2$+$B_2O_3$+$SiO_2$+$ZrO_2$+$Nb_2O_5$+$CaO$+$BaO$ is greater than or equal to 99.0 mol. % and a sum of $La_2O_3$+$TiO_2$+$B_2O_3$+$SiO_2$+$ZrO_2$+$Nb_2O_5$ is greater than or equal to 97.0 mol. %.

According to a fifty-fourth aspect, the glass of any one of aspects 46-53, wherein the composition of the components comprises greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$, greater than or equal to 1.0 mol. % $ZrO_2$+$HfO_2$ and greater than or equal to 10.0 mol. % $SiO_2$+$B_2O_3$.

According to a fifty-fifth aspect, the glass of any one of aspects 46-54, wherein the composition of the components comprises greater than or equal to 0.0 mol. % and less than or equal to 6.0 mol. % $R_2O$+$RO$.

According to a fifty-sixth aspect, the glass of the fifty-fifth aspect, wherein the composition of the components comprises greater than or equal to 0.0 mol. % and less than or equal to 1.0 mol. % $R_2O$+$RO$.

According to a fifty-seventh aspect, the glass of any one of aspects 46-56, wherein the composition of the components satisfies the conditions: $0.00 \leq SiO_2/(SiO_2+B_2O_3)$ [mol. %] $\leq 0.40$.

According to a fifty-eighth aspect, the glass of any one of aspects 46-57, wherein the composition of the components satisfies the conditions: $0.38 \leq SiO_2/(SiO_2+B_2O_3)$ [mol. %] $\leq 0.75$.

According to a fifty-ninth aspect, the glass of any one of aspects 46-58, wherein the composition of the components comprises greater than or equal to 0.0 mol. % and less than or equal to 6.5 mol. % CaO and wherein the composition of the components is substantially free of ZnO.

According to a sixtieth aspect, the glass of any one of aspects 46-59, wherein the composition of the components comprises greater than or equal to 0.0 mol. % and less than or equal to 2.0 mol. % $Ta_2O_5$, greater than or equal to 0.0 mol. % and less than or equal to 2.0 mol. % $TeO_2$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$ and greater than or equal to 0.0 mol. % and less than or equal to 0.2 mol. % $Sb_2O_3$, wherein the composition of the components is substantially free of fluorine and substantially free of $V_2O_5$.

According to a sixty-first aspect, the glass of any one of aspects 46-60, wherein the composition of the components comprises greater than or equal to 22.0 mol. % and less than or equal to 25.0 mol. % $TiO_2$, greater than or equal to 20.0 mol. % and less than or equal to 30.0 mol. % $La_2O_3$, greater than or equal to 16.0 mol. % and less than or equal to 20.0 mol. % $B_2O_3$, greater than or equal to 10.0 mol. % and less than or equal to 20.0 mol. % $SiO_2$, greater than or equal to 6.5 mol. % and less than or equal to 8.0 mol. % $ZrO_2$, greater than or equal to 5.0 mol. % and less than or equal to 6.7 mol. % $Nb_2O_5$, greater than or equal to 0.0 mol. % and less than or equal to 3.0 mol. % BaO, greater than or equal to 0.0 mol. % and less than or equal to 2.0 mol. % $Gd_2O_3$, and greater than or equal to 98.0 mol. % $TiO_2$+$La_2O_3$+$B_2O_3$+$SiO_2$+$ZrO_2$+$Nb_2O_5$+$BaO$+$Gd_2O_3$.

According to a sixty-second aspect, the glass of any one of aspects 46-61, wherein the glass satisfies the conditions: $4.5 \text{ g/cm}^3 \leq P_d \leq 5.5 \text{ g/cm}^3$ and $1.95 \leq P_n \leq 2.07$, where $P_n$ is a refractive index parameter, calculated from the glass composition in terms of mol. % of the components according to the Formula (I):

$$P_n=1.844+0.0054162*La_2O_3+0.0031113*TiO_2-0.004212*B_2O_3-0.0035692*SiO_2+0.0027887*ZrO_2+0.0078026*Nb_2O_5-0.00012928*CaO+0.00076566*BaO+0.0043601*Y_2O_3+0.00067408*ZnO+0.0068029*Gd_2O_3-0.0025106*Na_2O+0.0039937*WO_3-0.0043208*Al_2O_3-0.0011666*Li_2O+0.0051727*PbO+0.012958*Bi_2O_3-0.0018753*GeO_2-0.0014084*TeO_2+0.0086647*Er_2O_3+0.0097345*Yb_2O_3-0.0038734*K_2O-0.00041776*SrO-0.0017294*MgO, \quad \text{(I)}$$

$P_d$ is a density parameter, calculated from the glass composition in terms of mol. % of the components according to the Formula (II):

$$P_d=4.276+0.058714*La_2O_3-0.0077783*TiO_2-$$
$$0.023741*B_2O_3-0.018272*SiO_2+$$
$$0.010913*ZrO_2-0.0014478*CaO+$$
$$0.023857*BaO+0.033560*Y_2O_3+$$
$$0.010174*ZnO+0.082094*Gd_2O_3-$$
$$0.008237*Na_2O+0.035497*WO_3-$$
$$0.031171*Al_2O_3-0.0080004*Li_2O+$$
$$0.051830*PbO+0.10437*Bi_2O_3-$$
$$0.012816*GeO_2-0.0065609*TeO_2+$$
$$0.10060*Er_2O_3+0.10637*Yb_2O_3-$$
$$0.017097*K_2O+0.009821*SrO-$$
$$0.0037906*MgO. \tag{II}$$

According to a sixty-third aspect, the glass of any one of aspects 46-62, wherein the glass has density at room temperature, $d_{RT}$, that is greater than or equal to 4.5 g/cm$^3$ and less than or equal to 5.5 g/cm$^3$ and refractive index at 587.56 nm, $n_d$, that is greater than or equal to 1.95 and less than or equal to 2.07.

According to a sixty-fourth aspect, the glass of any one of aspects 46-63, wherein the glass has liquidus temperature, $T_{liq}$, that is less than or equal to 1260° C.

According to a sixty-fifth aspect, the glass of any one of aspects 46-64, wherein when cooled in air from 1100° C. to 500° C. in 2.5 minutes, the glass does not crystallize.

According to a sixty-sixth aspect, the glass of any one of aspects 46-65, wherein when having a thickness of 10 mm, the glass has transmittance at a wavelength of 460 nm, $TX_{460\ nm}$, that is greater than or equal to 70%.

According to a sixty-seventh aspect, a method for manufacturing an optical element, the method comprising processing the glass of any one of aspects 46-66.

According to a sixty-eighth aspect, an optical element comprising the glass of any one of aspects 46-67.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:
greater than or equal to 0.5 mol. % and less than or equal to 29.0 mol. % B$_2$O$_3$,
greater than or equal to 0.0 mol. % and less than or equal to 25.2 mol. % TiO$_2$,
greater than or equal to 0.0 mol. % and less than or equal to 20.0 mol. % Bi$_2$O$_3$,
greater than or equal to 0.0 mol. % and less than or equal to 20.0 mol. % TeO$_2$,
greater than or equal to 0.0 mol. % and less than or equal to 15.0 mol. % P$_2$O$_5$,
greater than or equal to 0.0 mol. % and less than or equal to 10.5 mol. % Nb$_2$O$_5$, greater than or equal to 0.0 mol. % and less than or equal to 10.0 mol. % Al$_2$O$_3$,
greater than or equal to 0.0 mol. % and less than or equal to 5.0 mol. % MoO$_3$,
greater than or equal to 0.0 mol. % and less than or equal to 4.0 mol. % V$_2$O$_5$,
greater than or equal to 0.0 mol. % and less than or equal to 2.5 mol. % GeO$_2$,
greater than or equal to 0.0 mol. % and less than or equal to 2.5 mol. % ZnO,
greater than or equal to 0.0 mol. % and less than or equal to 1.0 mol. % Ta$_2$O$_5$,
greater than or equal to 95.0 mol. % R$_m$O$_n$,
greater than or equal to 0.0 mol. % and less than or equal to 29.0 mol. % RE$_m$O$_n$,
greater than or equal to 10.0 mol. % SiO$_2$+B$_2$O$_3$+P$_2$O$_5$,
less than or equal to 34.0 mol. % SiO$_2$+B$_2$O$_3$,
greater than or equal to 0.3 mol. % CaO+SrO+BaO+Y$_2$O$_3$ and
greater than or equal to 0.0 mol. % and less than or equal to 25.0 mol. % R$_2$O+RO,
wherein the composition of the components satisfies the condition:
Y$_2$O$_3$—Gd$_2$O$_3$ [mol. %]≥−2.0,
wherein none of the ranges of the components is modified by the term "about",
and wherein the glass satisfies the conditions:
4.0 g/cm$^3$≤P$_d$≤6.0 g/cm$^3$ and
P$_n$−(1.207+0.155*P$_d$)>0.000,
where
P$_n$ is a refractive index parameter, calculated from the glass composition in terms of mol. % of the components according to the Formula (I):

$$P_n=1.844+0.0054162*La_2O_3+0.0031113*TiO_2-$$
$$0.004212*B_2O_3-0.0035692*SiO_2+$$
$$0.0027887*ZrO_2+0.0078026*Nb_2O_5-$$
$$0.00012928*CaO+0.00076566*BaO+$$
$$0.0043601*Y_2O_3+0.00067408*ZnO+$$
$$0.0068029*Gd_2O_3-0.0025106*Na_2O+$$
$$0.0039937*WO_3-0.0043208*Al_2O_3-$$
$$0.0011666*Li_2O+0.0051727*PbO+$$
$$0.012958*Bi_2O_3-0.0018753*GeO_2-$$
$$0.0014084*TeO_2+0.0086647*Er_2O_3+$$
$$0.0097345*Yb_2O_3-0.0038734*K_2O-$$
$$0.00041776*SrO-0.0017294*MgO, \tag{I}$$

P$_d$ is a density parameter, calculated from the glass composition in terms of mol. % of the components according to the Formula (II):

$$P_d=4.276+0.058714*La_2O_3-0.0077783*TiO_2-$$
$$0.023741*B_2O_3-0.018272*SiO_2+$$
$$0.010913*ZrO_2-0.0014478*CaO+$$
$$0.023857*BaO+0.033560*Y_2O_3+$$
$$0.010174*ZnO+0.082094*Gd_2O_3-$$
$$0.008237*Na_2O+0.035497*WO_3-$$
$$0.031171*Al_2O_3-0.0080004*Li_2O+$$
$$0.051830*PbO+0.10437*Bi_2O_3-$$
$$0.012816*GeO_2-0.0065609*TeO_2+$$
$$0.10060*Er_2O_3+0.10637*Yb_2O_3-$$
$$0.017097*K_2O+0.009821*SrO-$$
$$0.0037906*MgO, \tag{II}$$

where R$_m$O$_n$ is a total sum of all oxides, RE$_m$O$_n$ is a total sum of rare earth metal oxides, R$_2$O is a total sum of monovalent metal oxides, RO is a total sum of divalent metal oxides, an asterisk (*) means multiplication, and neither of the parameters P$_n$ and P$_d$ is modified by the term "about".

2. The glass of claim 1, wherein the composition of the components comprises:
greater than or equal to 20.0 mol. % and less than or equal to 25.2 mol. % TiO$_2$, greater than or equal to 15.0 mol. % and less than or equal to 29.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 10.0 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 10.0 mol. % $Y_2O_3$ and greater than or equal to 0.0 mol. % and less than or equal to 2.0 mol. % $WO_3$.

3. The glass of claim 1, wherein the composition of the components satisfies one or more of the conditions:

a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ is greater than or equal to 99.0 mol. %, a sum of $La_2O_3+Y_2O_3+Gd_2O_3+TiO_2+B_2O_3+SiO_2+ZrO_2+Nb_2O_5$ is greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ is greater than or equal to 99.0 mol. % and a sum of $La_2O_3+TiO_2+B_2O_3+SiO_2+ZrO_2+Nb_2O_5$ is greater than or equal to 97.0 mol. %.

4. The glass of claim 1, wherein the composition of the components comprises:

greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$ and greater than or equal to 1.0 mol. % $ZrO_2+HfO_2$.

5. The glass of claim 1, wherein the composition of the components satisfies the condition:

$0.00 \leq SiO_2/(SiO_2+B_2O_3)$ [mol. %] $\leq 0.40$.

6. The glass of claim 1, wherein the composition of the components comprises:

greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

7. The glass of claim 1, wherein the glass satisfies the conditions:

$4.5$ g/cm$^3 \leq P_d \leq 5.5$ g/cm$^3$ and $1.95 \leq P_n \leq 2.07$.

8. A glass comprising a plurality of components, the glass having a composition of the components comprising:

greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0.0 mol. % and less than or equal to 6.8 mol. % $Nb_2O_5$, greater than or equal to 0.0 mol. % and less than or equal to 6.7 mol. % $Y_2O_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Y_2O_3+Gd_2O_3+TiO_2$, greater than or equal to 12.1 mol. % $Nb_2O_5+ZrO_2$ and optionally comprising one or more components selected from $Bi_2O_3$, $Er_2O_3$, $Nd_2O_3$, $WO_3$ and $Yb_2O_3$, wherein the composition of the components satisfies the conditions:

$SiO_2+B_2O_3$—$TiO_2$ [mol. %] $\geq 7.05$ and $B_2O_3$—$SiO_2$ [mol. %] $\leq 7.0$, wherein none of the ranges of the components is modified by the term "about", and wherein the glass satisfies the condition:

$P_{ref}$—$(0.196+0.0016*(TiO_2-La_2O_3))>0.000$, where $P_{ref}$ is a refraction parameter, calculated from the glass composition in terms of mol. % of the components according to the Formula (III):

$$P_{ref} = 0.201656 + 0.00018225*B_2O_3 - 0.0010873*BaO - 0.0024853*Bi_2O_3 - 0.0030326*Er_2O_3 - 0.0018856*Gd_2O_3 - 0.0017563*La_2O_3 - 0.0002505*Na_2O + 0.0017526*Nb_2O_5 - 0.0025472*Nd_2O_3 - 0.0016439*PbO + 0.000050096*SiO_2 + 0.0011794*TiO_2 - 0.00072112*WO_3 - 0.00079167*Y_2O_3 - 0.0031015*Yb_2O_3 - 0.00034209*ZnO, \quad \text{(III)}$$

where RO is a total sum of divalent metal oxides, $R_2O$ is a total sum of monovalent metal oxides, an asterisk (*) means multiplication, and the parameter Pref is not modified by the term "about".

9. The glass of claim 8, wherein the glass satisfies the conditions:

$P_{ref}$—$(0.199+0.0016*(TiO_2-La_2O_3))>0.000$.

10. The glass of claim 8, wherein the composition of the components comprises:

greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 6.8 mol. % $Nb_2O_5$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $Ga_2O_3$, greater than or equal to 0.0 mol. % and less than or equal to 4.0 mol. % ZnO and greater than or equal to 0.0 mol. % and less than or equal to 2.0 mol. % $WO_3$.

11. The glass of claim 8, wherein the composition of the components satisfies one or more of the conditions:

a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ is greater than or equal to 99.0 mol. %, a sum of $La_2O_3+Y_2O_3+Gd_2O_3+TiO_2+B_2O_3+SiO_2+ZrO_2+Nb_2O_5$ is greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ is greater than or equal to 99.0 mol. % and a sum of $La_2O_3+TiO_2+B_2O_3+SiO_2+ZrO_2+Nb_2O_5$ is greater than or equal to 97.0 mol. %.

12. The glass of claim 8, wherein the composition of the components comprises:

greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$, greater than or equal to 1.0 mol. % $ZrO_2+HfO_2$ and greater than or equal to 10.0 mol. % $SiO_2+B_2O_3$.

13. The glass of claim 8, wherein the composition of the components comprises:

greater than or equal to 0.0 mol. % and less than or equal to 6.0 mol. % $R_2O+RO$.

14. The glass of claim 8, wherein the composition of the components satisfies the condition:

$0.38 \leq SiO_2/(SiO_2+B_2O_3)$ [mol. %]$\leq 0.75$.

15. The glass of claim 8, wherein the composition of the components comprises:

greater than or equal to 0.0 mol. % and less than or equal to 6.5 mol. % CaO and greater than or equal to 0.0 mol. % and less than or equal to 5.5 mol. % BaO and wherein the composition of the components is substantially free of ZnO.

16. The glass of claim 8, wherein the glass satisfies the conditions:

$4.5 \text{ g/cm}^3 \leq P_d \leq 5.5 \text{ g/cm}^3$ and $1.95 \leq P_n \leq 2.07$, where $P_n$ is a refractive index parameter, calculated from the glass composition in terms of mol. % of the components according to the Formula (I):

$$P_n=1.844+0.0054162*La_2O_3+0.0031113*TiO_2-0.004212*B_2O_3-0.0035692*SiO_2+0.0027887*ZrO_2+0.0078026*Nb_2O_5-0.00012928*CaO+0.00076566*BaO+0.0043601*Y_2O_3+0.00067408*ZnO+0.0068029*Gd_2O_3-0.0025106*Na_2O+0.0039937*WO_3-0.0043208*Al_2O_3-0.0011666*Li_2O+0.0051727*PbO+0.012958*Bi_2O_3-0.0018753*GeO_2-0.0014084*TeO_2+0.0086647*Er_2O_3+0.0097345*Yb_2O_3-0.0038734*K_2O-0.00041776*SrO-0.0017294*MgO, \quad (I)$$

$P_d$ is a density parameter, calculated from the glass composition in terms of mol. % of the components according to the Formula (II):

$$P_d=4.276+0.058714*La_2O_3-0.0077783*TiO_2-0.023741*B_2O_3-0.018272*SiO_2+0.010913*ZrO_2-0.0014478*CaO+0.023857*BaO+0.033560*Y_2O_3+$$

$$0.010174*ZnO+0.082094*Gd_2O_3-0.008237*Na_2O+0.035497*WO_3-0.031171*Al_2O_3-0.0080004*Li_2O+0.051830*PbO+0.10437*Bi_2O_3-0.012816*GeO_2-0.0065609*TeO_2+0.10060*Er_2O_3+0.10637*Yb_2O_3-0.017097*K_2O+0.009821*SrO-0.0037906*MgO, \quad (II)$$

17. A glass comprising a plurality of components, the glass having a composition of the components comprising:

greater than or equal to 1.0 mol. % and less than or equal to 40.0 mol. % $TiO_2$, greater than or equal to 1.0 mol. % and less than or equal to 40.0 mol. % $B_2O_3$, greater than or equal to 0.0 mol. % and less than or equal to 35.0 mol. % $SiO_2$, greater than or equal to 0.0 mol. % and less than or equal to 30.0 mol. % $La_2O_3$, greater than or equal to 0.0 mol. % and less than or equal to 20.0 mol. % CaO, greater than or equal to 0.0 mol. % and less than or equal to 10.0 mol. % $ZrO_2$, greater than or equal to 0.0 mol. % and less than or equal to 10.0 mol. % $GeO_2$, greater than or equal to 0.0 mol. % and less than or equal to 10.0 mol. % $Al_2O_3$, greater than or equal to 0.0 mol. % and less than or equal to 6.8 mol. % $Nb_2O_5$, greater than or equal to 0.0 mol. % and less than or equal to 5.5 mol. % BaO, greater than or equal to 0.0 mol. % and less than or equal to 4.6 mol. % $Y_2O_3$, greater than or equal to 0.0 mol. % and less than or equal to 3.5 mol. % ZnO, greater than or equal to 0.0 mol. % and less than or equal to 1.0 mol. % $WO_3$, greater than or equal to 0.0 mol. % and less than or equal to 25.0 mol. % RO, greater than or equal to 0.0 mol. % and less than or equal to 25.0 mol. % $R_2O$, greater than or equal to 45.3 mol. % $La_2O_3+Yb_2O_3+Y_2O_3+Gd_2O_3+TiO_2$, greater than or equal to 11.0 mol. % $Nb_2O_5+ZrO_2$ and optionally comprising one or more components selected from $Bi_2O_3$, $Er_2O_3$ and $Nd_2O_3$, wherein the composition of the components satisfies the conditions:

$TiO_2$—$B_2O_3$ [mol. %]$\geq -6.0$ and $TiO_2$—$La_2O_3$ [mol. %]$\leq 5.0$, wherein none of the ranges of the components is modified by the term "about"

and wherein the glass satisfies the condition:

$P_{ref}-(0.199+0.0025*(TiO_2—La_2O_3))>0.000$, where $P_{ref}$ is a refraction parameter, calculated from the glass composition in terms of mol. % of the components according to the Formula (III):

$$P_{ref}=0.201656+0.00018225*B_2O_3-0.0010873*BaO-0.0024853*Bi_2O_3-0.0030326*Er_2O_3-0.0018856*Gd_2O_3-0.0017563*La_2O_3-0.0002505*Na_2O+0.0017526*Nb_2O_5-0.0025472*Nd_2O_3-0.0016439*PbO+0.000050096*SiO_2+0.0011794*TiO_2-0.00072112*WO_3-0.00079167*Y_2O_3-0.0031015*Yb_2O_3-0.00034209*ZnO, \quad (III)$$

where RO is a total sum of divalent metal oxides, $R_2O$ is a total sum of monovalent metal oxides, an asterisk (*) means multiplication, and the parameter $P_{ref}$ is not modified by the term "about".

18. The glass of claim 17, wherein the composition of the components comprises:

greater than or equal to 20.0 mol. % and less than or equal to 27.5 mol. % $TiO_2$, greater than or equal to 15.0 mol. % and less than or equal to 30.0 mol. % $La_2O_3$, greater than or equal to 15.0 mol. % and less than or equal to 22.5 mol. % $B_2O_3$, greater than or equal to 5.0 mol. % and less than or equal to 20.0 mol. % $SiO_2$, greater than or equal to 4.0 mol. % and less than or equal to 9.0 mol. % $ZrO_2$, greater than or equal to 2.5 mol. % and less than or equal to 6.8 mol. % $Nb_2O_5$, greater than or equal to 0.0 mol. % and less than or equal to 10.0 mol. % CaO and greater than or equal to 0.0 mol. % and less than or equal to 10.0 mol. % $Ga_2O_3$.

19. The glass of claim 17, wherein the composition of the components satisfies one or more of the conditions:

a sum of $La_2O_3+TiO_2+B_2O_3+SiO_2+ZrO_2+Nb_2O_5+BaO+Y_2O_3+CaO+Ga_2O_3+Gd_2O_3+ZnO+WO_3+CeO_2+SrO+Na_2O+Ta_2O_5+Al_2O_3$ is greater than or equal to 99.0 mol. %, a sum of $La_2O_3+Y_2O_3+Gd_2O_3+TiO_2+B_2O_3+SiO_2+ZrO_2+Nb_2O_5$ is greater than or equal to 99.0 mol. %, a sum of $La_2O_3+Y_2O_3+Gd_2O_3+TiO_2+B_2O_3+SiO_2+ZrO_2+Nb_2O_5+CaO+BaO$ is greater than or equal to 99.0 mol. % and a sum of $La_2O_3+TiO_2+B_2O_3+SiO_2+ZrO_2+Nb_2O_5$ is greater than or equal to 97.0 mol. %.

20. The glass of claim 17, wherein the composition of the components comprises:

greater than or equal to 5.0 mol. % $B_2O_3$, greater than or equal to 5.0 mol. % $La_2O_3$, greater than or equal to 5.0 mol. % $Nb_2O_5$, greater than or equal to 5.0 mol. % $SiO_2$, greater than or equal to 5.0 mol. % $TiO_2$, greater than or equal to 1.0 mol. % $ZrO_2+HfO_2$ and greater than or equal to 10.0 mol. % $SiO_2+B_2O_3$.

21. The glass of claim 17, wherein the composition of the components satisfies the condition:

$0.00 \leq SiO_2/(SiO_2+B_2O_3)$ [mol. %]$\leq 0.40$.

22. The glass of claim 17, wherein the composition of the components satisfies the condition:

$0.38 \leq SiO_2/(SiO_2+B_2O_3)$ [mol. %]$\leq 0.75$.

23. The glass of claim 17, wherein the glass satisfies the conditions:

$4.5$ g/cm$^3 \leq P_d \leq 5.5$ g/cm$^3$ and $1.95 \leq P_n \leq 2.07$, where $P_n$ is a refractive index parameter, calculated from the glass composition in terms of mol. % of the components according to the Formula (I):

$$\begin{aligned}
P_n = &\, 1.844 + 0.0054162*La_2O_3 + 0.0031113*TiO_2 - \\
&\, 0.004212*B_2O_3 - 0.0035692*SiO_2 + \\
&\, 0.0027887*ZrO_2 + 0.0078026*Nb_2O_5 - \\
&\, 0.00012928*CaO + 0.00076566*BaO + \\
&\, 0.0043601*Y_2O_3 + 0.00067408*ZnO + \\
&\, 0.0068029*Gd_2O_3 - 0.0025106*Na_2O + \\
&\, 0.0039937*WO_3 - 0.0043208*Al_2O_3 - \\
&\, 0.0011666*Li_2O + 0.0051727*PbO + \\
&\, 0.012958*Bi_2O_3 - 0.0018753*GeO_2 - \\
&\, 0.0014084*TeO_2 + 0.0086647*Er_2O_3 + \\
&\, 0.0097345*Yb_2O_3 - 0.0038734*K_2O - \\
&\, 0.00041776*SrO - 0.0017294*MgO,
\end{aligned} \tag{I}$$

$P_d$ is a density parameter, calculated from the glass composition in terms of mol. % of the components according to the Formula (II):

$$\begin{aligned}
P_d = &\, 4.276 + 0.058714*La_2O_3 - 0.0077783*TiO_2 - \\
&\, 0.023741*B_2O_3 - 0.018272*SiO_2 + \\
&\, 0.010913*ZrO_2 - 0.0014478*CaO + \\
&\, 0.023857*BaO + 0.033560*Y_2O_3 + \\
&\, 0.010174*ZnO + 0.082094*Gd_2O_3 - \\
&\, 0.008237*Na_2O + 0.035497*WO_3 - \\
&\, 0.031171*Al_2O_3 - 0.0080004*Li_2O + \\
&\, 0.051830*PbO + 0.10437*Bi_2O_3 - \\
&\, 0.012816*GeO_2 - 0.0065609*TeO_2 + \\
&\, 0.10060*Er_2O_3 + 0.10637*Yb_2O_3 - \\
&\, 0.017097*K_2O + 0.009821*SrO - \\
&\, 0.0037906*MgO,
\end{aligned} \tag{II}$$

\* \* \* \* \*